(12) United States Patent
Persson et al.

(10) Patent No.: US 10,977,910 B1
(45) Date of Patent: Apr. 13, 2021

(54) TACTILE OUTPUTS FOR INPUT STRUCTURES OF ELECTRONIC DEVICES

(71) Applicant: Apple Inc., Cupertino, CA (US)

(72) Inventors: Per Haakan Linus Persson, Cupertino, CA (US); Steven J. Taylor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/986,772

(22) Filed: May 22, 2018

Related U.S. Application Data

(60) Provisional application No. 62/555,031, filed on Sep. 6, 2017.

(51) Int. Cl.
| G08B 21/00 | (2006.01) |
| G08B 6/00 | (2006.01) |
| H04R 1/02 | (2006.01) |
| G06F 3/01 | (2006.01) |

(52) U.S. Cl.
CPC ............. G08B 6/00 (2013.01); G06F 3/016 (2013.01); H04R 1/02 (2013.01); *H04R 2400/03* (2013.01)

(58) Field of Classification Search
None
See application file for complete search history.

(56) References Cited

U.S. PATENT DOCUMENTS

| 5,663,703 A * | 9/1997 | Pearlman | G08B 6/00 |
| | | | 340/407.1 |
| 6,218,958 B1 | 4/2001 | Eichstaedt | |
| 6,937,225 B1 | 8/2005 | Kehlstadt et al. | |
| 7,058,733 B2 | 6/2006 | Vong | |
| 8,027,705 B2 | 9/2011 | Kim | |
| 8,914,075 B2 * | 12/2014 | Pasquero | H04M 1/7253 |
| | | | 455/567 |
| 8,941,500 B1 * | 1/2015 | Faaborg | G08B 21/18 |
| | | | 340/573.1 |
| 9,529,435 B2 | 12/2016 | Levesque | |
| 10,210,722 B2 | 2/2019 | Cruz-Hernandez | |
| 10,762,752 B1 | 9/2020 | Persson et al. | |
| 2005/0152325 A1 | 7/2005 | Gonzales | |
| 2007/0288582 A1 | 12/2007 | Major et al. | |

(Continued)

FOREIGN PATENT DOCUMENTS

JP 2013184611 9/2013

*Primary Examiner* — Julie B Lieu
(74) *Attorney, Agent, or Firm* — Brownstein Hyatt Farber Schreck, LLP

(57) ABSTRACT

An electronic device may provide tactile outputs at a tactile output region of the electronic device. The tactile output region of the electronic device may be a surface of an input structure or a surface of an enclosure of the device. Tactile outputs may provide a sustained, physically-based notification of a particular item of interest. The tactile output may alter a physical characteristic of the tactile output region, such as the shape, texture, or density of a portion of the electronic device, in one or more tactile output regions. Furthermore, the tactile notification may provide a notification that is less intrusive and more tunable to user preferences than conventional notifications. The tactile output may be static in that the tactile notification is not transitory and remains throughout the duration of the tactile output. The tactile notification may be dynamic in that it includes motion.

16 Claims, 39 Drawing Sheets

(56) References Cited

U.S. PATENT DOCUMENTS

| | | | |
|---|---|---|---|
| 2011/0157052 A1* | 6/2011 | Lee | G06F 1/1626 345/173 |
| 2012/0262394 A1* | 10/2012 | Sanma | G06F 3/016 345/173 |
| 2013/0021279 A1* | 1/2013 | Lee | G06F 3/011 345/173 |
| 2013/0141378 A1* | 6/2013 | Yumiki | G06F 3/041 345/173 |
| 2013/0222280 A1* | 8/2013 | Sheynblat | G06F 3/016 345/173 |
| 2014/0052401 A1* | 2/2014 | Riley | G01P 21/00 702/89 |
| 2014/0176455 A1* | 6/2014 | Araki | G06F 3/016 345/173 |
| 2015/0207914 A1* | 7/2015 | Hunt | H04M 19/047 340/407.1 |
| 2015/0241970 A1* | 8/2015 | Park | G06F 3/016 345/173 |
| 2015/0293592 A1* | 10/2015 | Cheong | G06F 3/016 345/173 |
| 2015/0358438 A1* | 12/2015 | Kim | H04W 4/70 455/566 |
| 2016/0028430 A1 | 1/2016 | Crawford | |
| 2017/0011210 A1* | 1/2017 | Cheong | A61B 5/0022 |
| 2017/0164832 A1 | 6/2017 | Kaib et al. | |
| 2017/0357319 A1* | 12/2017 | Chaudhri | G06F 3/016 |
| 2017/0358181 A1* | 12/2017 | Moussette | H04M 1/72569 |
| 2018/0024638 A1* | 1/2018 | Endo | G06F 3/041 345/173 |
| 2018/0088698 A1* | 3/2018 | Suzuki | G06F 3/0488 |
| 2018/0314401 A1* | 11/2018 | Endo | G01C 21/00 |
| 2018/0335920 A1* | 11/2018 | Tyler | H04M 1/72519 |
| 2018/0350204 A1* | 12/2018 | Ramsay | G08B 6/00 |
| 2018/0356890 A1* | 12/2018 | Zhang | G06F 3/016 |
| 2018/0367944 A1* | 12/2018 | Heo | H04W 4/02 |
| 2019/0038966 A1* | 2/2019 | Levesque | H04M 1/7253 |

* cited by examiner

TACTILE OUTPUTS FOR INPUT STRUCTURES OF ELECTRONIC DEVICES

CROSS-REFERENCE TO RELATED APPLICATION

This application is a non-provisional patent application of and claims the benefit of U.S. Provisional Patent Application No. 62/555,031, filed Sep. 6, 2017 and titled "Tactile Notifications for Electronic Devices," the disclosure of which is hereby incorporated herein by reference in its entirety.

FIELD

The described embodiments relate generally to electronic devices. More particularly, the present embodiments relate to systems and methods to provide tactile outputs for an electronic device. Still more particularly, the present embodiments relate to using tactile features to provide tactile outputs at an input structure of an electronic device.

BACKGROUND

Many electronic devices have an ability to notify a user of a particular item of interest. For example, an electronic device, such as a phone or watch, may notify a user of an incoming text, phone call, or electronic mail. Conventional notifications are temporary alarms or signals, such as an audio or vibration alarm, or temporary displays of a message, such as a text message. If the user does not respond to the text message, the text message will disappear. Such conventional alerting schemes can be distracting to the user or to parties adjacent the user. In some cases, conventional notifications may be so distracting that a user turns off the notification capability, resulting in missed receipt of urgent or critical notifications. Also, conventional notifications may be forgotten if not acknowledged during the temporary notification lifetime, as the notification frequently will get stored among a wealth of earlier notifications and data.

SUMMARY

Certain embodiments described herein relate to, include, or take the form of an electronic device that includes an enclosure, an input/output member, and an actuator. The input/output member is coupled to the enclosure and is configured to receive an input and provide a tactile output. The actuator is disposed at least partially within the enclosure and is operably connected to the input/output member. The actuator is configured to activate a tactile feature on the input/output member in response to the input and move the tactile feature in a pattern of motion, thereby producing the tactile output.

Other embodiments described generally reference a wearable audio device that includes an enclosure defining an exterior surface and an input/output region defined on the exterior surface. The wearable audio device further includes an audio output element coupled to the enclosure. The wearable audio device further includes an actuator coupled to the enclosure and configured to dynamically change a shape of the input/output region to produce a localized tactile output at the input/output region.

Still further embodiments described herein generally reference a method for providing a tactile output for an electronic device. The method includes the steps of receiving an input at a tactile feature, and in response to receiving the input, transmitting a signal to an actuator to provide the tactile output using the tactile feature. The tactile output provides information regarding operation of the electronic device. The method further includes the steps of moving the actuator in response to receiving the signal, and in response to moving the actuator, moving the tactile feature, thereby changing at least one of a rotation speed or a shape of the tactile feature.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1:
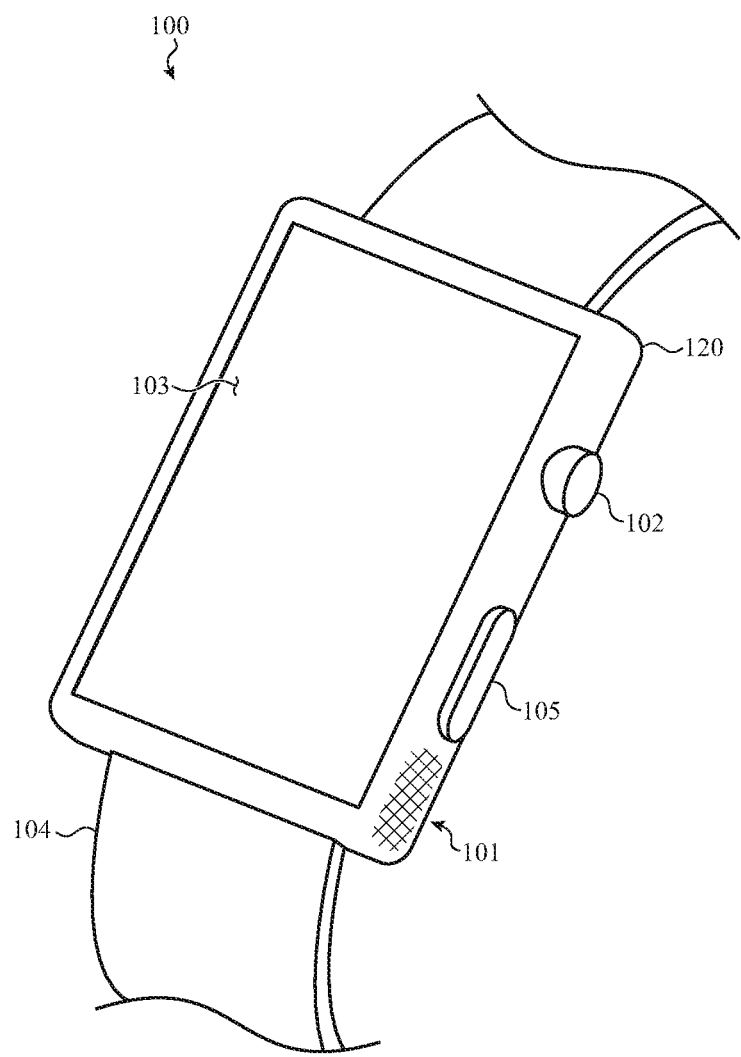
FIG. 1 illustrates one example of an electronic device with a tactile notification region.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure generally relates to tactile outputs used in electronic devices. A tactile output may provide a sustained, physically-based notification of a particular item of interest. As used herein, "tactile" means related to a sense of touch. Providing a "tactile output" means providing information that is perceivable by sense of touch. In some embodiments, providing a tactile output includes changing a physical characteristic or material property such as the shape, texture, or density of a portion of the electronic device in touch contact with the user.

The tactile output may provide information to a user in a manner that is less intrusive and more tunable to user preferences than conventional methods for providing information to users of electronic devices. Because of the tactile nature, the tactile output may provide information that does not require a user's visual attention and/or does not require the electronic device to be within a user's field of view. Similarly, an element or structure configured to generate tactile output may be indistinguishable to a user from other portions of the electronic device unless a tactile output is being provided. In some embodiments, the tactile output may be tactilely perceptible but visually imperceptible, even while it is provided. In certain embodiments, the tactile output may be visually imperceptible when the tactile output is not being provided.

In some embodiments, the tactile output is provided by activating and/or moving one or more tactile features of the electronic device. A "tactile feature," as used herein, is a feature, quality, characteristic, or the like, that provides a tactile output. One or more tactile features may be provided on and/or define a tactile output region within which tactile outputs are provided. The tactile features may include one or more protrusions and/or indentations on a surface of a device, or on a surface of an input structure, to provide a tactile output. The tactile features may include one or more movable members, such as an input/output member of an input structure. In some embodiments, tactile features are activated by altering a surface of the device and/or a surface of an input structure of the device, for example by forming protrusions or indentations in an otherwise smooth surface. In some embodiments, tactile features are not activated, but are instead present as part of the device and are moved or otherwise altered to produce a tactile output. For example, an input/output member of an input structure may itself be a tactile feature that is moved or otherwise altered to produce a tactile output. The tactile feature may move along a surface of the device, in or out of the surface of the device, rotate, precess, change shape, or some combination thereof.

In some embodiments, the tactile output is static in that it is fixed (e.g., invariant, or unchanging) for the duration of the tactile output. For example, one or more tactile features may be activated to produce the tactile output and may remain fixed for the duration of the tactile output. As used herein, a "tactile notification" refers to a static tactile output.

In some embodiments, the tactile output is dynamic in that the tactile output is created by and/or includes motion, change, or variation. For example, one or more tactile features may move to produce a tactile output. In some embodiments, the motion is slow enough such that the user can feel specific motion of one or more tactile features. This is opposed to a user feeling an aggregate of motion, such as a vibration. In some embodiments, the motion of a dynamic tactile output is substantially periodic.

In some embodiments, the tactile output is localized, such that the tactile output is only tactilely perceptible in one or more tactile output regions. For example, the alteration of the physical characteristic of the electronic device may be confined to a particular tactile output region of the electronic device. One or more tactile output regions may be formed on an exterior surface of an electronic device. In some embodiments, the tactile output regions are formed directly on a housing of the electronic device. In some embodiments, the tactile output regions are formed on an accessory of the electronic device, such as an accessory tactile output plate fitted to the electronic device. In some embodiments, tactile output regions include tactile notification regions in which tactile notifications (e.g., static tactile outputs) are provided. In some embodiments, tactile output regions include tactile input/output regions in which tactile outputs are provided and inputs are received.

In some embodiments, the tactile output is produced at an input structure, such as a button, a trackpad, a keyboard, a mouse, a fingerprint reader, a touch-sensitive display, or the like. An exterior surface of the input structure may form a tactile input/output region. For example, the tactile output may alter a physical characteristic of an input/output member of an input structure. The tactile output produced at an input structure may be tactilely and/or visually perceptible by a body part in contact with the input structure, such as a finger on a button. In some embodiments, the tactile output provided at an input structure is only tactilely and/or visually perceptible by a body part in contact with the input structure. In some embodiments, the tactile output is produced in response to inputs received at the electronic device. For example, the tactile output may be provided at an input structure in response to an input received at the input structure.

In some embodiments, tactile outputs may be sustained rather than transitory. "Sustained" as used herein means not transitory and remaining until an event or condition occurs. For example, a tactile output may continue to be activated and/or moving until a user acknowledges the tactile output or until a user is no longer contacting a tactile output region. For example, if the dynamic tactile output is provided at an input structure, the dynamic tactile output may continue to be provided until the user removes his finger from the input structure, after which the tactile output is no longer provided.

In some embodiments, providing a sustained tactile output allows the user more control and discretion regarding addressing the output. For example, a conventional notification, such as an audio chime or ring, is typically known to the user and adjacent parties, and requires immediate action by the user to either turn-off the notification (e.g. silence a phone call) or answer the underlying content (e.g. answer the phone call.) In contrast, a tactile output, such as a protrusion produced on a surface of a mobile phone, may be unnoticeable by adjacent parties and, if sustained, may allow the user to delay action.

The tactile outputs may convey a variety of information to users, including notifications of events of interest and information regarding the operation of one or more electronic devices. In some embodiments, the tactile outputs provide notice that an event of interest has occurred, is currently occurring, and/or will occur. An event of interest may be an incoming or missed phone call, a text message, an email message, an application notification, a system notification, an alarm, a timer expiring, and so on. In addition to providing notice that an event of interest has occurred, is currently occurring, and/or will occur, the tactile output may provide information as to the urgency of the event, the nature of the event (e.g. personal, work-related), format of the event trigger (e.g. voicemail, text message), and the source of the event (e.g. from a spouse, a supervisor).

In some embodiments, the tactile output conveys information regarding the operation of one or more electronic devices. For example, the tactile output may convey information related to media playback (e.g., audio and/or video playback), loading and waiting operations, pairing operations (e.g., wireless pairing operations), communication operations (e.g., phone calls, video calls, messaging, data transfer), authentication operations, charging operations, execution of applications, and so on.

Conventional notifications include temporary alarms or signals, such as an audio or vibration alarm, or temporary displays of a message, such as a text message. For example, a phone may ring or vibrate for several seconds to signal an incoming call. After a fixed time, if the user does not acknowledge the call by answering or directing the call to voicemail, the ring or vibration will stop. Also, a text message may temporarily pop-up on a user screen, overriding all or part of a display. If the user does not respond to the text message, the text message will disappear. Such conventional transitory alerting schemes can be distracting to the user or to parties adjacent the user. In some cases, conventional notifications may be so distracting that a user turns off the notification capability, resulting in missed receipt of urgent or critical notifications. Also, conventional notifications may be forgotten if not acknowledged during the temporary notification lifetime, as the notification frequently will get stored among a wealth of earlier notifications and data.

Similarly, conventional solutions for conveying information regarding the operation of an electronic device include displaying the information on a display of the device, or audio or vibration alarms. If the user is unable to see or give visual attention to the device display, the user may not see information displayed on the display of the device. Similarly, if the user is using the device, displaying the information on the device screen may interrupt the user's use of the device, or the user may be using the device in such a manner that is incompatible with also displaying the information on the display. Similar to conventional notifications discussed above, audio and vibration alarms can be disruptive and distracting. The drawbacks of conventional solutions may result in the user not receiving information conveyed by the device and/or choosing to turn off the device's capability to convey information.

A user may prefer a tactile output over conventional solutions because the tactile output may be more subtle, unobtrusive and convenient than conventional solutions. For example, the tactile output may notify a user of a particular item of interest without the jarring distraction of a ring tone or vibration and without the need for the user to give visual attention the device. Such a notification may be difficult to identify by non-users and/or perceptible only by the user of the electronic device.

Electronic circuits and/or processing units may determine whether to produce a tactile output and may determine the type of tactile output to be produced. In some embodiments, an electronic circuit and/or processing unit considers user preferences in determining whether to produce a tactile output and/or what type of tactile output to produce. The triggering and type of tactile output may be tuned or adjusted by a user.

As one non-limiting example of a type of tactile output, tactile features such as protrusions (e.g., bumps or ridges) or indentations (e.g., cavities, depressions, channels) may be activated (e.g., formed) on a particular portion of an exterior surface of an electronic device. The tactile features convey to the user that an event of interest has occurred and/or information regarding operation of the device. The tactile features may be activated in groups or individually, and may be activated on any exterior surface of the electronic device. For example, the one or more tactile features may be activated on a lower front face of a mobile phone or on the upper portion of the back of a mobile phone. Similarly, one or more tactile features may be activated on an outer surface of an enclosure of a smart watch, an exterior surface of an enclosure of an audio device, or in a region adjacent a touchpad of a laptop computer. In some embodiments, the tactile features may persist in a static configuration to produce a static tactile output. In some embodiments, the tactile features may move to produce a dynamic tactile output. In some embodiments, the tactile features are activated on an input structure. Here, protrusions and indentations include any deformation or deviation to a surface from a nominal or baseline state, to include bumps, ridges, cavities, depressions, and the like.

As another non-limiting example of a type of tactile output, a tactile feature such as an input/output member or other component forming an exterior surface of the device may be moved. Motion of the tactile feature may include rotation about an axis, precession, tilting, extension, retraction, motion along or across a surface, and the like). For example, the tactile feature may be an input/output member, such as a component of a button or other input structure that is configured to move as described.

As another non-limiting example of a type of tactile output, a material property of a portion of an electronic device may be altered or changed. For example, with respect to a laptop electronic device, a region adjacent a trackpad and below a keyboard may become less rigid and/or more elastic to provide a tactile output. The region adjacent a trackpad and below a keyboard of a laptop is typically contacted by the heel of a user's hands when typing, thereby providing a natural tactile contact point between a user and the laptop. A "material property," as used herein, is a physical or structural characteristic of a material. Stiffness, hardness, compressibility, volume, dimension (e.g., height, width, and length), elasticity, shape, and other mechanical, structural, and/or physical properties are all examples of material properties. This type of tactile output may be static, dynamic, or some combination thereof.

As another non-limiting example of a type of tactile output, the texture of a portion of an electronic device may be altered or adjusted. For example, the texture of a portion of or substantially all of a trackpad of a laptop may be adjusted to become more or less rough. Similarly, the texture of the inward facing portion of a watch, which sits against the skin of a user, may be adjusted in texture. Such changes in texture provide a tactile output to the user of the electronic device. Note that the tactile output may be implemented to directly adjust or change an exterior surface of an electronic device (e.g. a watch exterior) or to adjust an accessory surface, such as a tactile output plate, disposed on a surface of the electronic device. Such a tactile output plate is in communication with the electronic device. This type of tactile output may be static, dynamic, or some combination thereof.

As another non-limiting example of a type of tactile output, the response of a component of an electronic device may be adjusted. For example, the response of space key on a keyboard of a laptop may be adjusted to be stiffer or less elastic to provide tactile output. Similarly, another key or set of keys, such as the set of number keys, could become less stiff and more elastic to provide a tactile output. With respect to a portable electronic device, opposing edges of an enclosure of the portable device may become more elastic, such that when a user holds the device it feels more elastic, thereby conveying a tactile output. This type of tactile output may be static, dynamic, or some combination thereof.

Types of tactile outputs may be combined in one or more tactile output regions. For example, one or more protrusions may be formed on an upper backside of an electronic device, in addition to a change in texture for the lower portion of the backside of the electronic device. The combination of tactile output types may convey separate information and/or related information. In embodiments implementing tactile notifications, two notifications of two unrelated events of interest, or provide a modifier to one event of interest. For example, the protrusion may indicate receipt of a new text message, and the texture change may indicate a new voicemail. Alternatively, the protrusion may indicate a new text message, and the texture change may indicate the text message is of highest urgency.

The physical implementation of the tactile outputs may be performed in any of several ways. For example, an actuator, such as an electromechanical actuator, may be positioned inwards from an exterior surface of an electronic device, such that, with actuation, activation and/or motion of a tactile feature occurs. For example, actuation of the actuator may cause a deformation of a portion of the exterior surface. The actuator may extend toward the exterior surface so as to deform the exterior surface and create any of several tactile features, such as a protrusion. Alternatively, the actuator may retract the exterior surface so as create an indentation. Additionally or alternatively, the actuator may cause a tactile feature to move, including rotation, precession, tilting, or other motion. "Actuator," as used herein, means any mechanism to effect a change to a material property of a component or cause motion of a component.

The tactile outputs may be provided in cooperation with variable response materials that react to one or more inputs, including electrical current, magnetic field, temperature, illumination, ultrasonic waves, etc. The variable response materials may change shape, mechanical moduli, and other material properties rapidly and reversibly, under influence of the inputs. For example, a thermally-responsive material may be fitted to a portion of an electronic device such that, upon receipt of a thermal input (e.g. a heat input), the thermally-responsive material expands so as to form a tactile feature, such as a protrusion, on a portion of the electronic device. Similarly, a light-sensitive material may expand or contract with exposure to light, thereby changing one or more material dimensions. As a further example, an electroactive material, such as an electroactive polymer may expand or contract with exposure to electrical current, thereby changing one or more material dimensions. As still a further example, a magneto-rheological (MR) material may change shape, mechanical moduli, and other material properties with exposure to a magnetic field.

The tactile outputs may be provided in cooperation with nanostructure materials and/or nanoscale actuators. For example, an upper layer of an exterior surface of an electronic device may be fitted with a nanostructure material to allow tactile features to be formed on the exterior surface. Alternatively or additionally, multiple actuators, such as multiple nanoscale actuators, may be fitted beneath an exterior surface of an electronic device to effect formation of one or more tactile features on the exterior surface.

A processing unit and/or controller of the electronic device may be used to control the tactile output need, type, and execution. More specifically, a processing unit of an electronic device may detect a triggering condition for a tactile output. The processing unit may then select a tactile output type to be provided to the user. The processing unit transmits a tactile output signal to one or actuators coupled to the exterior surface of the electronic device. The one or more actuators then actuate to provide the tactile output. In some embodiments, the processing unit may detect a change condition that indicates that the tactile output should be changed. The processing unit may transmit a signal to the one or more actuators to change the tactile output. The one or more actuators then actuate to provide the changed tactile output.

Triggering conditions and change conditions, collectively "tactile output conditions," may include events, operations, and conditions associated with the electronic device. Tactile output conditions may include notification events. A notification event may be of any of several types of events associated with an electronic device, to include text messages, incoming phone calls, voicemails, arrival of e-mails, notice of calendar events, etc. Other example notification events include hardware events, such as a low battery notice or overheat notice, communication events such as a loss of Wi-Fi or a query from an adjacent electronic device, and memory events, such as an inability to operate a camera due to insufficient memory space. Other notification events are possible, such as updates to social media accounts or newsfeeds, etc. Tactile output conditions may further include media playback operations, loading and waiting operations, pairing operations, communication operations, authentication operations, charging operations, execution of applications, and the like. As used herein, "operations" includes both states and events. For example, media playback operations may include media playback states, such as whether playback is paused or playing and volume levels, and media playback events, such as transitions between media items and volume level changes.

The processing unit may base the selection of tactile outputs at least in part on a user notification profile. The user notification profile maps tactile output conditions with tactile outputs, and thus allows a user to tune the tactile outputs to her preferences. For example, a particular user notification profile may provide that all new text messages result in a protrusion formed in an upper left corner on the backside of a mobile phone. Also, the user notification profile may provide that all new electronic mails not result in a tactile output unless the email is from a designated sender, in which case a ridge is to be formed on the lower front face of the mobile phone.

A user notification profile may communicate and/or query data residing on the electronic device or accessible by way of the electronic device (e.g. by way of cloud data storage services.) For example, the user notification profile may communicate with contact data lists, records of incoming calls, emails and/or text messages, parties in which the user has upcoming and/or recent calendared meetings, etc.

These and other embodiments are discussed below with reference to FIGS. 1-27. However, those skilled in the art will readily appreciate that the detailed description given herein with respect to these Figures is for explanatory purposes only and should not be construed as limiting.

FIG. 1 illustrates one example of an electronic device 100, configured as a wearable computing device (e.g., an electronic watch). The electronic device 100 is depicted as a watch with tactile notification region 101, enclosure 120, crown 102, display 103, and watchband 104. The tactile notification region 101 is positioned on a wall of the enclosure 120 adjacent the button 105. The display 103 is positioned at least partially within the enclosure 120 and may be covered with a cover sheet or other transparent protective cover. The watch crown 102 and the button assembly are at least partially positioned within respective openings in the enclosure 120.

One or more tactile notifications (e.g., static tactile outputs) may be provided in the tactile notification region 101. The tactile notifications may be provided by one or more tactile features. For example, the tactile notification may be provided by one or more tactile features, such as e.g., one or more protrusions formed or produced in the tactile notification region 101 and/or a change in surface texture in the tactile notification region 101.

The tactile notification region 101 may be positioned on a component of the electronic device 100 other than a wall of the enclosure 120. For example, the tactile notification region 101 may be positioned on a surface of the crown 102, display 103, and/or button. The tactile notification region 101 may be positioned on an accessory that fits to the enclosure 120, such as a tactile notification plate (See FIGS. 3B-C for further discussion of such an embodiment.) The tactile notification region 101 may cooperate with components or elements of the electronic device 100 in any of several ways. For example, a first tactile notification region 101 positioned on a wall of the enclosure 120 may provide a tactile feature, such as a protrusion, to provide a tactile notification in response to a notification event. A user may notice the protrusion, prompting interaction with display 103 to receive the content associated with the tactile notification. Upon dispositioning of the associated content (e.g. perhaps listening to a voicemail, the voicemail being the content associated with the tactile notification), the actuator would retract, thereby removing the protrusion, the tactile notification region 101 would return to a nominal or rest state devoid of any tactile features, thereby ceasing the tactile notification.

The enclosure 120 provides a device structure, defines an internal volume of the electronic device 100, and houses device components. In various embodiments, the enclosure 120 may be constructed from any suitable material, including metals (e.g., aluminum, steel, titanium), polymers, ceramics (e.g., zirconia, glass, sapphire), and the like. In one embodiment, the enclosure 120 is constructed from multiple materials. The enclosure 120 can form an outer surface or partial outer surface and protective case for the internal components of the electronic device 100, and may at least partially surround the display 103. The enclosure 120 can be formed of one or more components operably connected together, such as a front piece and a back piece. Alternatively, the enclosure 120 can be formed of a single piece operably connected to the display 103.

As shown in FIG. 1, the electronic device 100 also includes a display 103 that can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 103 provides a graphical output, for example associated with an operating system, user interface, and/or applications of the electronic device 100. In one embodiment, the display 103 includes one or more sensors and is configured as a touch-sensitive (e.g., single-touch, multi-touch) and/or force-sensitive display to receive inputs from a user. The display 103 is operably coupled to a processing unit of the electronic device 100 and, in various embodiments, a graphical output of the display 103 is responsive to inputs provided in response to the tactile notification region 101.

The wearable electronic device 100 can be permanently or removably attached to the watchband 104. The watchband 104 is configured to couple or attach the watch to a user. The watchband can be made of any suitable material, including, but not limited to, leather, metal, polymer, fabric, and composites of multiple materials. In the illustrated embodiment, the watchband is a watchband that wraps around the user's wrist. The watchband can include an attachment mechanism, such as a bracelet clasp, and magnetic connectors. In other embodiments, the watchband can be elastic or stretchable such that it fits over the hand of the user and does not include an attachment mechanism.

As shown in FIG. 1, the electronic device 100 is implemented as a watch. Other embodiments, however, are not limited to this type of electronic device. Other types of computing or electronic devices can include a laptop, a phone, ear buds or other wearable audio device, a headset (such as a virtual and/or augmented reality headset), a tablet computing device, other wearable computing or display device (such as glasses, jewelry, clothing or the like to include backpacks), a digital camera, a printer, a scanner, a video recorder, a copier, a touch screen, and the like.

Figure 2:
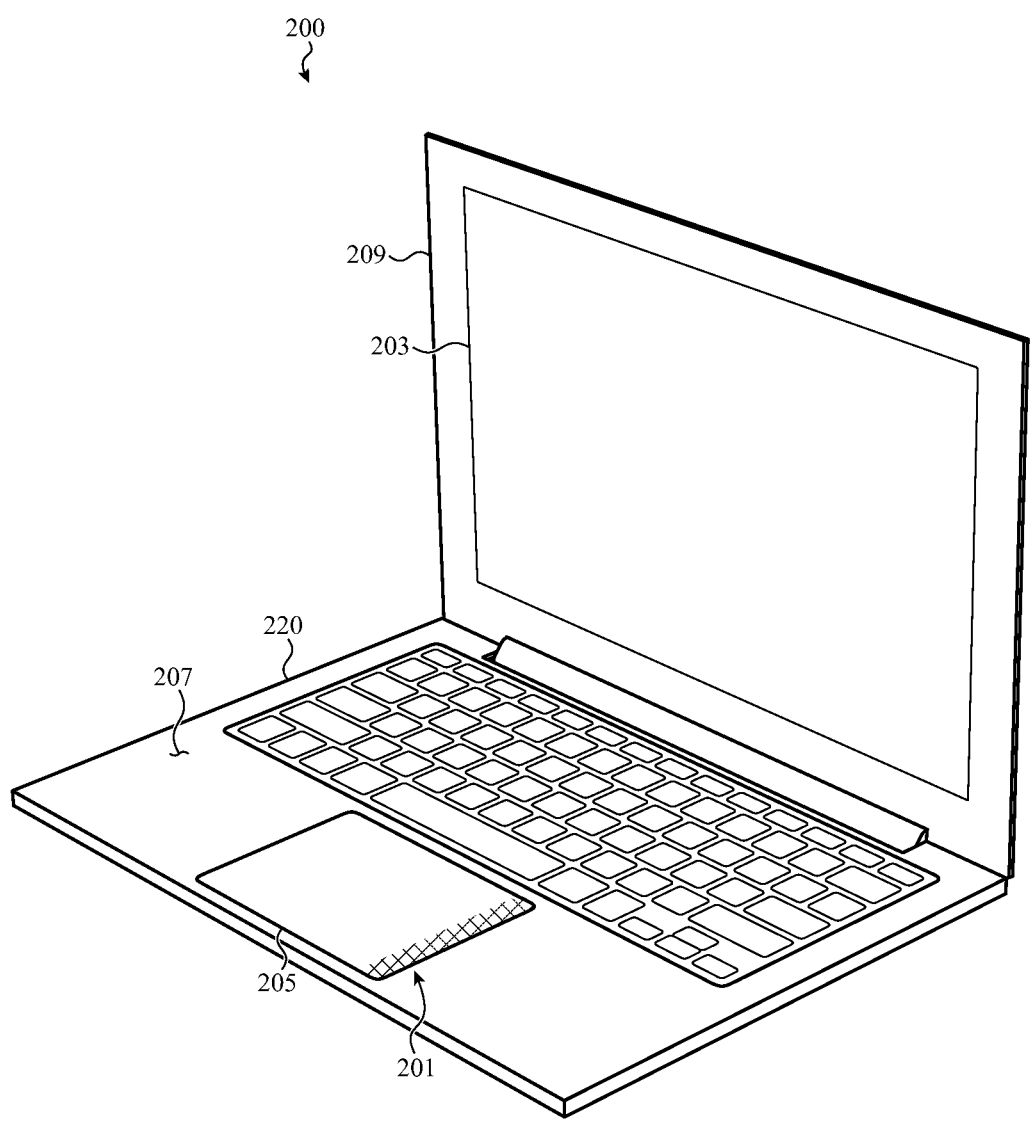
FIG. 2 illustrates another example of an electronic device with a tactile notification region.

FIG. 2 illustrates another example of an electronic device 200, configured as a laptop. The electronic device 200 is depicted as a laptop with tactile notification region 201, enclosure 220 with base face region 207, display 203, and display edge 209. The tactile notification region 201 is positioned on a portion of the trackpad 205. The display 203 is connected to the enclosure 220 portion of the laptop with a hinge.

The tactile notification region 201 is positioned on a portion of the trackpad 205. Other positions for the tactile notification region 201 are possible. For example, alternatively or additionally, a tactile notification region 201 may be positioned on the base face region 207, a wall such as a side wall of the enclosure 220, and the display edge 209. Alternative embodiments of the tactile notification region 201, and alternative embodiments of types of tactile notifications, are described below with respect to FIGS. 10-11.

The tactile notification region 201 may interact with one or more components of the electronic device 200 in any of several ways. For example, a tactile notification produced on a portion of the trackpad 205 may be acknowledged by a specific set of keystrokes by the user on the keyboard. The sequence of keystrokes may result in a removal of the tactile features corresponding to the particular tactile notification. As another example, an icon may appear in a designated location of the display 203 of the electronic device 200 upon the passing of a set amount of time from appearance of a tactile notification on the trackpad 205. Such an icon supplements the particular tactile notification.

The display 203 can be implemented with any suitable technology, similar to the display 103 of FIG. 1. The display 203 provides a graphical output, for example associated with an operating system, user interface, and/or applications of the electronic device 100. The display 203 is operably coupled to a processing unit of the electronic device 100. In various embodiments, a graphical output of the display 203 is responsive to inputs provided in response to the tactile notification region 201.

The enclosure 220 provides a device structure and houses device components, such as a processing unit. In various embodiments, the enclosure 220 may be constructed from similar materials to the enclosure 120 of FIG. 1.

Figure 3A:
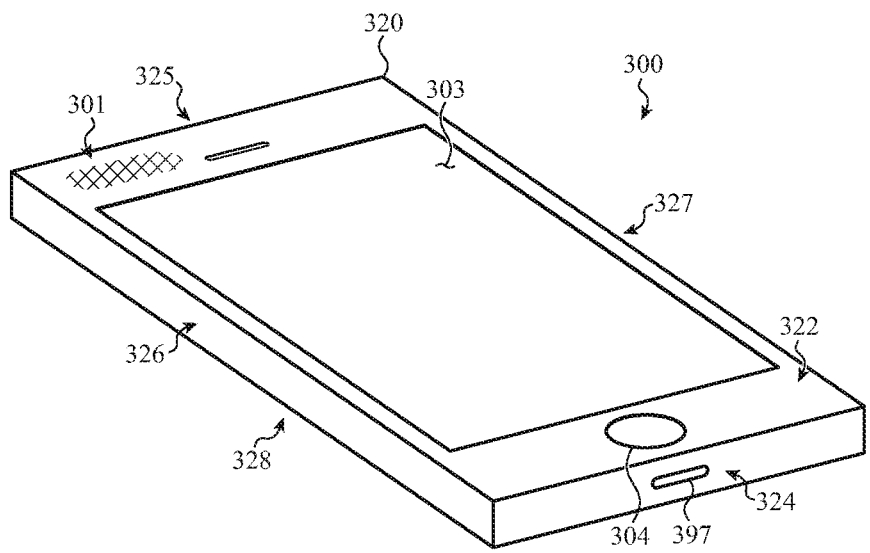
FIG. 3A illustrates another example of an electronic device with a tactile notification region.

FIG. 3A illustrates another example of an electronic device 300, configured as a mobile phone. The electronic device 300 is depicted as a mobile phone with tactile notification region 301, enclosure 320, display 303, and button 304. The enclosure 320 has a lower sidewall 324, upper sidewall 325, left sidewall 326, and right sidewall 327. The sidewalls collectively form a perimeter sidewall of the enclosure 120. The enclosure 320 has a backside 328 positioned opposite the front side 322.

The tactile notification region 301 is positioned on a portion of the front side 322. Specifically, the tactile notification region 301 is positioned on an upper left side portion of the front side 322, above the display 303. Other positions for the tactile notification region 301 are possible. For example, alternatively or additionally, a tactile notification region 301 may be positioned on a lower portion of the front side 322, below the display 303, one or more of the lower sidewall 324, upper sidewall 325, left sidewall 326, and right sidewall 327, and/or on the backside 328. Alternative embodiments of the tactile notification region 301, and alternative embodiments of types of tactile notifications, are described below with respect to FIGS. 6-9.

The display 303 can be implemented with any suitable technology, similar to the display 103 of FIG. 1. The display 303 provides a graphical output, for example associated with an operating system, user interface, and/or applications of the electronic device 100. The display 303 is operably coupled to a processing unit of the electronic device 100. In various embodiments, a graphical output of the display 303 is responsive to inputs provided in response to the tactile notification region 301. The enclosure 320 provides a device structure and houses device components, such as a processing unit. In various embodiments, the enclosure 320 may be constructed from similar materials to the enclosure 120 of FIG. 1.

Figure 3B:
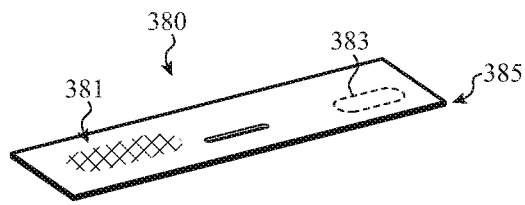
FIG. 3B illustrates an example of a tactile notification plate with a tactile notification region.
Figure 3C:
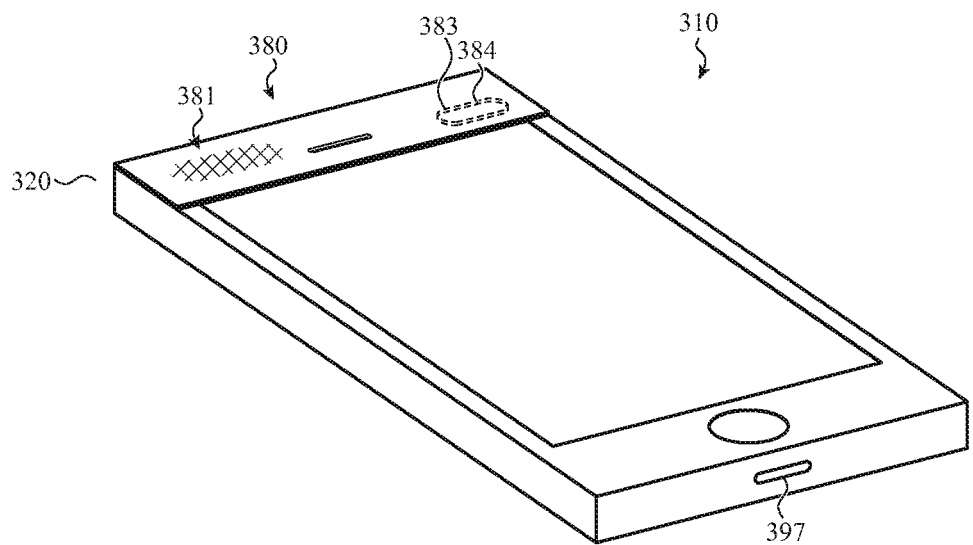
FIG. 3C illustrates the tactile notification plate of FIG. 3B engaged with an electronic device.

FIGS. 3B-C illustrate another embodiment of an electronic device 310, configured as a mobile phone, similar to the embodiment of an electronic device 300 of FIG. 3A. However, the embodiment of the electronic device 310 of FIGS. 3B-C may be attached to, or otherwise associated with, a tactile notification plate 380 defining a tactile notification region 381. The tactile notification plate 380 is a detachable component that is geometrically conformal with the electronic device 310. More specifically, the tactile notification plate 380 is geometrically aligned with the shape of the upper portion of the enclosure 320. One or more actuators are disposed below the tactile notification region 381 and within a thickness 385 of the tactile notification plate 380. The tactile notification plate 380, and thus also the tactile notification region 381, are disposed on the exterior surface of the enclosure 320.

The tactile notification plate 380 has a plate connector 383 which communicates with a device connector 384 of the electronic device 310. The communication between the electronic device 310 and the tactile notification plate 380 allows the processing unit of the electronic device 310 to determine or detect a notification event and transmit a signal in response to the notification event to the tactile notification plate 380. The signal transmitted from the electronic device 310 to the tactile notification plate 380 in turn allows the one or more actuators of the tactile notification plate 380 to activate and produce, for example, a sustained notification on the tactile notification region 381 of the tactile notification plate 380.

The plate connector 383, through connection with the device connector 384 of the electronic device 310, may also provide electrical power to the plate connector 383. In one embodiment, the plate connector 383 includes an internal battery to power, for example, the one or more actuators. The internal battery of the plate connector 383 may draw electrical power from the electronic device 310 or from an external power source, to include drawing electrical power from the electronic device 310 or from an external power source at the same time as the electronic device 310 is charging.

The tactile notification plate 380 may be disposed in or on other locations on the electronic device 310, to include below the display 303, on one or more of the lower sidewall 324, upper sidewall 325, left sidewall 326, and right sidewall 327, and/or on the backside 328. In one embodiment, the tactile notification plate 380 is a housing and/or a case that surrounds or encases the electronic device 310. Any of the embodiments of the various electronic devices of the disclosure may include one or more tactile notification plates to implement one or more tactile notification regions.

Figure 3D:
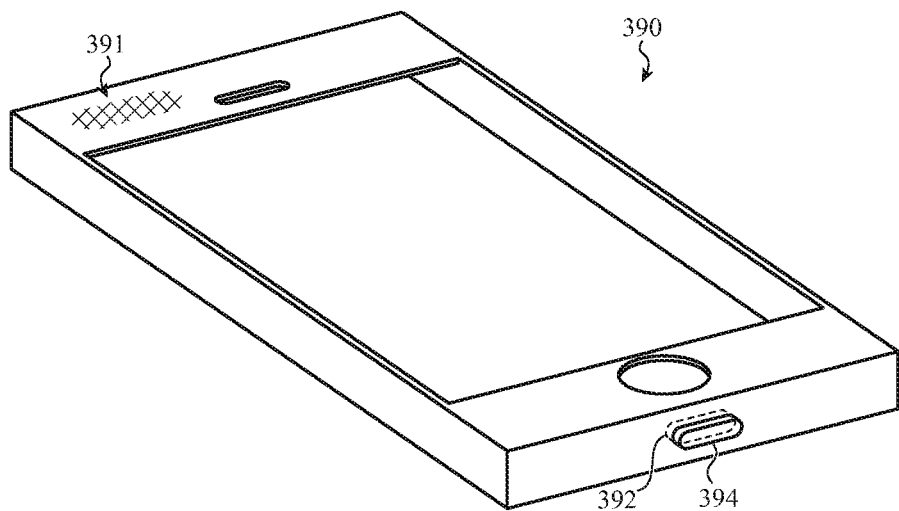
FIG. 3D illustrates an example of a tactile notification case with a tactile notification region.
Figure 3E:
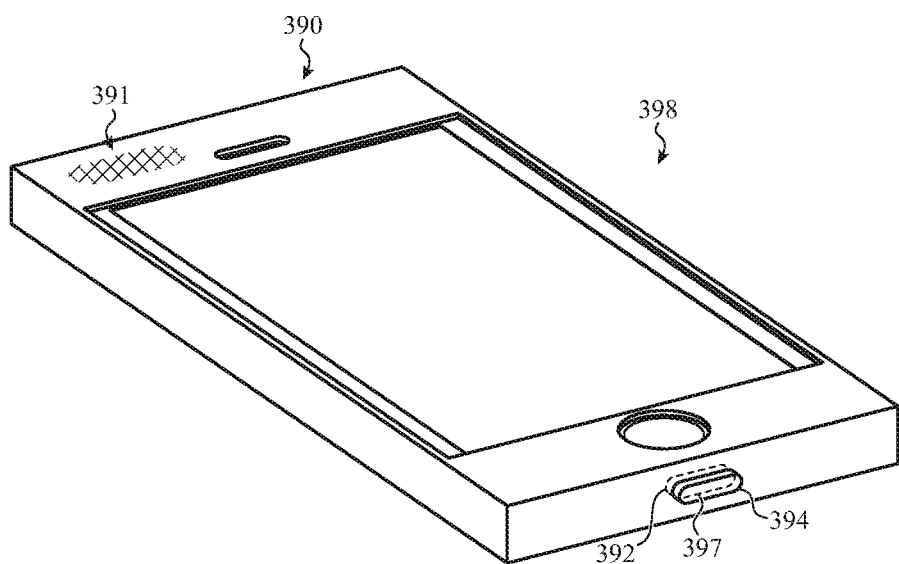
FIG. 3E illustrates the tactile notification case of FIG. 3D engaged with an electronic device.

FIGS. 3D-E illustrate an electronic device, configured as a mobile phone. Here, the electronic device of FIGS. 3D-E is covered, mated, to, coupled, with, or otherwise associated with a tactile notification case 390. In the illustrated embodiments, the tactile notification region 391 is defined on (e.g., as part of) the tactile notification case 390 instead of the electronic device. The tactile notification case 390 is a detachable enclosure that is geometrically conformal with the electronic device 310. Stated another way, the tactile notification case 390 at least partially encases the electronic device 310. Specifically, the tactile notification case 390 may include an enclosure that encircles at least a portion of the electronic device. The tactile notification case 390 is configured to engage the communications and/or charging port 397 of the electronic device. One or more actuators are disposed below the tactile notification region 391 and within the enclosure of the tactile notification case 390. The tactile notification case 390, and thus also the tactile notification region 391, are disposed on the exterior surface of the electronic device.

The enclosure of the tactile notification case 390 is configured to engage the communications and/or charging port 397 of the electronic device to communicate with the electronic device and optionally draw electrical power from the electronic device. In one embodiment, the tactile notification case 390 includes an internal battery to power, for example, the one or more actuators. The tactile notification case 390 has a first case connector 392 which connects with the communications and/or charging port 397 of the electronic device. The first case connector 392 communicates with the electronic device by way of a communications port 397, such that communications (e.g., signals) from the processing unit of the electronic device are received. The communication between the electronic device and the tactile notification case 390 allows the processing unit of the electronic device to determine or detect a notification event and transmit a signal in response to the notification event to the tactile notification case 390. The signal transmitted from the electronic device to the tactile notification case 390 in turn allows the one or more actuators of the tactile notification case 390 to activate and produce, for example, a sustained notification on the tactile notification region 391 of the tactile notification case 390. In one embodiment, the first case connector 392 may draw electrical power from the electronic device by way of the communications and/or charging port 397.

The tactile notification case 390 may include a second case connector 394 that connects the communications and/or charging port 397 of the electronic device 310 to an external power supply or other electronic device. The second case connector 394 may thus facilitate connection between the communications and/or charging port 397 of the electronic device 310 and an external power source, as one example. Further, when an external power source is so connected, the tactile notification case 390 may likewise draw power from the external source. Such power may be stored in a battery within the case and used to power the actuators, as one non-limiting example. As another non-limiting example, the case may provide power to the electronic device and thus act as an external battery. In one embodiment, only one of the first case connector 392 and the second case connector 394 are provided, and/or the described functionalities of the first case connector 392 and the second case connector 394 may be combined.

Generally, it should be understood that discussions herein of electronic devices, their functionality, and general operation are also intended to refer to cases 390, plates 380, and other accessories.

Figure 4:
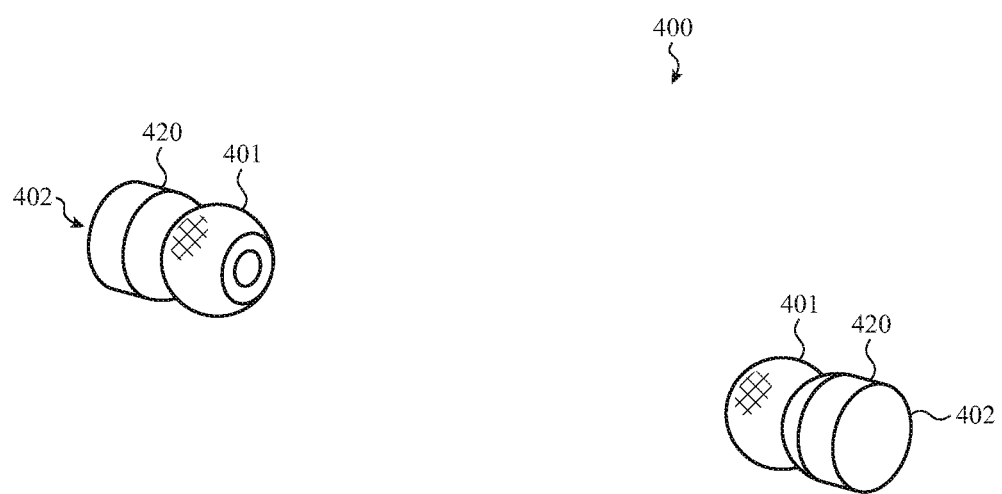
FIG. 4 illustrates another example of an electronic device with a tactile notification region.

FIG. 4 illustrates another example of an electronic device 400, configured as ear buds. The electronic device 400 is depicted as ear buds with tactile notification region 401. The electronic device 400 includes an enclosure 420 with ear bud distal end 402.

The tactile notification region 401 is positioned on a portion of the ear bud that contacts the ear channel. As an example implementation, the tactile notification region 401 of the electronic device 400 may slightly expand the diameter of a portion of the ear bud that contacts the ear channel of the user, thereby providing a tactile notification. Other positions for the tactile notification region 401 are possible. For example, alternatively or additionally, a tactile notification region 401 may be positioned on a portion of the ear bud that does not contact the ear channel, such as ear bud distal end 402.

The tactile notification region 401 may interact or communicate with components of the electronic device 400, such as a processing unit or controller of the electronic device 400. For example, a user may configure or select the electronic device 400 to solely produce a tactile notification on the tactile notification region 401 in the event of a phone call from his spouse. Such a configuration restriction would thus be imposed on the tactile notification region 401. As another example, a processing unit of the electronic device 400 may provide calibration settings to the tactile notification region, such as baseline settings regarding the degree of expansion allowed of the ear buds when producing a tactile notification.

Figure 5:
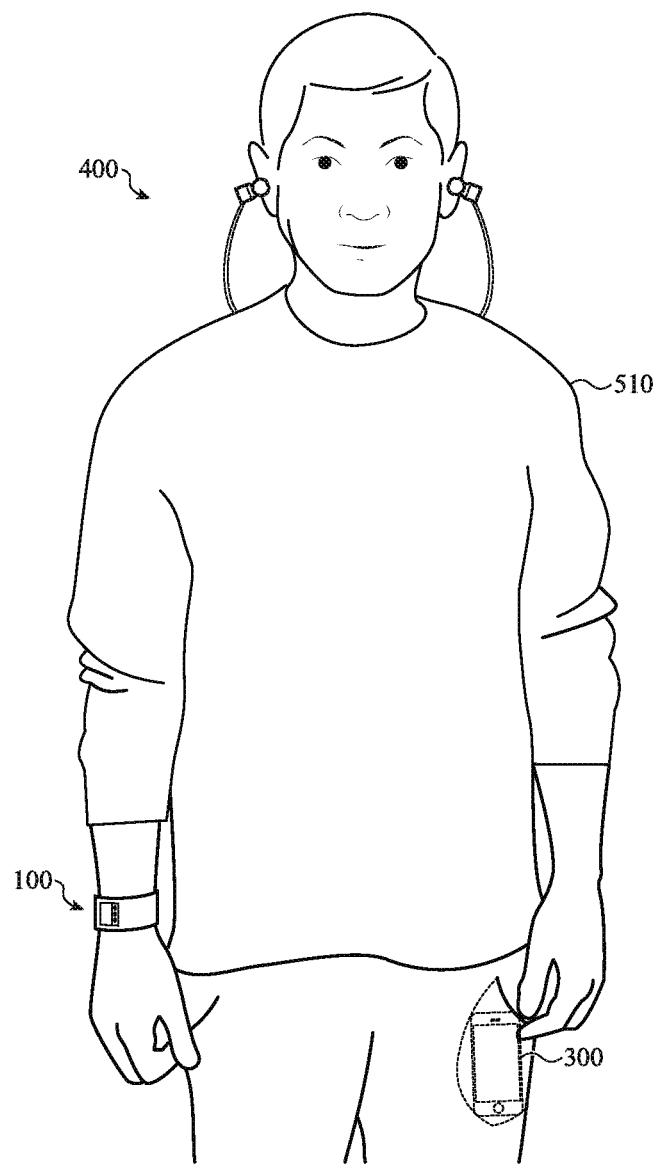
FIG. 5 illustrates a user interacting with several electronic devices.

FIG. 5 illustrates a user interacting with several electronic devices 100, 300, and 400, each configured with a respective tactile notification region (not shown). Specifically, in this example, the user 510 is depicted wearing electronic devices 100 and 400, and carrying electronic device 200.

The respective tactile notification regions of each of electronic devices 100, 300, and 400 may be configured by the user 510 to provide different types of tactile notifications reflecting the electronic device type, information received by the device (or another device), and the preferences of the user. Thus, a user may personalize event notification settings, to include tactile notification settings, on a per-event type and/or per-device type manner.

For example, the tactile notification region of the electronic device 400 (ear buds) may be configured, by the user, to only activate in the event of a specified communication event (e.g. a phone call, a text message, an electronic mail.) The tactile notification region of the electronic device 400 may be implemented to provide a slight expansion of the diameter of a portion of the ear bud that contacts the ear channel of the user. Such a tactile notification is generally sensed by the user relatively immediately. In contrast, while notification of a communication from a designated friend of the user 510 is of high importance, notification of a particular personal matter is of lesser importance. As such, the user 510 may appropriately tune or set the tactile notifications of another device to provide a notification less intrusive.

Continuing the example scenario, the tactile notification region of the electronic device 300 (mobile phone) may activate to provide a tactile notification only in the event of a text message or electronic mail from a bus service to be used later in the day. The tactile notification may be provided by a set of tactile features (e.g., protrusions) on the backside of the electronic device 300. Because the electronic device 300 is being carried in a pocket of the user 510, the tactile notification of the electronic device 300 may not be immediately sensed, or sensed at all, by the user. Indeed, the user 510 would have to touch the electronic device 300 to feel the protrusions on the backside of the electronic device 300, thereby sensing the tactile notification.

Figure 6A:
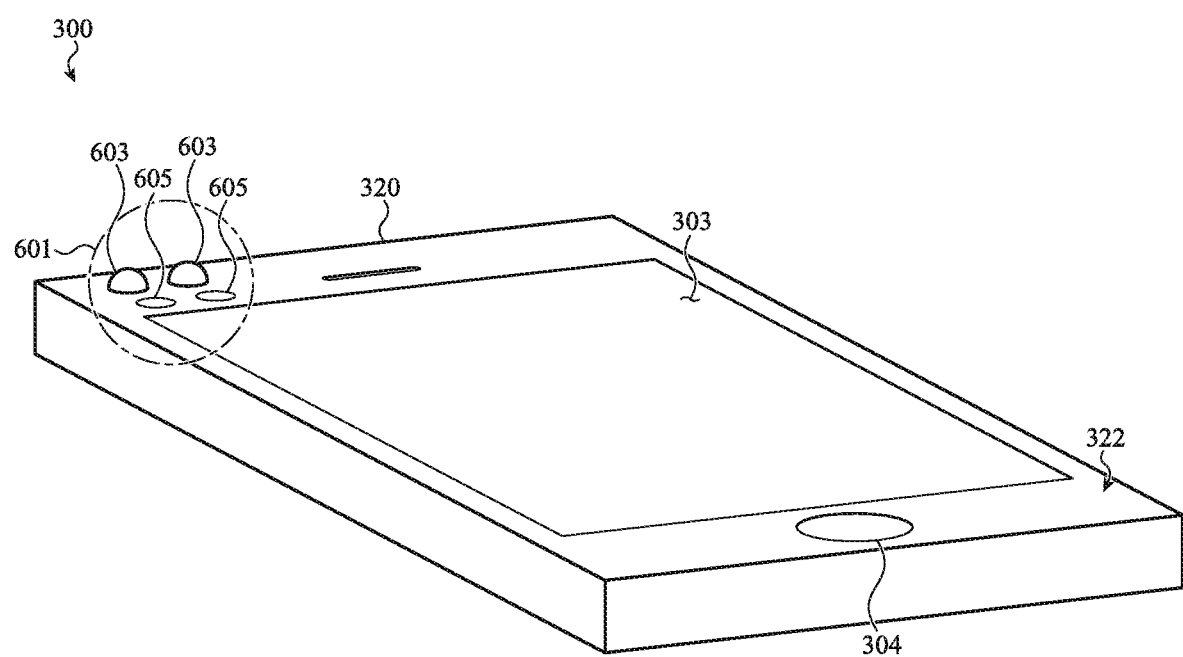
FIG. 6A is a sample view of one embodiment of a tactile notification region of an electronic device in a first state.
Figure 6B:
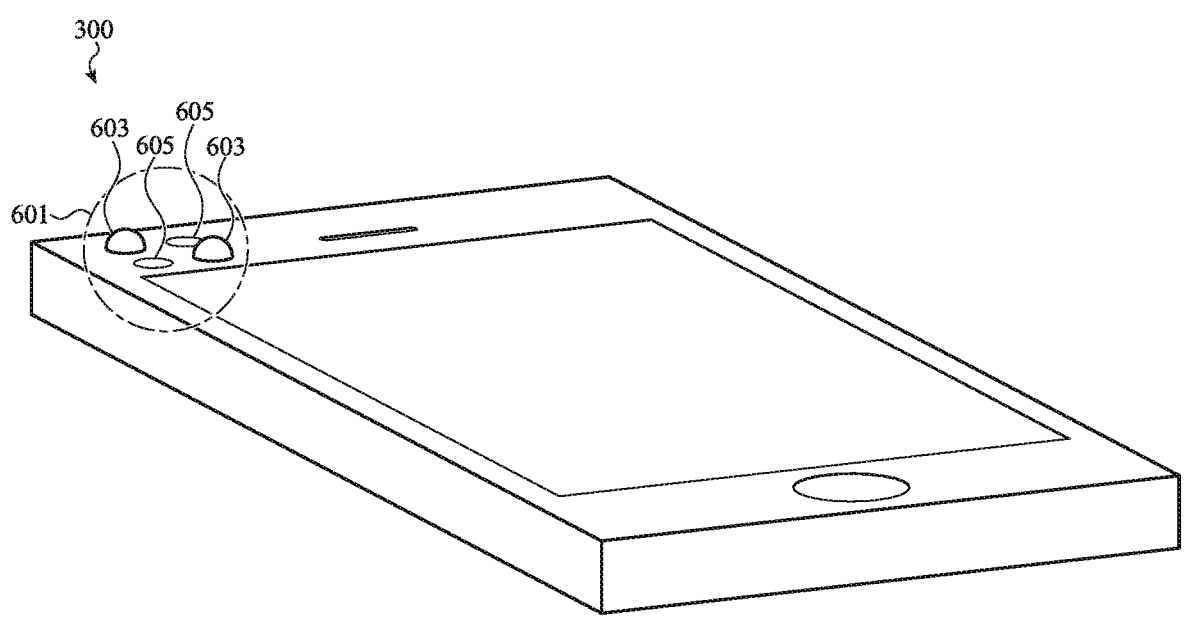
FIG. 6B is a sample view of the embodiment of the tactile notification region of FIG. 6A in a second state.

FIGS. 6A-B illustrate sample views of another embodiment of a tactile notification region 601 of an electronic device 300. The electronic device 300 is depicted as a phone with tactile notification region 601, enclosure 320, display 303, and button 304. The enclosure 320 has a front side 322. The tactile notification region 601 is positioned on the upper portion of front side 322, although this is only one example placement for the tactile notification region 601. In other embodiments, the tactile notification region 601 may be positioned on a lower region of the front side, a sidewall, the back side of the device, and so on.

The tactile notification region 601 is a region in which one or more tactile features may provide tactile notifications to a user of an electronic device. As discussed above, the tactile features may take any of a variety of forms. For example, the tactile features may take the form of a physical feature in the tactile notification region 601 (e.g., a raised or lowered surface) or a change in a material feature of a surface of the tactile notification region 601 (e.g., roughness, elasticity, stickiness, and so on). The tactile notification region may be indistinguishable from one or more additional portions of the electronic device in the absence of a tactile feature (e.g., it may appear and/or feel the same as the surrounding portions of the enclosure or other portions of the electronic device).

With attention to the embodiment of FIGS. 6A-B, the example tactile notification region 601 depicts an example type of tactile feature for providing a tactile notification: a protrusion depicted as a bump. In some embodiments, the protrusion has two states: active and inactive. In the activated state, the protrusion is deployed (e.g., raised or actuated) from the housing. In the deactivated state, the protrusion is retracted (e.g., flush with the housing or otherwise inactive). In the example of FIGS. 6A-B, the tactile notification region 601 includes four protrusions arranged in a square two-by-two pattern. In FIG. 6A, the upper two protrusions 603 are activated, and the two lower protrusions 605 are activated. In FIG. 6B, each of the two rows of protrusions has one activated protrusion 603 and one deactivated protrusion 605, forming a diagonal of activated protrusions 603 and deactivated protrusions 605.

Activation (e.g., deployment) of the tactile features in the tactile notification region 601 may convey tactile notifications to a user of electronic device 300. For example, one or more of the protrusions in an activated state may convey that an event of potential interest has occurred. In contrast, one or more protrusions in a deactivated state may indicate to the user that an event of potential interest has not occurred. For example, all of the protrusions being in a deactivated state may indicate that an event of potential interest has not occurred. In such a configuration, the tactile notification region 601 may appear indistinguishable from the remaining portion of the front side 322 portion of the enclosure 320 of the electronic device. This configuration may be considered a nominal or baseline state of the tactile notification region 601.

The configuration of the tactile features (e.g., protrusions and other physical and/or material features) of the tactile notification region 601 may convey additional information to the user beyond that of a binary notification that an event of interest has or has not occurred. For example, the configuration of the tactile features may indicate the urgency of a particular notification. As another example, the tactile features may be deformable or substantially rigid to indicate the source of the notification.

As one non-limiting example and with respect to the upper row of two protrusions in FIGS. 6A-B, the state of the upper left protrusion may indicate that an event of interest has or has not occurred, and the state of the adjacent upper right protrusion may indicate a relative urgency. As such, in FIG. 6B, the configuration of the upper row of protrusions indicates an event has occurred (upper left protrusion activated), yet the adjacent protrusion is deactivated and thus indicates the event is of nominal urgency. In contrast, in FIG. 6A, the upper right and upper left protrusion are both activated, thus indicating both that an event has occurred (upper left protrusion activated) and that the event is of urgency (upper right protrusion activated).

The relative position of the tactile notification may also convey additional information beyond whether an event has occurred. For example, the relative position of the protrusions of the tactile notification region 601 may indicate a notification event type. With attention to the two rows of protrusions in FIGS. 6A-B, the upper row of protrusions may activate for notifications associated with text messages, while the lower row of protrusions may activate for notifications associated with phone communications.

The protrusions 603, 605 of the tactile notification region 601 may be deployed in other than a two-state manner to convey additional information. For example, a height of the protrusions may be varied, so as to deploy in a maximum height, as depicted in FIGS. 6A-B, and/or in one or more intermediate heights that are less than the maximum height. In one embodiment, actuators may retract into the housing of the electronic device, thereby forming a concave surface or protrusion (e.g., a divot).

The density or elasticity of one or more of the protrusions 603, 605 may be varied. Stated another way, one or more of the protrusions may be deformable. A variation in density, like a variation in height, may be used to convey additional information beyond whether an event has occurred. For example, a maximum height of activated protrusion 603 may be used only for notifications from a user-identified person or entity, such as a user's supervisor, leaving all other notifications to result in an activated protrusion 603 of a height less than maximum. Similarly, a relatively rigid (or less deformable) protrusion may indicate a notification that was provided past a threshold amount of time. For example, a notification over an hour old may result in a protrusion changing from a nominal level of elasticity (a more deformable state) to a lower level or elasticity and increased rigidity (a less deformable state.)

Any aspect of a notification corresponding to a given event of interest may be user-selectable. For example, a user may select that a protrusion be activated on the upper portion of her mobile phone (the notification implementation type) for all new voicemails (the notification event type). With respect to FIG. 6A, the user selection would result in a protrusion activated on the upper portion of the front side 322 of the enclosure 320 of the electronic device for all new voicemails. As another example, a user may select that all communications (text, electronic mail, phone call, etc.) from an identified party, such as a particular person or particular newsfeed, immediately result in a pair of protrusions on both sides of the home button on a mobile phone. With respect to FIG. 6A, a communication from the identified party may result in a protrusion on the front side 322 portion at the 3 and 9 o'clock positions relative to the button 304.

The mapping, or correlation, between tactile features and notification event types may be provided in a user notification profile. The user notification profile is accessed by a processing unit of the electronic device 300 to select the tactile feature type (e.g. a protrusion, a change in elasticity) to be applied to the tactile notification region 601 for a given notification event type (e.g. a text, a voicemail). The multiple notification event types may include text messages, phone calls, electronic mails, social media updates, and the like. The tactile features may include any of the tactile features discussed in this disclosure.

The notification implementation type may be produced by multiple actuators. With attention to FIG. 6A, multiple actuators are coupled to the tactile notification region 601 to actuate or operate or control the set of four protrusions. The multiple actuators, with respect to FIG. 6A, are depicted as activated protrusions 603 and deactivated protrusions 605. A deactivated protrusion may be imperceptible to a user. As discussed above, the multiple actuators may be any of several types known to those skilled in the art, to include electro-mechanical actuators and other actuators that may adjust a physical property of an exterior surface of an electronic device given an input signal. The multiple actuators operate to actuate at least a portion of the tactile notification region 601 with receipt of a tactile output signal from a processing unit of the electronic device. In one embodiment, each actuator provides a unique physical tactile notification, such as a unique tactile feature.

The one or more actuators may be disposed below, inward, or adjacent the tactile notification region 601. In one embodiment, the one or more actuators are embedded in at least a portion of the material forming the exterior surface of the tactile notification region 601. In one embodiment, the one or more actuators form a structural component of the tactile notification region. For example, the one or more actuators may form fibers of a composite material.

In one embodiment, the tactile notification provided in the tactile notification region 601 persists until a user affirmatively acknowledges the tactile notification or the underlying notification event that prompted the tactile notification. For example, with respect to FIG. 6A, the activated protrusions 603, providing a tactile notification of an event of interest, remain as activated protrusions 603 until a user performs some additional task. The additional task provides an affirmative acknowledgement. The required additional task may be, for example, listening to a voicemail (if, for example, the voicemail was the underlying notification event that prompted activation of the protrusion 603). The required affirmative acknowledgement task required of the user to deactivate a tactile feature to cease a tactile notification may be provided as part of the a fore-described user profile. Once the tactile feature is deactivated, the tactile notification is no longer provided to the user.

Figure 7A:
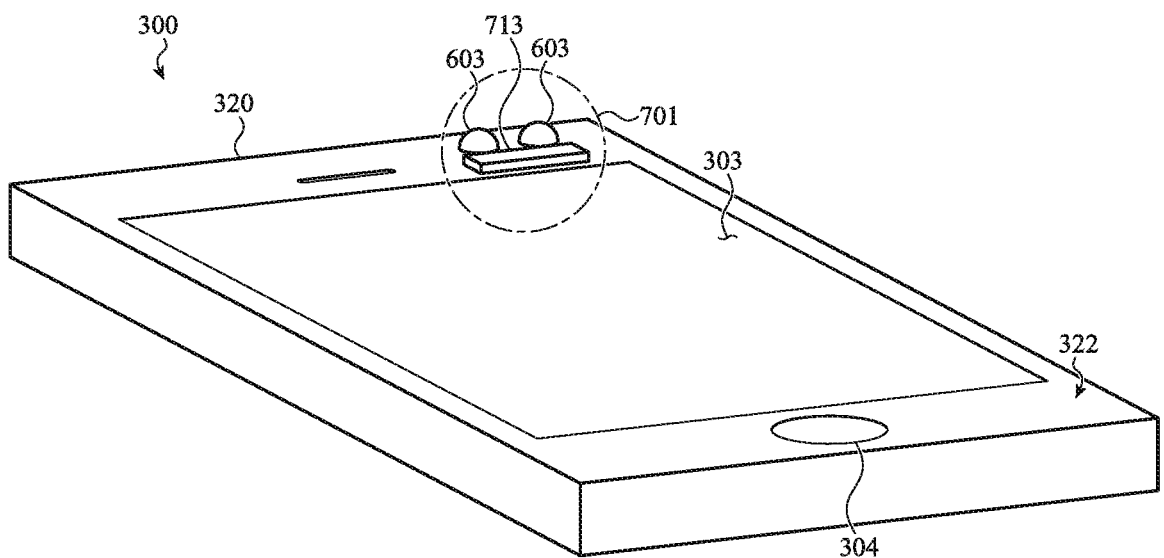
FIG. 7A is a sample view of another embodiment of a tactile notification region of an electronic device in a first state.
Figure 7B:
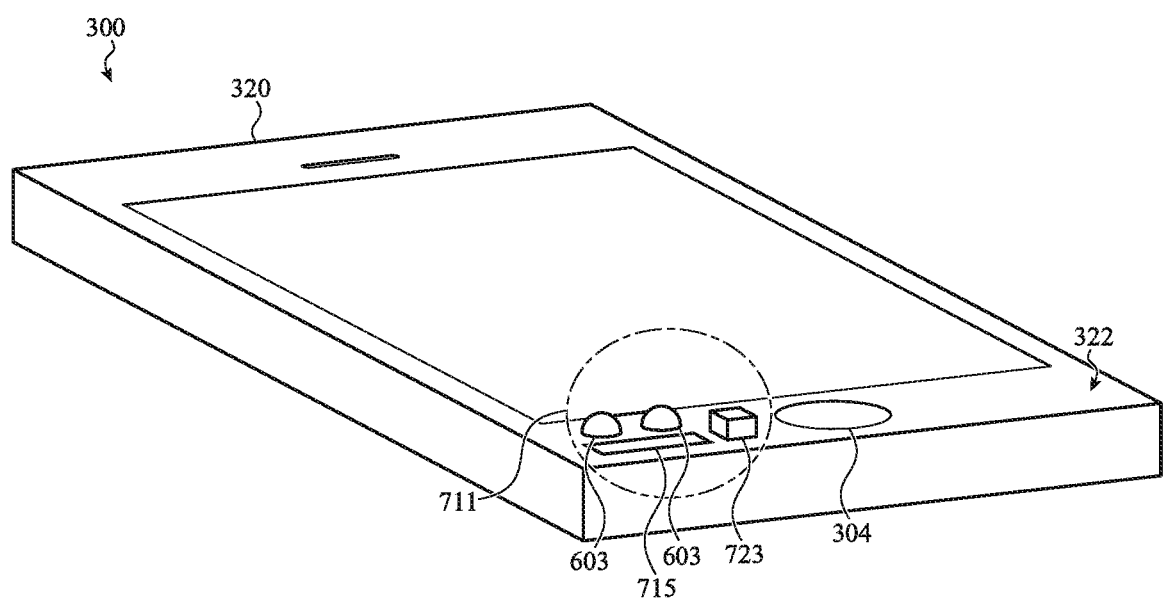
FIG. 7B is a sample view of the embodiment of the tactile notification region of FIG. 7A in a second state.

FIGS. 7A-B illustrate sample views of an alternate embodiment of a tactile notification region 701 of an electronic device 300. The electronic device 300 is depicted as a phone with tactile notification region 701, enclosure 320, display 303, and button 304. The enclosure 320 has a front side 322. In FIG. 7A, the tactile notification region 701 is positioned on the upper right portion of front side 322. In FIG. 7B, the tactile notification region 701 is positioned on the lower left portion of front side 322.

FIG. 7A shows two types of tactile features in tactile notification region 701: A pair of protrusions 603 and a ridge 713. FIG. 7B shows three types of tactile features in tactile notification region 711: A pair of protrusions 603, a ridge 715, and a square 723. The protrusions 603 and the square 723 are illustrated in an activated state. The ridge 715 is illustrated in a deactivated state. As discussed above, one or more of the tactile features shown in FIGS. 7A-B may be deformable.

Tactile features may be implemented as deformations to a surface of an electronic device in any of several ways. The above examples have provided non-limiting examples of surface deformations including protrusions, ridges, divots, and squares. Other geometrics are possible, to include crescents, craters, letters, and numbers.

The location of the tactile notification regions on the electronic device may convey information. With attention to the embodiments of FIGS. 7A-B, the relative location of the tactile notification regions 701 and 711, respectfully, may convey information associated with the tactile notifications within the tactile notification regions. For example, a user may select, by way of a user notification profile, that only certain special notification event types are to be implemented on the lower front region of a mobile phone (tactile notification region 711 of FIG. 7B), and all other notification event types are to be implemented on the upper front region of a mobile phone (tactile notification region 701 of FIG. 7A). For example, the user may select that all notifications communicated as urgent are designated as special notification event types. Thus, in the scenario depicted in FIG. 5 in which the user 510 is carrying his mobile phone electronic device 300 in a pocket, the user may simply feel the exterior of the mobile phone to determine if any deformations exist on the lower front side 322. If any deformations exist, the user 510 is notified that a notification event associated with the user's identified special notification event type (notifications communicated as urgent) has been received. In contrast, if the user feels the exterior of the mobile phone and determines that no deformations exist on the lower front side 322 of the mobile phone, the user 510 is notified that no notification events associated with the user's identified special notification event types have been received.

The location of the tactile notification regions on the electronic device may convey information other than receipt of a user-identified special notification event type. The relative location of the tactile notification region may provide a categorization as to the form of the notification event type. For example, a user may select that only notification event types associated with a designated social media site are to be implemented on the tactile notification region 701 on the upper front side 322, and all other notification event types are to be implemented on the tactile notification region 711 on the lower front side 322.

Figure 8A:
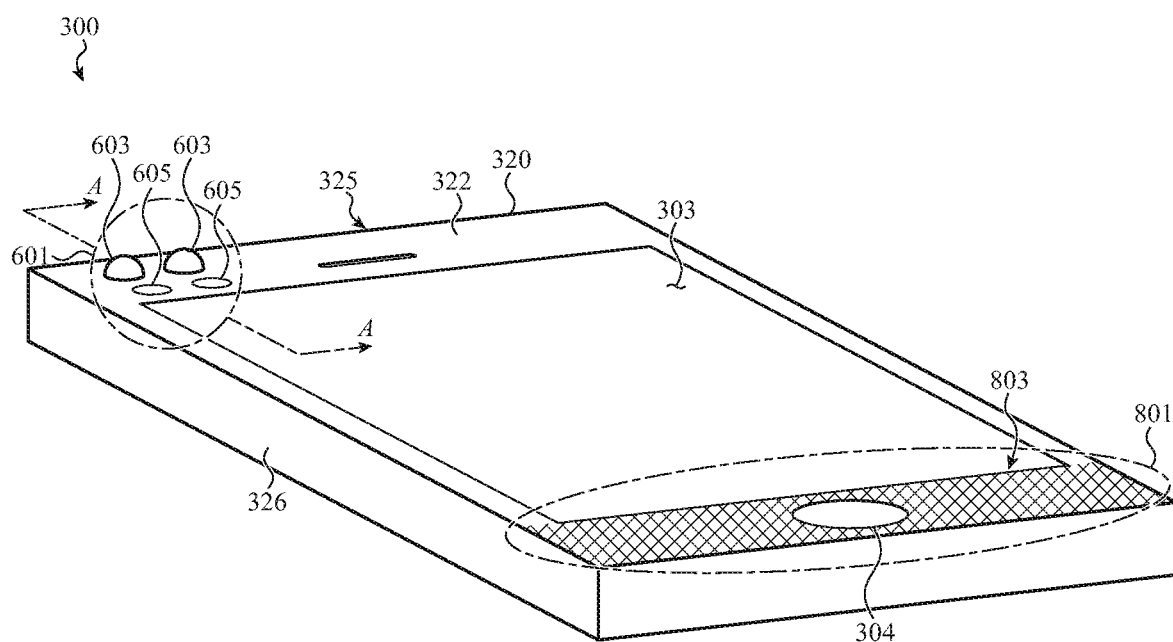
FIG. 8A is a sample view of another embodiment of an electronic device with tactile notification regions.
Figure 8B:
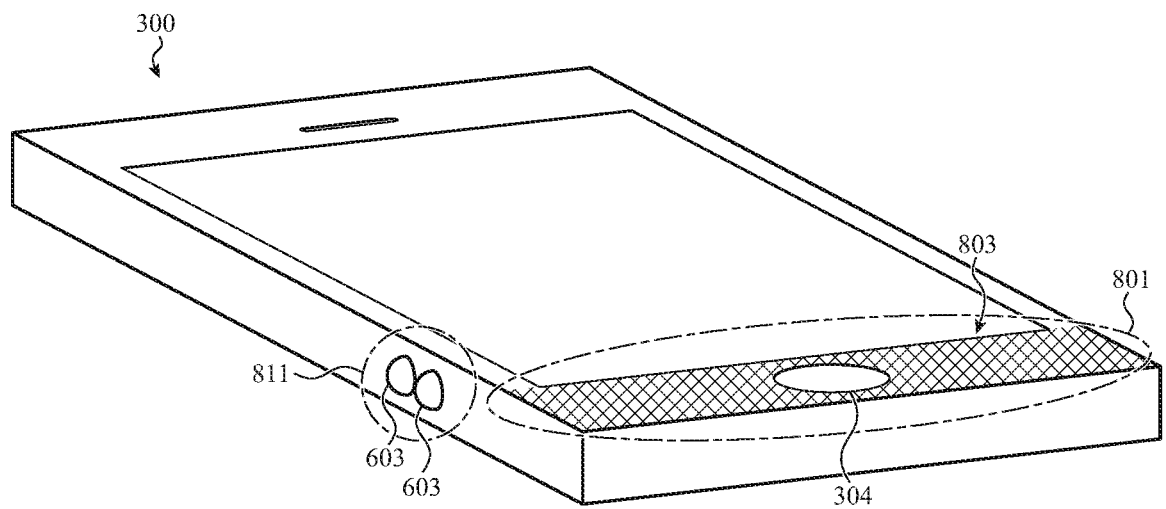
FIG. 8B is a sample view of another embodiment of an electronic device with tactile notification regions.

FIGS. 8A-B illustrate sample views of two alternate embodiments of an electronic device 300 with tactile notification regions 601, 801, and 811. The embodiments of FIGS. 8A-B include tactile notification regions that change a surface texture in addition to providing a deformation. The electronic device 300 is a mobile phone. In FIG. 8A, a tactile notification region 601 is positioned on the upper left portion of the front side of the electronic device 300, and a tactile notification region 801 is located on a lower front portion of the electronic device 300. In FIG. 8B, a tactile notification region 811 is positioned on a left sidewall of the electronic device 300, and a tactile notification region 801 is located on a lower front portion of the electronic device 300.

With attention to FIG. 8A, a tactile notification region 601 is positioned on the upper left portion of the front side of the electronic device 300. The tactile notification region 601 is similar to the first tactile notification region 601 of FIG. 6A. The tactile notification region 601 is depicted with two activated protrusions 603 and two deactivated protrusions 605 in a symmetrical square arrangement.

A second tactile notification region, tactile notification region 801, is located on a lower front portion of the electronic device 300. The tactile notification region 801 provides a tactile notification by way of a change in texture, relative to the remainder of the electronic device, to a portion of the surface of the electronic device 300. The change is texture is depicted as a first texture region 803 in tactile notification region 801. The first texture region 803 may be rougher or smoother than an adjacent surface portion, thereby providing a tactile notification to a user. The first texture region 803 is depicted as a uniform texture.

The tactile notification region 801 is depicted in FIG. 8A as a rectangular region that extends from the lower edge of the front side 322 of the enclosure 320 to the lower edge of the display 303. The first texture region 803 is depicted as a uniform texture extending across substantially the entire tactile notification region 801. Other configurations of the first texture region 803 are possible, which may allow additional information to be conveyed to a user. For example, the first texture region 803 may only extend in the portion of the tactile notification region 801 to the right of the button 304 for most notification event types. However, the tactile notification region 801 may extend across the entire tactile notification region 801 for urgent or specially-designated notification event types. For example, a user may designate, by way of a user notification profile, that any notification event type involving a designated subject matter result in a change in texture to the right portion (with respect to the button 304) of the tactile notification region 801. Furthermore, the user may designate, by way of a user notification profile, that any notifications communicated more than some time period (such as one hour, as one example) prior result in the entirety of the tactile notification region 801 being changed. Thus, the tactile notification region 801 may provide both a notice of a notification event of special interest to the user and an indication of the timing of the transmittal of the notification event.

In one embodiment, the first texture region 803 may provide a set of textures. Stated another way, the first texture region 803 may be able to provide more than one change in texture, such as a texture with a first roughness, and another texture with a second roughness. The type of texture, for example the degree of roughness, may convey additional notification information to the user of the electronic device. For example, a first roughness may provide notice of a designated notification event or notification event type, and a further change in texture may indicate a second notification of the same notification event or notification event type. Specifically, a change in the first texture region 803 may indicate a voicemail from a user-identified party, while a further change in texture may indicate at least one more voicemail received from the same party.

With attention to the embodiment of FIG. 8B, a tactile notification region 811 is positioned on a left sidewall of the electronic device 300, and a tactile notification region 801 is located on a lower front portion of the electronic device 300.

The tactile notification region 811 is similar to the first tactile notification region 601 of FIG. 6A, except that fewer protrusions are provided and the location of the protrusions is different. The tactile notification region 811 is depicted with two activated protrusions 603. The tactile notification region 811 is positioned on a sidewall of the enclosure 320. The configuration of the tactile notification region 811 on a sidewall of the electronic device 300 allows some advantages, such as providing a tactile notification when the user is holding the device.

The tactile notification region 801 of FIG. 8B is similar to that of FIG. 8A except that the tactile notification region 801 includes two side-by-side texture regions. A first texture region 803 is positioned on the right of button 304 and a second texture region 805 is positioned to the left of the button 304. The configuration of the tactile notification region 801 of FIG. 8B allows notification of two notification events, one on each region of the tactile notification region 801. Alternatively, the configuration of the tactile notification region 801 of FIG. 8B may allow notification of one notification event on one of the regions, and a qualifier of that notification by way of the other (such as urgency of the notification event, or repetition of communication of the notification event, as discussed above).

The implementation of a change in texture in a tactile notification region may be performed in any of several ways. For example, a recurring portion of the material of the tactile notification region 801 may be a material response to an electric current, such that when the recurring portion of the material receives an electric current, that portion slightly raises in height, resulting in a non-smooth surface or a surface with relatively increased roughness. Alternatively or additionally, the recurring portion of the tactile notification region 801 may be an MR material responsive to a magnetic field, thereby adjusting in height upon application of a slight magnetic field.

Figure 8C:
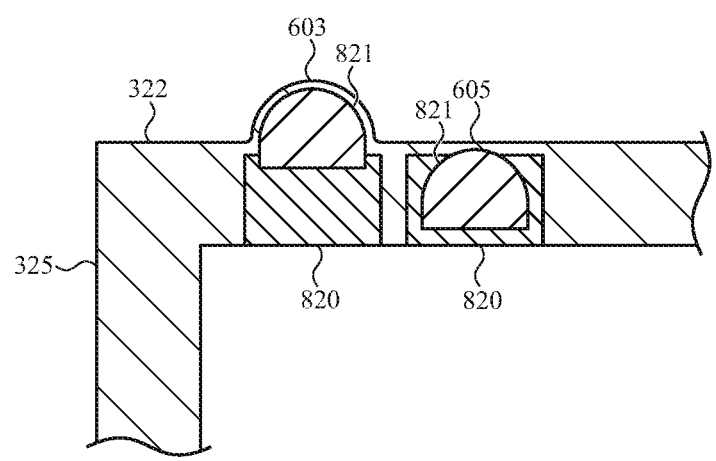
FIG. 8C is a cross-section view of the electronic device of FIG. 8A taken along section A-A.

With attention to FIG. 8C, a cross-section view of the electronic device of FIG. 8A, taken along section A-A, is depicted. Specifically, activated protrusion 603 and adjacent deactivated protrusion 605 are depicted as engaged with respective protrusion actuator bases 820 and protrusion actuator arms 821. The protrusion actuator arm 821 actuates or extends from protrusion actuator bases 820 to produce an activated protrusion 603. Each of the two protrusion actuators bases 820 and associated protrusion actuator arms 821 are embedded in the upper sidewall 325 of the electronic device 300.

The exterior surface of front side 322 may be sufficiently elastic or deformable to allow the deformation produced by the activated protrusion 603. In the embodiment of FIG. 8C, the front side 322 is of a uniform material. In some embodiments, a portion of the front side 322 is of a different material, such as a material of greater elasticity, than the remaining portion. The material of greater elasticity may allow actuation of the protrusion actuator arm 821 with reduced energy expenditure. In one embodiment, a layer of a second material of increased elasticity (than the remaining first material) is positioned in the area adjacent the protrusion actuator arm 821. In some embodiments, a layer of a second material of a different material property (e.g. different thermal expansion properties, a material with MR properties, etc.) is positioned in the area adjacent the protrusion actuator arm 821.

The protrusion actuator arm 821 may actuate or extend from protrusion actuator bases 820 to a selectable height or distance. For example, the protrusion actuator arm 821 may actuate or extend to any height or distance between and including a maximum height (as depicted by activated protrusion 603) and a minimum height (as depicted by deactivated protrusion 605.)

Figure 9A:
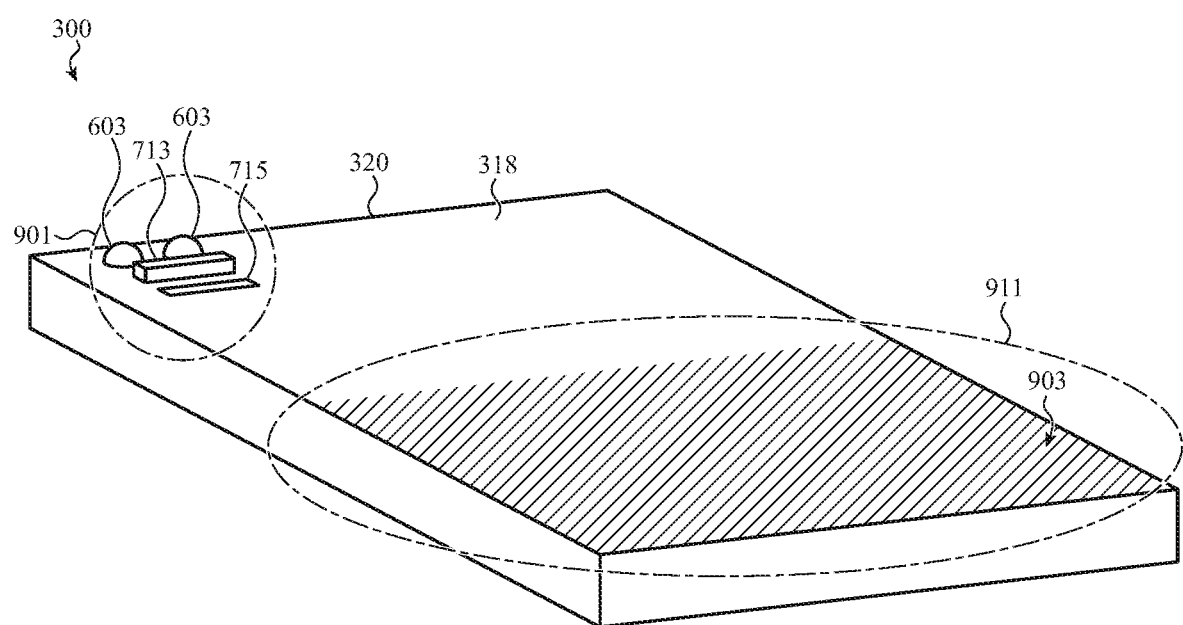
FIG. 9A is a sample view of another embodiment of an electronic device with tactile notification regions in a first state.
Figure 9B:
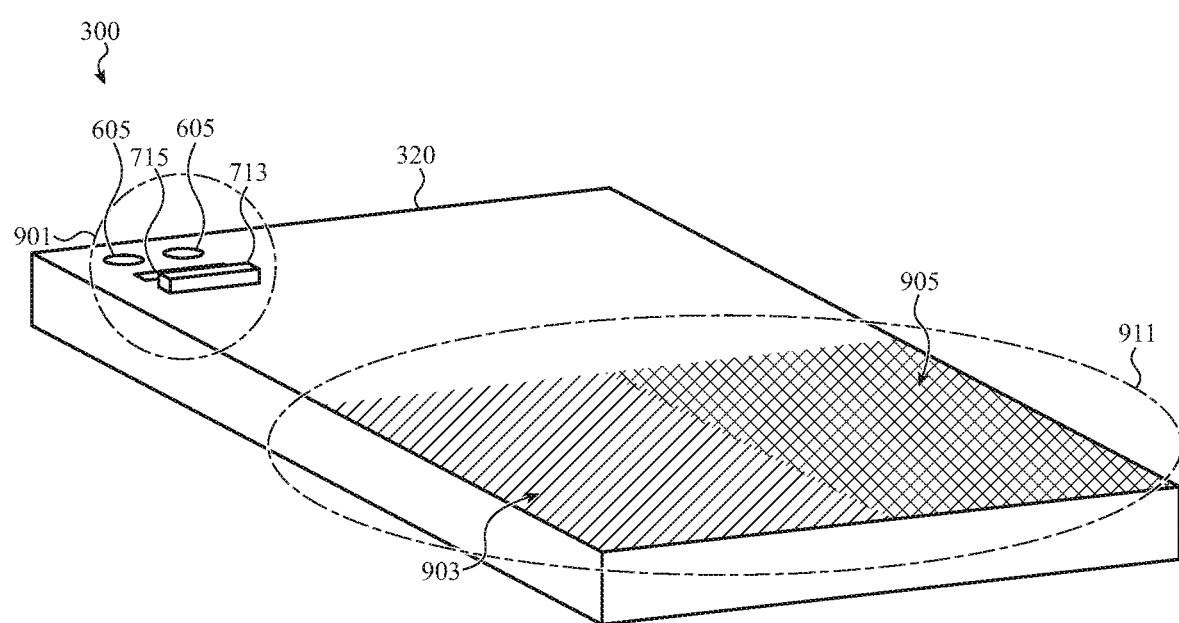
FIG. 9B is a sample view of the embodiment of the tactile notification regions of FIG. 9A in a second state.

FIGS. 9A-B illustrate sample views of an alternate embodiment of a tactile notification system of an electronic device 300. The electronic device 300 is depicted as a phone in an upside-down configuration with tactile notification regions 901 and 911. The electronic device 300 has an enclosure 320 and backside 328. The tactile notification region 901 implements tactile notifications by way of a set of deformations, and the tactile notification region 911 implements notifications by way of changes to texture. In some embodiments, the tactile notification region 911 is indistinguishable to the user from other portions of the electronic device unless a tactile feature is activated.

With attention to FIGS. 9A-B, a tactile notification region 901 is positioned on the upper left portion of the back side of the electronic device 300. The tactile notification region 901 is depicted with a pair of protrusions and a pair of ridges positioned sequentially below the pair of protrusions. In FIG. 9A, each of the protrusions are depicted as activated protrusions 603, one ridge is depicted as an activated ridge 713, and one ridge is depicted as a deactivated ridge 715. The activated ridge 713 is positioned between the pair of activated protrusions 603 and the deactivated ridge 715. In FIG. 9B, each of the protrusions are depicted as deactivated protrusions 605, and the pair of ridges are reversed in that the ridge immediately below the pair of deactivated protrusions is a deactivated ridge 715 and the remaining ridge is an activated ridge 713.

Tactile notification region 911 is similar to tactile notification region 801 of FIGS. 8A-B except that the tactile notification region 911 is positioned on the backside 328 of the electronic device 100 and the size of the tactile notification region 911 is larger. In FIG. 9A, the tactile notification region 911 is depicted as activated or deployed over substantially the entire tactile notification region 911, producing a first texture region 903. In FIG. 9B, the tactile notification region 911 is depicted as activated or deployed over substantially all of the tactile notification region 911, producing a first texture region 903 over half of the tactile notification region 911 and a second texture region 901 and 911 depicted in FIGS. 9A-B may be used to notify a user of notification events of varied notification event types as described in the disclosure, and/or to provide modifiers (e.g. urgency or recurrence) to those notification events.

Figure 10:
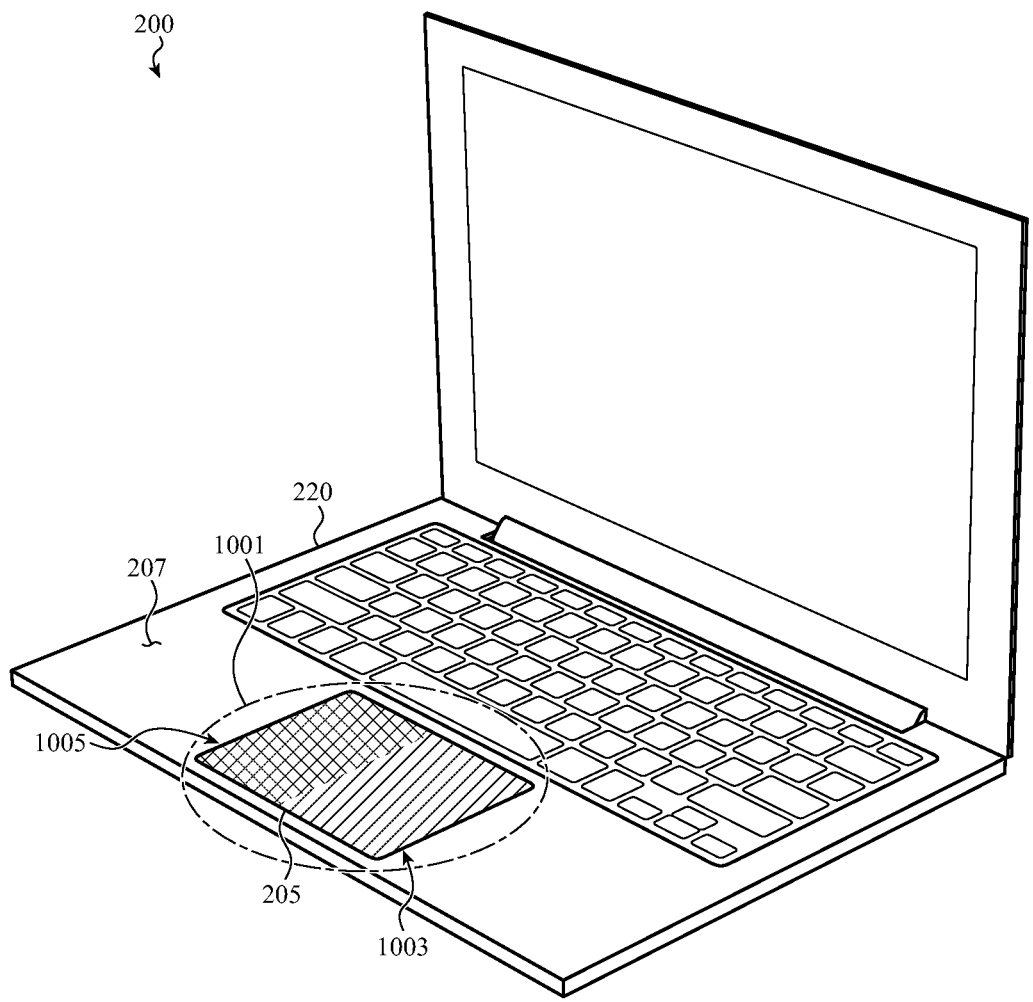
FIG. 10 is a sample view of another embodiment of an electronic device with a tactile notification region.

FIG. 10 illustrates a sample view of an alternate embodiment of a tactile notification system of an electronic device 200. The electronic device 200 is depicted as a laptop with tactile notification region 1001, enclosure 220, trackpad 205, and base face region 207. The tactile notification region 1001 is positioned on a portion of the trackpad 205.

The tactile notification region 1001 is similar to the tactile notification region 801 of FIG. 8B. The tactile notification region 1001 includes a first texture region 1003 and an adjacent second texture region 1005. Each of the texture regions 1003 and 1005 may activate or deploy so as to provide a notification of a notification event. Alternatively, one of the two texture regions may provide notification of a notification event, and the remaining region may provide a qualifier with respect to that notification (such as urgency of the notification event, or repetition of communication of the notification event, as discussed above).

The first texture region 1003 and the adjacent second texture region 1005 are depicted in tactile notification region 1001 as adjacent rectangles. Other configurations for the texture regions of the tactile notification region 1001 are possible, to include an up-down arrangement (rather than the left-right arrangement depicted) and arrangements of more than two texture regions. One or more of the texture regions of the tactile notification region 1001 may provide more than one texture. For example, first texture region 1003 and/or second texture region 1005 may be configured to provide or implement more than one texture or roughness.

In one embodiment, the tactile notification region 1001 may additionally provide other types of sustained notification types, such as protrusions, ridges, divots and the like. In some embodiments, one or more additional tactile notification regions are provided to the electronic device 200. For example, a set of protrusions, similar to those of tactile notification region 601 of FIG. 6A, may be positioned on the base face region 207. A set of such tactile implementation types positioned adjacent the trackpad 205, for example, would likely be contacted by the heel of a user's hand while using the keyboard of the device 200, thereby providing a tactile notification.

Figure 11:
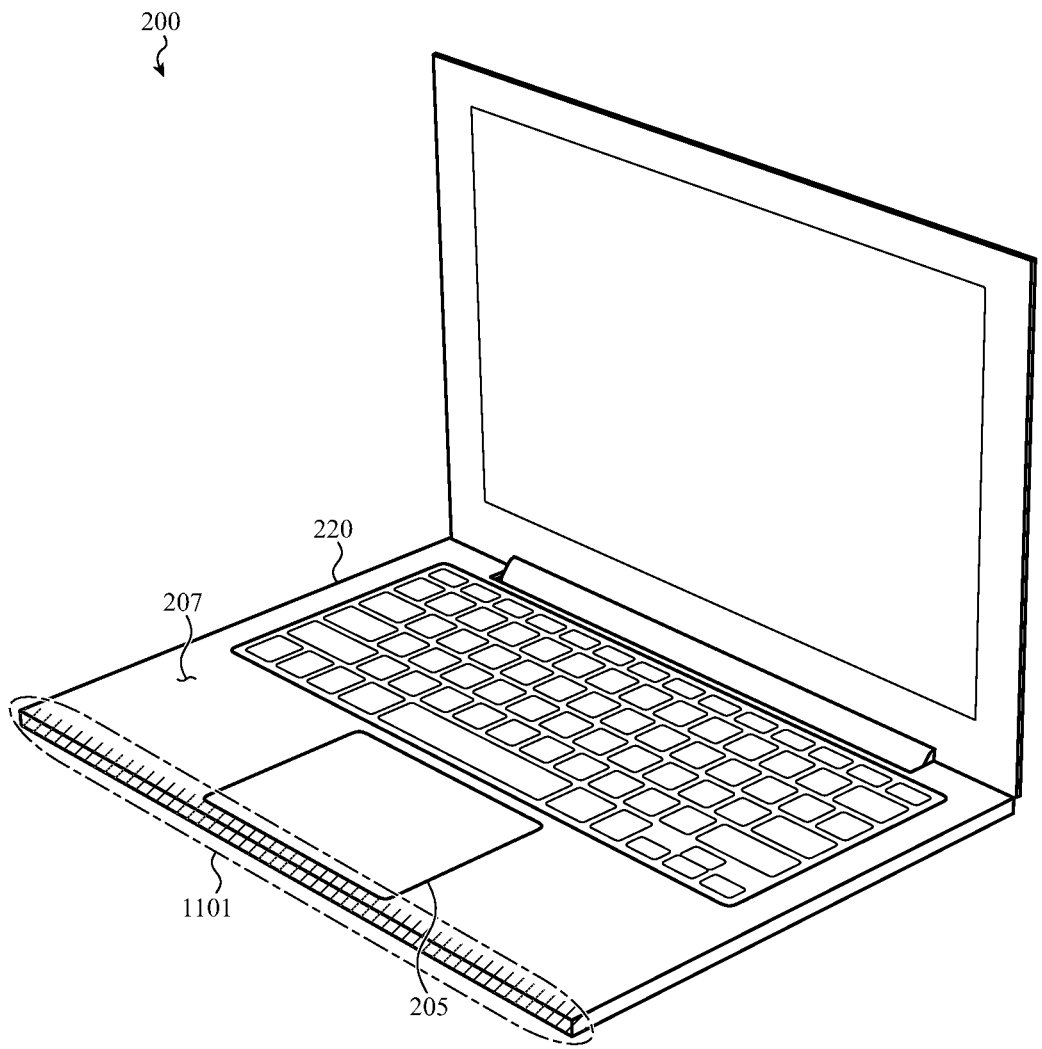
FIG. 11 is a sample view of another embodiment of an electronic device with a tactile notification region.

FIG. 11 illustrates a sample view of an alternate embodiment of a tactile notification system of an electronic device 200. The embodiment of FIG. 11 is similar to the embodiment of FIG. 10 except that the tactile notification region 1101 is positioned along an edge of the enclosure 220 of the electronic device 200 and the sustained notification type is a change in density rather than a change in texture.

The tactile notification region 1101 is implemented to provide a change in density to at least a portion of the edge of the enclosure 220 of the electronic device 200. For example, a portion of the edge of the laptop device changes in density (becoming more elastic or less rigid) to provide a tactile notification to the user. The tactile notification region 1101 may change the material density of substantially all or only a portion of the tactile notification region 1101. The notification region 1101 may provide a varied density in which a first portion of the notification region 1101 is at a first density and a second portion is at a second density. This embodiment may be well suited to providing a notification as to electronic device system status, such as a low battery level. For example, the density of the notification region 1101 may increasingly soften (become more elastic) with increasing battery usage. Because a user's hands, specifically the heel of a user's hands, will likely contact the notification region 1101 while typing on the keyboard of the laptop, such a placement and implementation of a notification region 1101 is particularly natural.

Figure 12A:
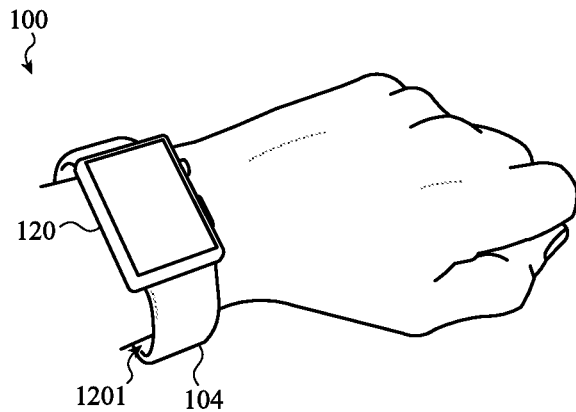
FIG. 12A is a sample view of one embodiment of a tactile notification region of an electronic device in a first state.
Figure 12B:
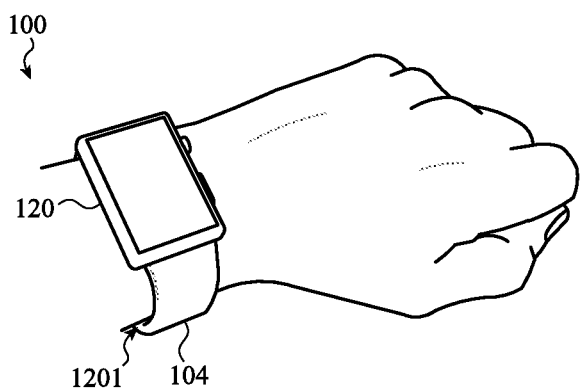
FIG. 12B is a sample view of the embodiment of the tactile notification region of FIG. 12A in a second state.
Figure 12C:
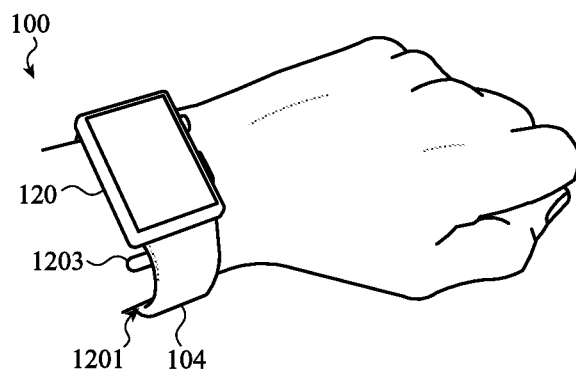
FIG. 12C is a sample view of another embodiment of an electronic device with tactile notification regions.

FIGS. 12A-C illustrate sample views of an alternate embodiment of an electronic device 100 with tactile notification regions 1201 and 1203. The electronic device 100 is configured as a wearable computing device (e.g., an electronic watch). The electronic device 100 is depicted as a watch with enclosure 120 and watchband 104.

The tactile notification region 1201 is an inner surface of the watchband 104. The inner surface of the watchband 104 contacts a user wrist when the device 100 is worn. The tactile notification region 1201 positioned on the inner surface of the watchband may change the tension in the watchband 104 and thereby provide a tactile notification. In FIG. 12A, the device is depicted in a first state in which some slack or open space exists between the watchband and a user's wrist. In FIG. 12B, a second state of the device is depicted in which less slack or less open space exists between the user's wrist and the watchband 104. In FIG. 12A, the tactile notification region 1201 is in a first or nominal state. In FIG. 12B, the tactile notification region 1201 has been actuated such that the watchband tension has been increased, such that the slack in the watchband has decreased.

A tactile notification region 1201 may provide notification of any of several notification event types, to include, for example, a time of day. Such a notification may thus serve as a wake-up alarm. The tactile notification region 1201 may alter the tension in the watchband 104 by any of several methods, to include use of elastomeric materials that change tension with an input such as an electrical signal, or with MR materials that change structural properties with application of magnetic field.

FIG. 12C illustrates an electronic device 100 with both the tactile notification region 1201 of FIGS. 12A-B and a tactile notification region 1203. The tactile notification region 1203 provides a small rod that deploys against the user's wrist to provide an additional notification identification type.

Figure 13A:
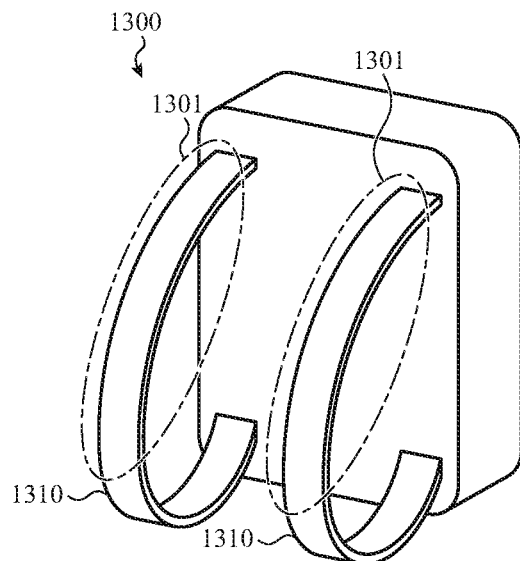
FIG. 13A illustrates an example of backpack with a tactile notification region in a first state.
Figure 13B:
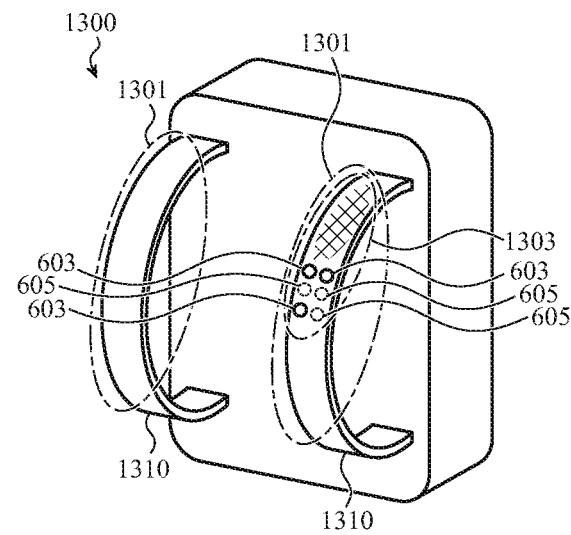
FIG. 13B illustrates the tactile notification region of FIG. 13A in a second state.

FIGS. 13A-B illustrate sample views of a backpack 1300 with tactile notification regions 1301 and 1303. The backpack 1300 has two straps 1310. Each of tactile notification regions 1301 and 1303 are positioned on one of the respective straps 1310 of the backpack 1300.

The tactile notification region 1301 is similar to the tactile notification region 1201 of FIGS. 12A-C in that the tactile notification region 1301 changes a strap tension. An inner surface of each of the straps 1310 operates to change the tension in the straps 1310 and thereby provide a tactile notification. In FIG. 13A, each of the two backpack straps 1310 are depicted in a first state with a first strap tension. In FIG. 13B, each of the two backpack straps 1310 are depicted in a second state with a second (increased) strap tension. In FIG. 13B, the tactile notification region 1301 has been actuated such that the backpack strap tension has increased. A change in strap tension by a threshold amount will be recognized by a user and thus provide a tactile notification.

FIG. 13B illustrates the backpack 1300 of FIG. 13A with an additional tactile notification area 1303 on one of the two backpack straps 1310. Specifically, the backpack 1300 of FIG. 13B is depicted with additional tactile notification area 1303 within the tactile notification area 1301. Tactile notification area 1303 includes a set of notification types of activated protrusions 603 and deactivated protrusions 605, and a region of texture tactile notification.

Figure 14:
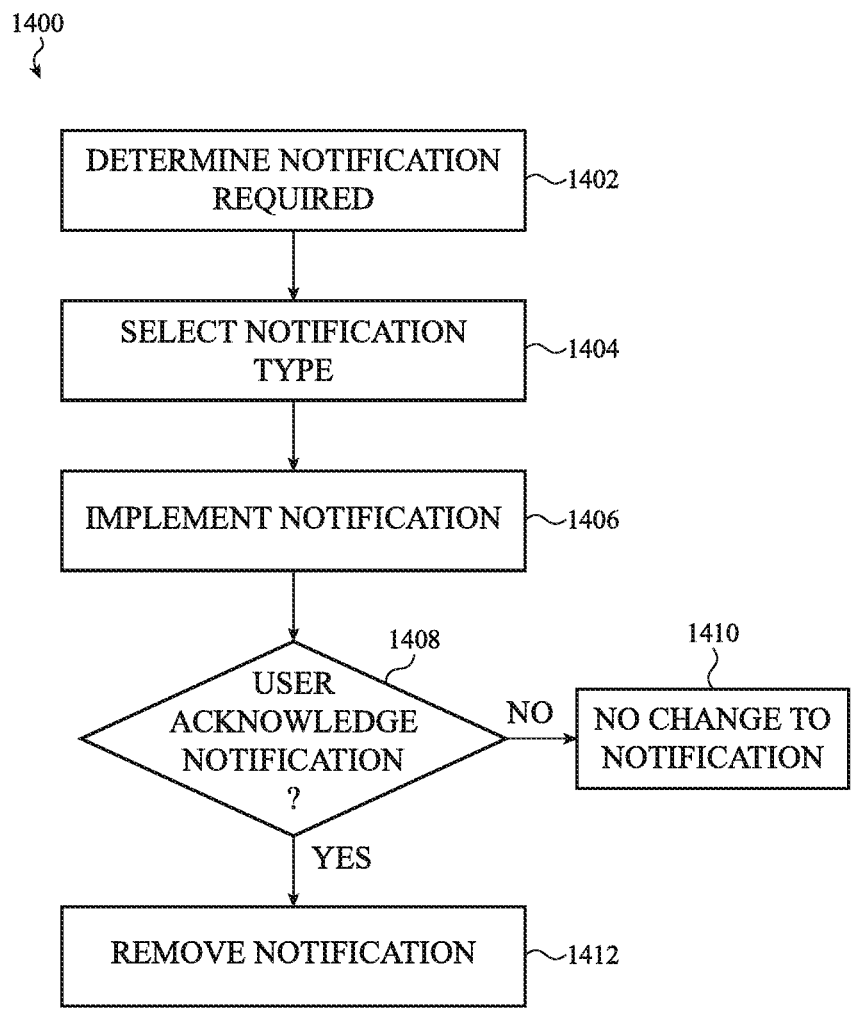
FIG. 14 depicts a process for providing a tactile notification.

FIG. 14 illustrates an example process 1400 for providing a tactile notification to a user of an electronic device. As discussed above, it may be advantageous to provide a user notice of an event of interest through the user's tactile sense. In particular, an electronic device may be configured to notify a user of designated notification event types by one or more sustained notification types. A user may configure the device to provide the tactile notification in any of various ways for designated notification events. The operation of process 1400 may be performed, for example, with any of the devices described above with respect to FIGS. 1-13.

In operation 1402, a processing unit of the device determines that a notification is required. In some implementations, the processing unit first determines that a notification may be required by receiving a notification or a message that the device has received a communication, such as an incoming or new electronic mail, phone call, voicemail, text message, and the like. The processing unit then queries a user profile to determine if the communication is of a type that the user has designated for tactile notification. For example, a user may specify, in a user profile, that only text messages are to generate a tactile notification. As another example, the processing unit may receive notice that a device system parameter has crossed a user defined threshold, such as battery power falling below 10%, which the user profile identifies for a tactile notification.

In operation 1404, a sustained notification type is selected for those events determined in operation 1402 to receive a tactile notification. In some implementations, the processing unit queries a user profile to determine the mapping between notification event type and sustained notification type. For example, a user profile may specify that all text messages are to activate one or more protrusions on an external face of the electronic device. In another example, the device may have a default setting in which a loss of Wi-Fi results in a change in density to a corner of the electronic device, such as an upper left corner of a mobile phone.

In operation 1408, the processing unit implements the selected tactile implementation type. For example, if an activated tactile feature has been identified for execution in operation 1408, then the processing unit sends one or more signals to one or more actuators to create or form a protrusion on the electronic device. As another example, if a change in elasticity is required in a particular tactile notification region, the processing unit sends a tactile output signal to the device component that effects the elasticity change. A signal to an electromagnet may alter the structural characteristics of an MR material engaged with the particular tactile notification region, thereby creating an area with changed elasticity.

In operation 1408, the processing unit performs a query to determine if a user has acknowledged the tactile notification. In some implementations, a user must open or otherwise acknowledge receipt of the underlying communication event that triggered the tactile notification in order to affirm or acknowledge the tactile notification. For example, a user might be required to open an unopened electronic mail in order to positively acknowledge the associated tactile notification. In some implementations, the user may perform an action with respect to the tactile notification in order to affirm or acknowledge the notification. For example, a deployed protrusion may be required to be pushed downward with sufficient force to substantially flatten the protrusion, in order to positively acknowledge the notification. If no affirmation or acknowledgement is provided in operation 1408 then, in operation 1410, no action is taken, and the tactile notification remains. If an affirmation or acknowledgement is provided in operation 1408, then in operation 1412 the tactile notification is ceased, for example by deactivating one or more tactile features.

In various embodiments discussed above with respect to FIGS. 1-14, tactile outputs are provided at a surface of a housing, and may be substantially static (e.g., fixed, invariant, or unchanging). In some embodiments, for example as discussed below with respect to FIGS. 15A-27, tactile outputs are provided at an input structure and are dynamic (e.g., created by and/or including motion, change or variation). More specifically, dynamic tactile outputs may be provided by moving an input surface and/or portions thereof. As discussed above, examples of input structures include buttons, trackpads, keyboards, mice, fingerprint readers, touch-sensitive displays, and the like. An exterior surface of the input structure may form a tactile input/output region. For example, the tactile output may alter a physical characteristic of an input/output member of an input structure, such as a button cap, a key cap, a cover glass, a switch cover, or the like.

As discussed above, one or more tactile features may be provided on and/or define a tactile output region within which tactile outputs are provided. The tactile features may include one or more protrusions and/or indentations on a surface of an input structure, to provide a tactile output. The tactile features may include one or more movable members, such as an input/output member of an input structure. In some embodiments, tactile features are activated by altering a surface of an input structure of the device, for example by forming protrusions or indentations in an otherwise smooth surface, such as a surface of an input/output member. In some embodiments, tactile features are not activated, but are instead present as part of the device and are moved or otherwise altered to produce a tactile output. For example, an input/output member of an input structure may itself be a tactile feature that is moved or otherwise altered to produce a tactile output.

The tactile output produced at an input structure may be tactilely and/or visually perceptible by a body part in contact with the input structure, such as a finger on a button. In some embodiments, the tactile output produced at an input structure is only tactilely and/or visually perceptible by a body part in contact with the input structure. In some embodiments, the tactile output is provided in response to inputs received at the electronic device. For example, the tactile output may be provided at an input structure in response to an input received at the input structure.

Figure 15A:
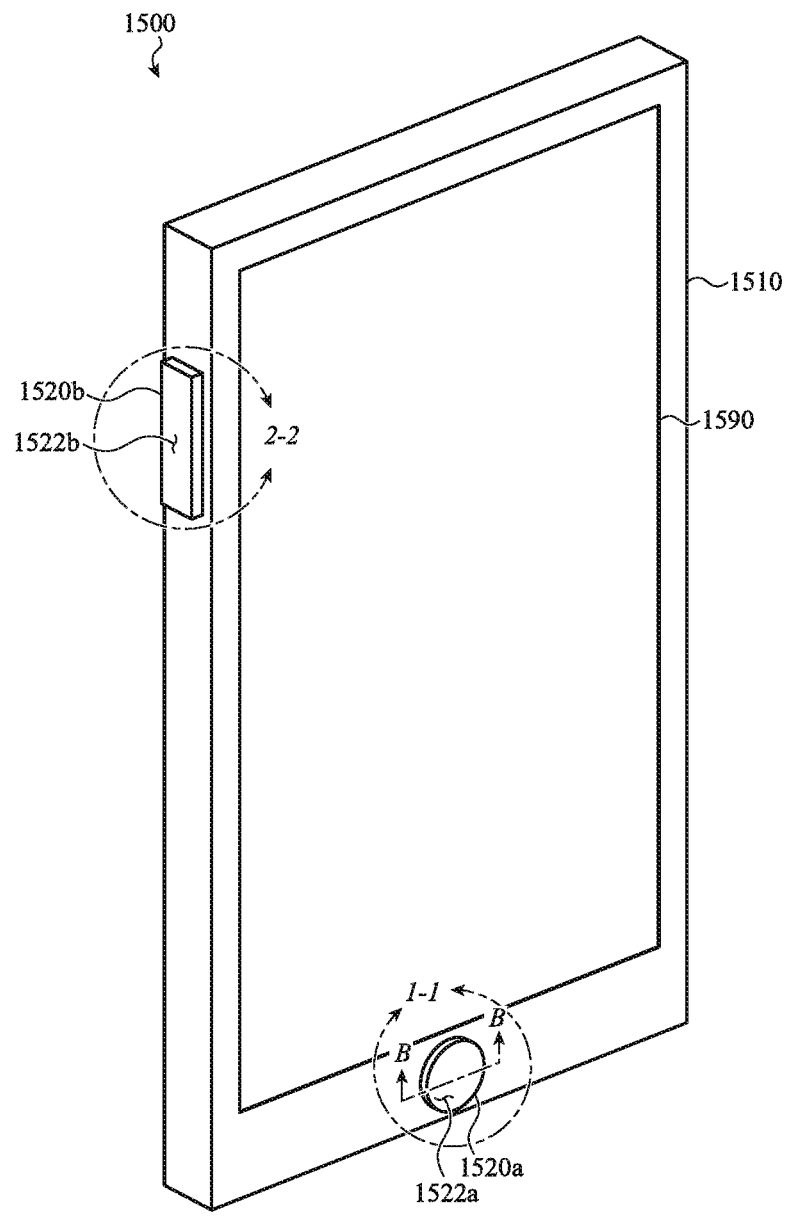
FIG. 15A illustrates an example electronic device that may provide tactile outputs at an input structure.

FIG. 15A illustrates an example electronic device 1500 that may provide tactile outputs at an input structure. The electronic device 1500 is similar to the electronic devices discussed herein (e.g., electronic device 100), and may include similar features and/or components. The electronic device 1500 includes an enclosure 1510. The electronic device further includes input structures 1520a and 1520b coupled to the enclosure 1510. In various embodiments, the electronic device 1500 is configured to receive inputs and provide tactile outputs at the input structures 1520a, 1520b.

In various embodiments, each input structure 1520a, 1520b may be a button, switch, track pad, key, keyboard, touch-sensitive display, another input device, or some combination thereof that is configured to receive and/or register inputs from a user of the electronic device 1500. The input structures 1520a, 1520b may include functionality for providing dynamic tactile outputs to the user of the electronic device 1500. Generally, the input structures 1520a, 1520b define an input/output region (e.g., input/output regions 1522a and 1522b) on or above an exterior surface of the electronic device 1500. For example, an input structure 1520a, 1520b may include an input/output member that is configured to receive inputs and/or defines one or more input/output regions 1522a, 1522b on an exterior surface of the input structure and/or the electronic device 1500. As discussed above, the dynamic tactile outputs may be provided in the input/output regions 1522a, 1522b, for example by moving one or more tactile features in the input/output region.

The tactile output produced at an input structure 1520a, 1520b may be tactilely and/or visually perceptible by a body part in contact with the input structure, such as a finger on a button. In some embodiments, the tactile output produced at the input structure 1520a, 1520b is only tactilely and/or visually perceptible by a body part in contact with the input structure.

In some embodiments, the tactile output is produced in response to inputs received at the electronic device 1500. For example, the tactile output may be produced at an input structure 1520a, 1520b in response to an input received at the input structure. In some embodiments, the tactile output conveys information regarding the operation of the electronic device 1500 and/or one or more connected electronic devices.

In some embodiments, the input structure 1520a, 1520b may interact or otherwise communicate with components of the electronic device 1500, such as a processing unit or controller of the electronic device 1500. The input structure 1520 may transmit one or more signals to a processing unit corresponding to received input forces or touches. Similarly, the input structure 1520a, 1520b may receive signals from the processing unit regarding tactile outputs to be provided by the input structure 1520a, 1520b. For example, the input structure may receive instructions from the processing unit to activate and/or move tactile features to provide a tactile output. In various embodiments, inputs received at the input structure 1520a, 1520b may be used to control the electronic device 1500. The processing unit (or other controller) of the electronic device 1500 may determine when to provide tactile outputs via the input structure 1520a, 1520b. More specifically, a processing unit of the electronic device 1500 may instruct the input structure to provide a tactile output in response to a triggering condition that indicates that one or more tactile outputs should be provided. In some embodiments, the processing unit may detect a change condition that indicates that the tactile output should be changed.

Triggering conditions and change conditions, collectively referred to herein as "tactile output conditions," may include events, operations, and/or conditions associated with the electronic device, as well as changes to device events, operations, and/or conditions. Tactile output conditions may include notification events, as described above. Tactile output conditions may further include media playback (e.g., audio and/or video playback) operations, loading and waiting operations, pairing operations (e.g., wireless pairing operations), communication operations (e.g., phone calls, video calls, messaging, data transfer), authentication operations, charging operations, execution of applications, and the like.

As used herein, "operations" includes both states and events (e.g., changes to states). For example, media playback operations may include: media playback states, such as whether playback is paused or playing; volume levels and changes to volume levels; and media playback events, such as transitions between media items. Similarly, other tactile output conditions may include a power on state, a power off state, a low battery state, a pairing state, a paired state, or an unpaired state. Tactile output conditions may further include a denial condition. As used herein, a "denial condition" is a negative outcome, rejection, or other failed operation at the electronic device, such as an input to the electronic device 1500 being denied or rejected, an incorrect password being received, an authentication failure, an incorrect or incomplete command, a failure of an operation at the electronic device, or the like. In some embodiments, the tactile outputs provided at input structures convey notifications of events of interest as discussed above.

In some embodiments, the electronic device 1500 is communicably coupled (e.g., using a wired and/or wireless connection) to a companion electronic device such as a mobile phone, a computer, or the like. In various embodiments, the companion electronic device is similar to one of the electronic devices discussed herein, and may include similar features and/or components. In some embodiments, the companion electronic device is configured to facilitate functionality of the electronic device 1500, and vice versa. For example, a user may use a mobile phone or other device to control music or other audio (e.g., audio associated with video playback), communication operations, or the like provided at the electronic device 1500. Similarly, inputs received at the electronic device 1500 may be used to control the companion electronic device.

As discussed above, the tactile outputs may be static, dynamic, or some combination thereof. In some embodiments, motion of the tactile feature to produce a dynamic tactile output may include motion of the tactile feature along the surface of the input structure, motion of the tactile feature in or out of the surface of the input structure, rotation of the tactile feature, precession of the tactile feature, changing the shape of the tactile feature, or some combination thereof.

In some embodiments, motion of the one or more tactile features is slow enough such that the user can feel specific motion of the tactile features. This is opposed to a user feeling an aggregate of motion, such as a vibration. In some embodiments, the motion of a dynamic tactile output is substantially periodic. In some embodiments and in order to enhance a user's ability to perceive all aspects and/or components of a motion, the motion of the tactile features has a frequency less than 200 Hertz, or between 1 and 50 Hertz, or even between 2 and 4 Hertz.

In some embodiments, tactile features are activated by altering a physical or structural characteristic of the input/output region 1522, for example by forming protrusions or indentations in an otherwise smooth surface. In some embodiments, the tactile features are activated, after which the tactile features move in order to produce a dynamic tactile output. For example, protrusions, recesses, and/or indentations may be formed on an otherwise smooth surface, and may be moved to produce a dynamic tactile output, as discussed in more detail below with respect to FIGS. 15B-M and 16-19. Such features are "formed" by changing a height of some portion of the input surface relative to a remainder of the input surface, as one example. In some embodiments, tactile features are not activated but are present as part of the device and moved to produce a dynamic tactile output. For example, an input/output member or other device component may itself be a tactile feature that moves by rotation, precession, tilting, translational motion, or other motion to produce a dynamic tactile output, as discussed in more detail below with respect to FIG. 20. In various embodiments, the physical implementation of the tactile outputs may be performed in any of several ways. For example, the tactile features may be activated and/or moved using an actuator, as discussed below with respect to FIGS. 15N and 16-20.

Figure 15B:
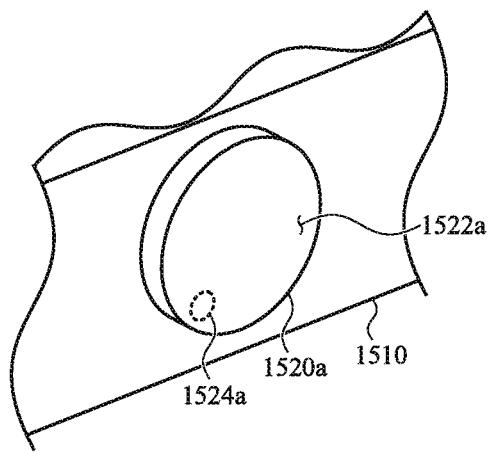
FIGS. 15B-E are close-up views of section 1-1 showing an input structure of FIG. 15A.
Figure 15C:
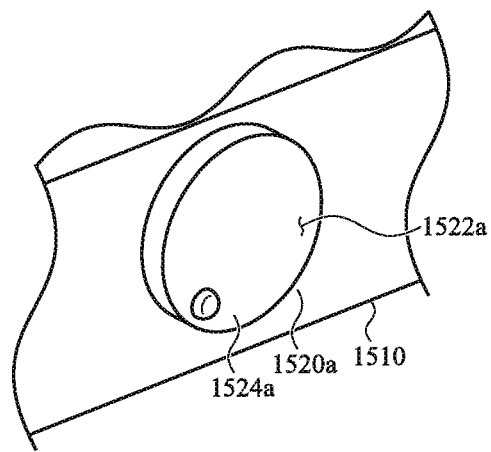
Figure 15D:
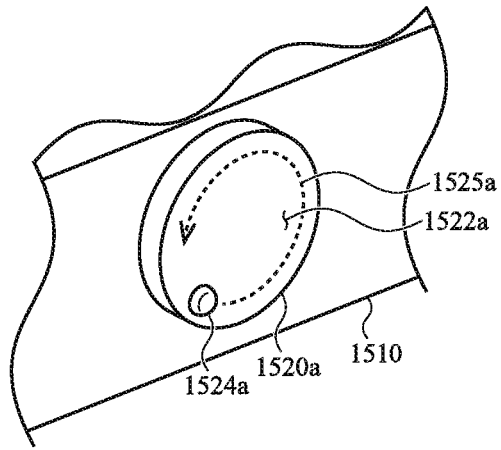
Figure 15E:
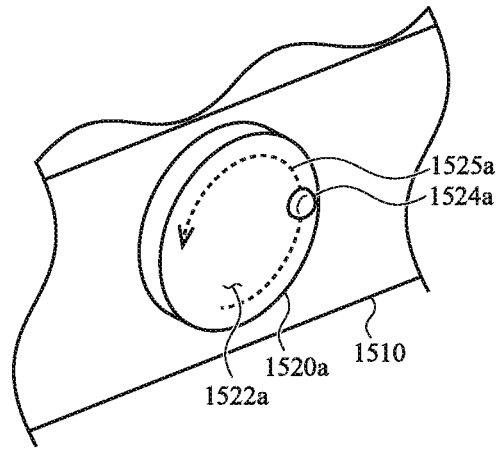

FIGS. 15B-E are close-up views of detail 1-1 of FIG. 15A, showing the input structure 1520A. FIGS. 15B-E illustrate one example of the activation and motion of a tactile feature 1524*a* in the input/output region 1522*a* to produce a dynamic tactile output. FIG. 15B illustrates the input/output region 1522*a* with the tactile feature 1524*a* shown in an inactive mode or state (illustrated using dashed lines). In some embodiments, in the non-activated state, the tactile feature 1524*a* is not visually and/or tactilely perceptible or distinguishable from the rest of the input/output region 1522*a*. For example, the tactile feature 1524*a* may be flush with the input/output region 1522*a* when in the inactive mode FIG. 15C illustrates the tactile feature 1524*a* in an activated mode or state. In the example of FIG. 15C, the tactile feature 1524*a* is a protrusion in extending from the input/output region 1522*a*, which in turn extends or is otherwise above an exterior surface of the electronic device 1500. FIG. 15D illustrates an example pattern of motion of the tactile feature 1524*a*. In the example of FIG. 15D, the example pattern of motion 1525*a* is a substantially circular path along a circumference of the input/output region 1522*a*. It should be appreciated that the pattern of motion can be different in different embodiments; other patterns of motion 1525*a* are discussed herein. As some examples, the tactile feature 1524*a* may move bidirectionally (e.g., in two directions) along the path defining the pattern of motion 1525*a*. In some embodiments, the tactile feature 1524*a* may move in a single direction along the path defining the pattern of motion 1525*a*. FIG. 15E illustrates the tactile feature 1524*a* partway through its motion (e.g., in the process of providing a tactile output). In the example of FIG. 15E, the tactile feature 1524*a* has moved along the substantially circular path defining the pattern of motion 1525*a* from its starting point but has not yet reached its end point. It is this motion that is perceived as a tactile output by a person touching the input output region 1522*a*, and particularly touching the tactile feature 1524*a*. Unlike embodiments discussed above with respect to FIGS. 1-14, in the embodiment of FIGS. 15A-15E the tactile feature 1524*a* moves while a user interacts with it in order to provide tactile output.

The example of FIGS. 15B-E illustrates the activation and motion of a single tactile feature 1524*a*, but it should be appreciated that different embodiments may utilize any number of tactile features having different shapes, sizes, motion patterns, and the like from each other and from the example shown. Similarly, in the example of FIGS. 15B-E, the tactile feature 1524*a* is a protrusion extending from the input/output region 1522*a*. As discussed above, in various embodiments, the tactile features may take any of several forms, including features (or portions) of the external surface of the electronic device 1500 and components themselves of the electronic device 1500. For example, the tactile features may include one or more protrusions (e.g., bumps, ridges, discontinuities, or the like) or indentations (e.g., cavities, depressions, channels, or the like). As another example, the tactile features may include a device component itself, such as an input/output member that is configured to move to provide a dynamic tactile output.

As used herein, "patterns of motion" refers to any different motions or characteristics of tactile feature(s) that may be used to provide tactile outputs. Further, the feel of a tactile output may change as the pattern of motion changes. The pattern of motion 1525*a* shown in the example of FIGS. 15D and 15E is a substantially circular path, but in various embodiments, the pattern of motion may be different. In some embodiments, the pattern of motion is random within the input/output region 1522*a* or a portion thereof. In some embodiments, the pattern of motion of one or more tactile features changes. For example, the pattern of motion may vary with time, input, the information being conveyed, or some combination thereof. In some embodiments, tactile features move at different speeds in different patterns of motion. FIGS. 15F-I illustrate example motion patterns of motion of tactile features 1524 in input/output regions 1522.

Figure 15F:
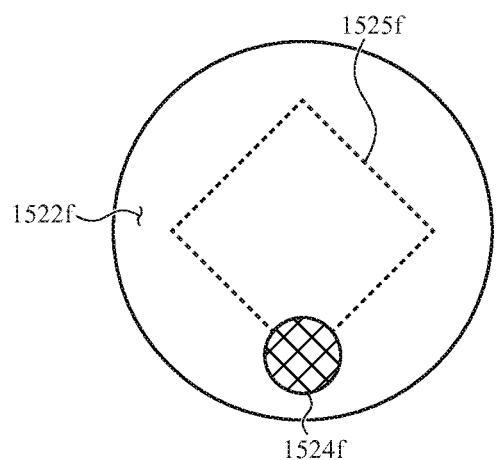
FIGS. 15F-I illustrate example motion patterns of motion of tactile features in input/output regions of FIGS. 15A-E.

FIG. 15F illustrates another example pattern of motion 1525F of a tactile feature 1524f in an input/output region 1522f. In the example of FIG. 15F, the example pattern of motion 1525f is a diamond-shaped or rectangular path in the input/output region 1522f. In various embodiments, the tactile feature 1524F moves bidirectionally (e.g., in two directions) along the pattern 1525f. In some embodiments, the tactile feature 1524f may move in a single direction along the pattern of motion 1525f.

Figure 15G:
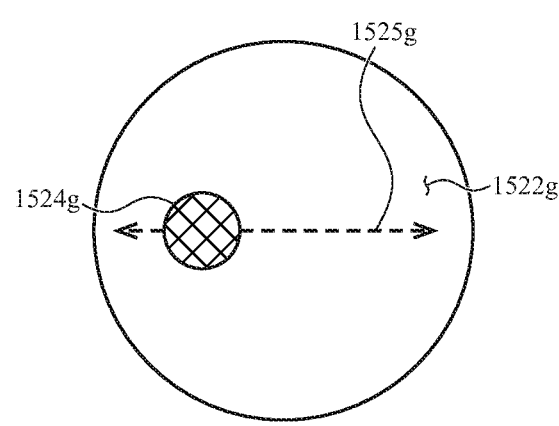

FIG. 15G illustrates another example pattern of motion 1525g of a tactile feature 1524g in an input/output region 1522g. In the example of FIG. 15G, the example pattern of motion 1525g is a substantially linear path in the input/output region 1522g. In various embodiments, the tactile feature 1524g moves bidirectionally along the substantially linear path defining the pattern of motion 1525g.

Figure 15H:
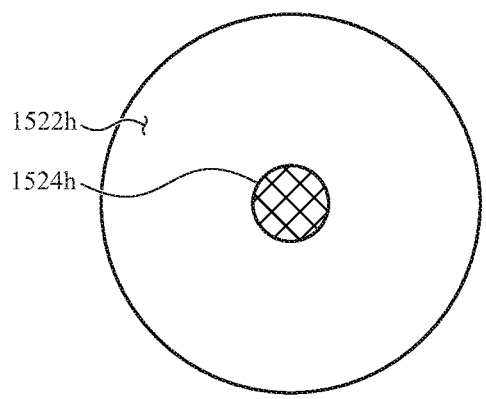
Figure 15I:
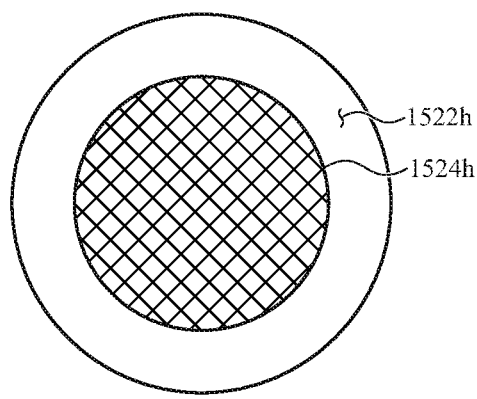

FIGS. 15H-I illustrate an example pattern of motion of a tactile feature 1524H in an input/output region 1522h. In FIGS. 15H-I, the tactile feature 1524h is shown transitioning from a first size (FIG. 15H) to a second size (FIG. 15I). The motion of the tactile feature 1524h may take the form of or otherwise include this transition in size.

Many input/output regions 1522 are shown as being substantially circular in the examples of FIGS. 15A-I. In various embodiments, the input/output region may be any shape. In some embodiments, the input/output region takes a shape similar to or the same as one or more exterior surfaces of the input structure. In some embodiments, the input/output region has a different shape than exterior surface of the input structure.

Figure 15J:
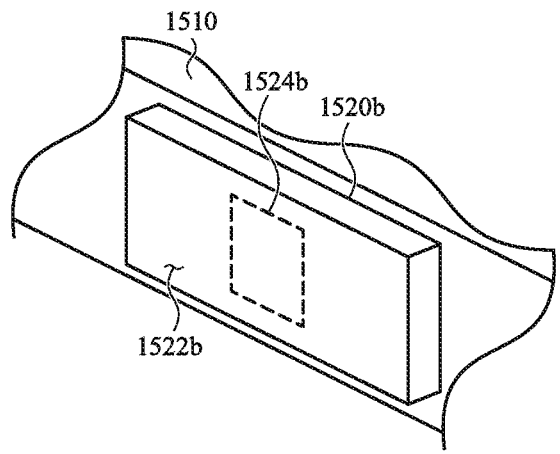
FIGS. 15J-M are close-up views of section 2-2 showing an input structure of FIG. 15A.
Figure 15K:
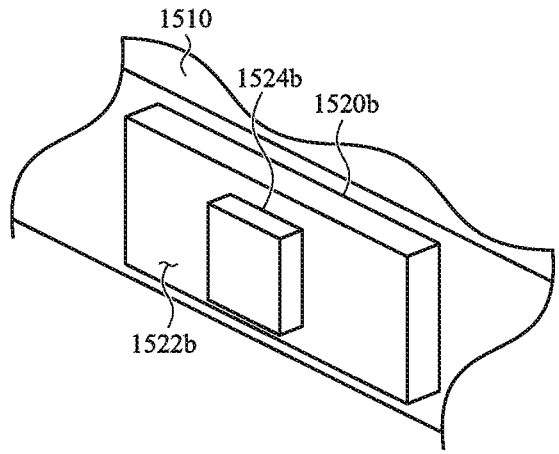
Figure 15L:
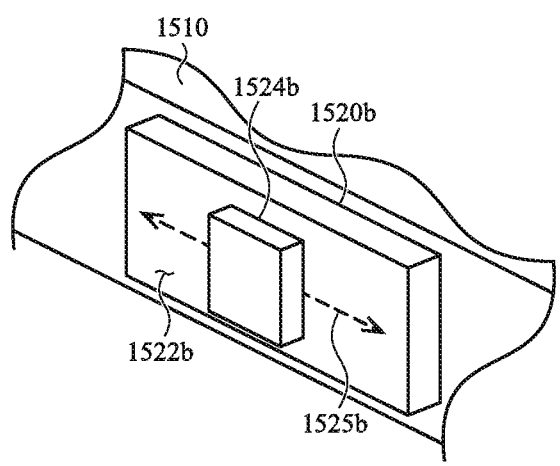
Figure 15M:
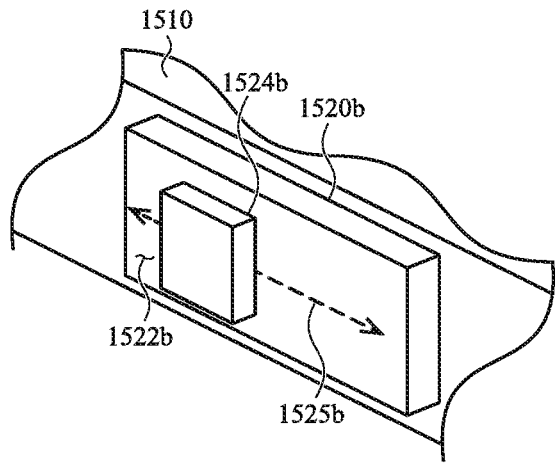

FIGS. 15J-M are close-up views of section 2-2 showing the input structure 1520b of FIG. 15A. FIGS. 15J-M illustrate the activation and motion of a tactile feature 1524b on (or along) the input/output region 1522b to produce a dynamic tactile output. In the example of FIGS. 15J-M, the input/output region 1522b is rectangular. FIG. 15J illustrates the input/output region 1522b with the tactile feature 1524b shown in a non-activated state (illustrated using dashed lines). In some embodiments, in the non-activated state, the tactile feature 1524b is not visually and/or tactilely perceptible or distinguishable from the rest of the input/output region 1522b. FIG. 15K illustrates the tactile feature 1524b in an activated state. In the example of FIG. 15K, the tactile feature 1524b is a protrusion in the input/output region 1522b extending from the exterior surface of the electronic device 1500. FIG. 15L illustrates an example pattern of motion of the tactile feature 1524b. In the example of FIG. 15L, the example pattern of motion 1525b is a substantially linear path in the input/output region 1522b. FIG. 15M illustrates the tactile feature 1524b moving according to the pattern of motion 1525b. In the example of FIG. 15M, the tactile feature 1524b moves bidirectionally (e.g., in two directions) along the substantially linear path defining the pattern of motion 1525b.

The examples of motion of tactile features 1524 discussed with respect to FIGS. 15 B-M include motion across or along a surface of the input/output regions 1522. In various embodiments, the motion may include other types of motion. The motion of the tactile features may include motion of the tactile features inward and/or outward from the surface of the input/output region, rotation of the tactile features, tilting of the tactile features, precession of the tactile features, changes to the tactile features (e.g., size, texture, physical properties) and so on.

Figure 15N:
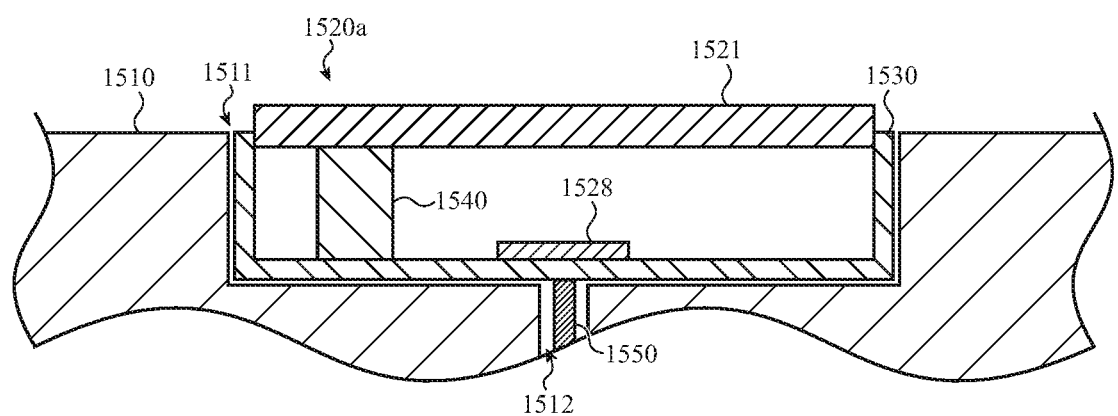
FIG. 15N depicts a cross-section view of an electronic device, taken along section B-B of FIG. 15A.

FIG. 15N depicts a cross-section view of the electronic device 1500, taken along section A-A of FIG. 15A. FIG. 15N illustrates the input structure 1520a disposed in an opening 1511 of the enclosure 1510. In the embodiment of FIG. 15N, the input structure 1520 includes an input/output member 1521 that is configured to receive inputs and provide tactile outputs. In some embodiments, the input/output region 1522a is defined on an exterior surface of the input/output member 1521, while in others the input/output region can be a portion of an electronic device enclosure.

The input structure 1520 may take any of a variety of forms suitable for accepting inputs and providing tactile outputs, including, but not limited to, a button (e.g., power button, home button, control button, and the like), a switch, a key, a watch crown, a display, a track pad, a touch- and/or force-sensitive surface, and so on. In various embodiments, the input structure 1520 may be used to control one or more outputs of the electronic device, including tactile outputs.

In some embodiments, the input structure 1520a includes a housing 1530 that interfaces with (e.g., is coupled to, attached to, disposed in, disposed on) the enclosure 1510. In various embodiments, the housing 1530 houses one or more components of the input structure 1520A. The input structure 1520a may be coupled to the enclosure 1510 using the housing 1530. In some embodiments, the input structure does not include a housing.

The input structure 1520a may interact or communicate with components of the electronic device 1500, such as a processing unit or controller. For example, a processing unit of the electronic device 1500 may instruct the input structure 1520a to provide one or more tactile outputs. The input structure 1520a and the components thereof may be operably connected to other components of the electronic device 1500, such as a processing unit. In the example of FIG. 15N, a connector 1550 operably connects the input structure 1520a to other components of the electronic device 1500. In some embodiments, the connector 1550 extends through a passage 1512 in the enclosure 1510 and electrically couples the input structure to other components of the electronic device 1500. In some embodiments, the connector 1550 uses any combination of wireless and/or wired communication for facilitating the transfer of signals between the input structure 1520a and other components of the electronic device, such as a processing unit. The connector 1550 may include multiple distinct communication components.

The input structure 1520a may include one or more actuators 1540 that are configured to activate and/or move one or more tactile features in the input/output region 1522a to provide tactile outputs. In the example of FIG. 15N, the actuator 1540 is operably connected to the input/output member 1521 such that actuation of the actuator activates and/or moves a tactile feature. For example, actuation of the actuator may cause a deformation of a portion of the exterior surface. The actuator may extend toward the exterior surface so as to deform the exterior surface and create any of several tactile features, such as a protrusion. The actuator may retract the exterior surface so as create an indentation. Additionally or alternatively, the actuator may cause a tactile feature to move by rotation, precession, tilting, or other motion. In some embodiments, the actuator is itself the tactile feature. "Actuator," as used herein, means any mechanism to cause motion of a component. Examples of types of actuators are shown and described with respect to FIGS. 16-20.

The actuator 1540 may activate and/or move tactile features in response to receiving signals (e.g., output signals) from a processing unit of the electronic device 1500. In some embodiments, the tactile features may be activated and/or moved in response to inputs received at the electronic device. For example, the tactile features may be activated and/or moved in response to an input received at the input structure. In some embodiments, the actuator 1540 is communicably coupled to the processing unit via the connector 1550, and may communicate with the processing unit via the connector 1550. In the example of FIG. 15N, the actuator 1540 is shown as a component of the input structure 1520a within the housing 1530. In various embodiments, the actuator 1540 may be included within the input structure 1520a or it may be a standalone component of the electronic device 1500.

In some embodiments, the actuator 1540 is configured to move translationally within the housing 1530 to provide actuation at different locations on the input/output member 1521, for example as shown and described with respect to FIGS. 16-17. In some embodiments, the translational motion of the actuator 1540 may be along a plane that is substantially parallel to the input/output member 1521. For example, with respect to FIG. 15N, the actuator 1540 may move left, right, into the page, out of the page, or some combination thereof. In some embodiments, motion of tactile features in the input/output region is caused, either in whole or in part by the translational motion of the actuator. Translational motion of the actuator is discussed in more detail with respect to FIGS. 16-17.

The input/output member 1521 typically defines an exterior surface of the input structure 1520 and/or the electronic device 1500. Although the input/output member 1521 is shown in many figures as flat, in some embodiments it may be curved, stepped, uneven, non-planar, and so on. Examples of input/output members include button caps, switch caps, cover sheets (e.g., cover glasses and the like), key caps, or other exterior members of input structures. In some embodiments, at least a portion of the input/output member 1521 is flexible (e.g., pliable or otherwise deformable) such that tactile features may be formed on its surface. For example, the input/output member may be at least partially formed of an elastic material such as rubber, polymer, fabric, and the like. As used herein, an "elastic material" is a material that returns to its original shape and/or size after being deformed.

In some embodiments, the input/output member 1521 is itself configured to move (e.g., rotation, tilting, precession, depression, extension, translational motion, and so on) to produce a tactile output. Thus, in these embodiments, the input/output member 1521 is also the tactile feature. In some embodiments, a flexibility of the input/output member 1521 may be tunable or otherwise variable. As used herein, the term "flexibility" refers to a material's ability to be deformed. For example, the input/output member 1521 may have multiple states of flexibility, including a first state with a first associated flexibility and a second state with a second flexibility higher than the first flexibility. This may be accomplished in a variety of ways, including using layer jamming, variable response materials, and the like.

The input structure 1520 may further include one or more sensing mechanisms 1528 that are configured to detect inputs received by the input structure 1520, for example at the input/output member 1521. The sensing mechanism may be configured to transmit an input signal to a processing unit of the electronic device 1500 in response to detecting an input received on the input/output member 1521. In some embodiments, the sensing mechanism is communicably coupled to the processing unit via the connector 1550, and may communicate with the processing unit via the connector 1550. In various embodiments, the sensing mechanisms may include one or more of a capacitive sensor, a proximity sensor, an optical sensor, a camera, a touch sensor, a force sensor, a contact switch, and the like.

Figure 16A:
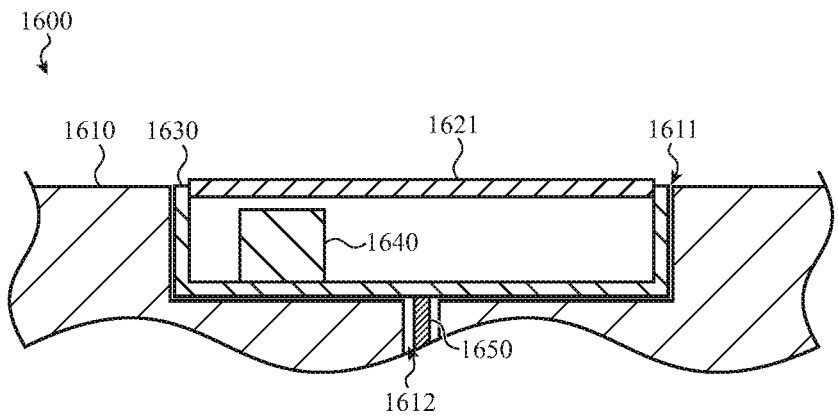
FIGS. 16A-16C depict cross-section views of an example input structure having a linear actuator.
Figure 16B:
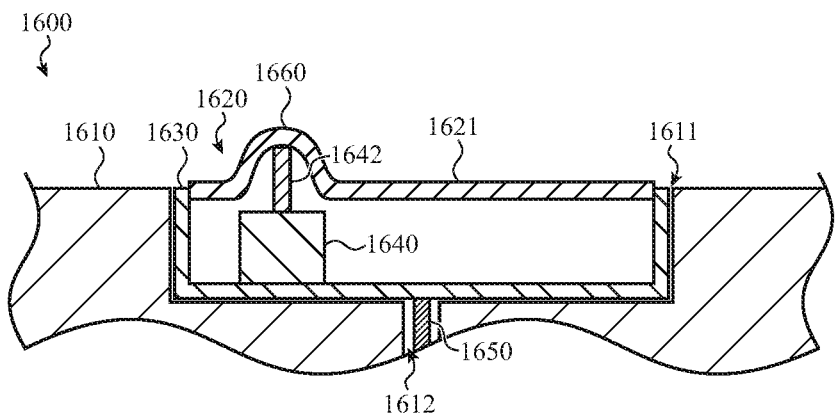
Figure 16C:
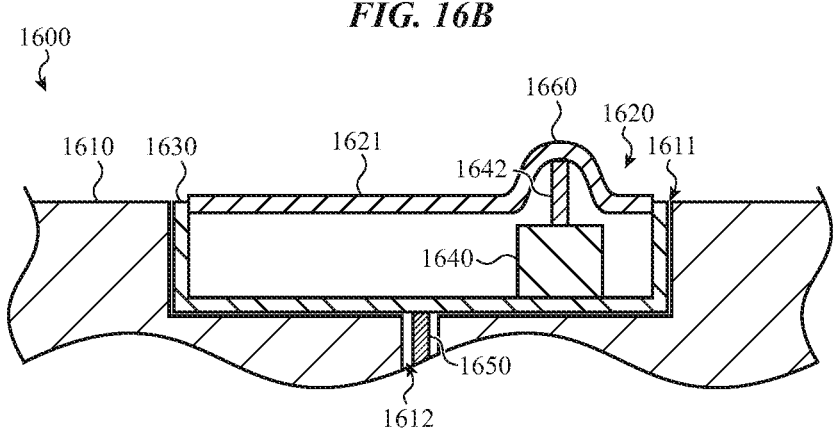

FIGS. 16A-16C depict cross-section views of an example input structure having a linear actuator. FIG. 16A illustrates an input structure 1620 disposed in an opening 1611 of an enclosure 1610 of an electronic device 1600. The electronic device 1600 is similar to the electronic devices discussed herein (e.g., electronic device 1500 discussed above with respect to FIGS. 15A-N) and may include similar features and/or components as any of the electronic devices discussed herein, including but not limited to the input structure 1620, an input/output member 1621, a housing 1630, a connector 1650, and a passage 1612.

The input structure 1620 includes a linear actuator 1640. As shown in FIG. 16B, the input/output member 1621 may be flexible such that an actuation component 1642 (e.g., a piston, projection, cylinder, protrusion, or the like) of the linear actuator 1640 may exert a force on the input/output member 1621 to create one or more tactile features (e.g., a tactile feature 1660). For example, in FIG. 16B, the actuation component 1642 is extended to exert an outward (e.g., upward with respect to FIG. 16B) force on the input/output member to create a protrusion. In some embodiments, the actuation component 1642 may be retracted to exert an inward force on the input/output member 1621 to create an indentation.

In some embodiments, the tactile feature 1660 may be dynamically extended and/or retracted to produce a dynamic tactile output. In some embodiments and as shown in FIG. 16C, the linear actuator 1640 may translationally move, thereby moving the tactile feature 1660 along the surface of the input/output member 1621 (e.g., in an input/output region). The motion of the tactile feature along the surface of the input/output member 1621 may produce a dynamic tactile output. The linear actuator 1640 may be configured to move according to one or more patterns, such as those discussed above with respect to FIGS. 15A-N. In various embodiments, different types of motion of the tactile feature 1660 may be combined to produce a dynamic tactile output. For example, the tactile feature 1660 may be dynamically extended and/or retracted and moved along the surface of the input/output member 1621 to produce a dynamic tactile output.

The specific implementation of the linear actuator 1640 is shown for illustrative purposes only and is not meant to be limiting. In various embodiments, the linear actuator 1640 may be any suitable type of actuator, including an electric actuator, a pneumatic actuator, a hydraulic actuator, a double acting actuator, a spring return actuator, a magnetic actuator, and so on.

Figure 17A:
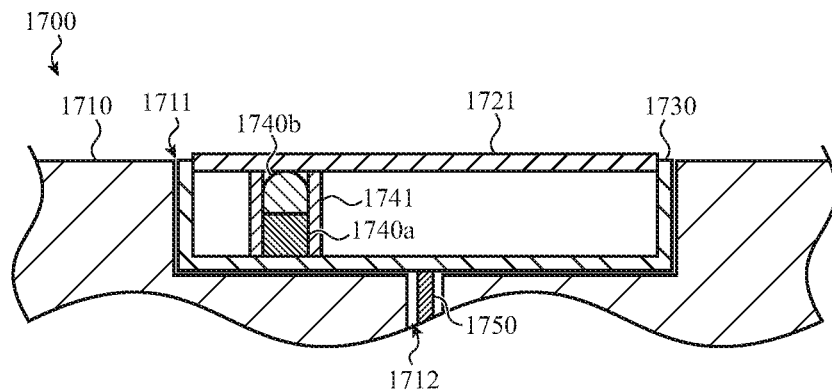
FIGS. 17A-17C depict cross-section views of an example input structure having a magnetic actuator.
Figure 17B:
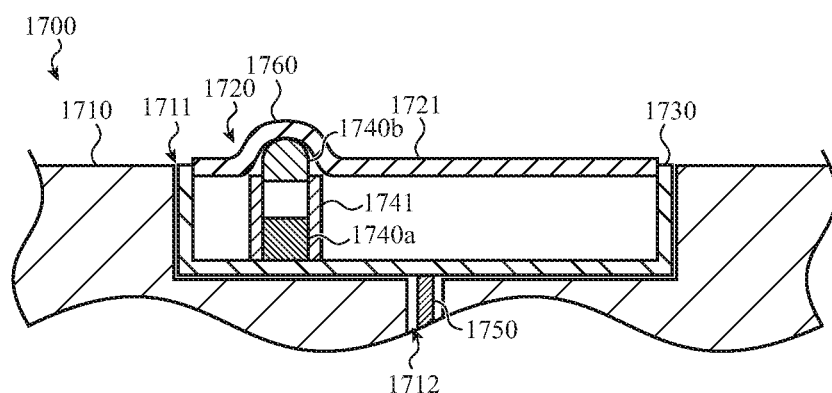
Figure 17C:
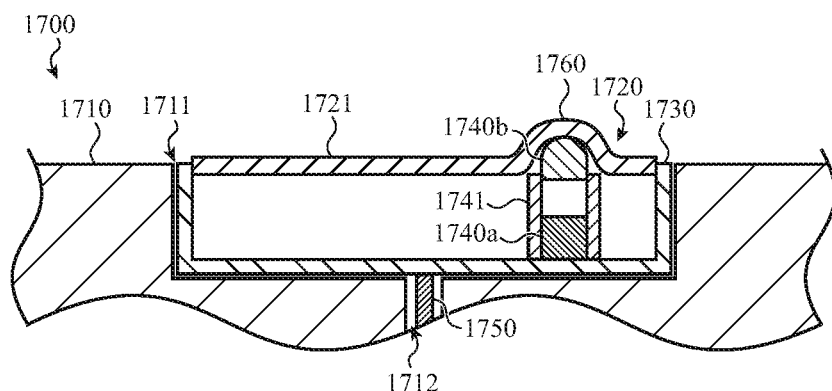

FIGS. 17A-17C depict cross-section views of an example input structure having a magnetic actuator. FIG. 17A illustrates an input structure 1720 disposed in an opening 1711 of an enclosure 1710 of an electronic device 1700. The electronic device 1700 is similar to the electronic devices discussed herein (e.g., electronic device 1500 discussed above with respect to FIGS. 15A-N), and may include similar features and/or components as any of the electronic devices discussed herein, including but not limited to the input structure 1720, an input/output member 1721, a housing 1730, a connector 1750, and a passage 1712.

The input structure 1720 includes a magnetic actuator 1740. As shown in FIG. 17A, the magnetic actuator may include an actuator housing 1741, an activation component 1740a and an actuation component 1740b. In various embodiments, the activation component 1740a is configured to cause motion of the actuation component 1740b. For example, the activation component 1740a may be configured to generate a magnetic field, and the actuation component 1740b may be magnetized such that it is subject to a force in the magnetic field. As shown in FIG. 17B, the activation component 1740a may generate a magnetic field in response to receiving a signal (e.g., from a processing unit of the electronic device 1700) such that actuation component 1740b is subjected to a magnetic force and thereby exerts a force on the input/output member 1721 to create one or more tactile features (e.g., a tactile feature 1760). For example, in FIG. 17B, the actuation component 1740b exerts an outward (e.g., upward with respect to FIG. 17B) force on the input/output member 1721 to create a protrusion. In some embodiments, the actuation component 1740b may exert an inward force on the input/output member 1721 to create an indentation. In some embodiments, the input/output member 1721 is attached to the housing 1730 such that the input/output member 1721 is deformed when the force is exerted on the input/output member 1721.

In some embodiments, the tactile feature 1760 may be dynamically extended and/or retracted to produce a dynamic tactile output. In some embodiments, as shown in FIG. 17C, the magnetic actuator 1740 may move along the surface of the input/output member 1721 in addition to in and out of the surface, thereby moving the tactile feature 1760 along the surface of the input/output member 1721 (e.g., in an input/output region). The motion of the tactile feature along the surface of the input/output member 1721 may produce a dynamic tactile output. The magnetic actuator 1740 may be configured to move according to one or more patterns, such as those discussed above with respect to FIGS. 15A-N. In various embodiments, different types of motion of the tactile feature 1760 may be combined to produce a dynamic tactile output. For example, the tactile feature 1760 may be dynamically extended and/or retracted and/or moved along the surface of the input/output member 1721 to produce a dynamic tactile output.

The specific implementation of the magnetic actuator 1740 is shown for illustrative purposes only and is not meant to be limiting. In various embodiments, the magnetic actuator 1740 is any device that is configured to use magnetic force to create motion, including magnetic actuators, magnetoresistive actuators, and the like.

Figure 18A:
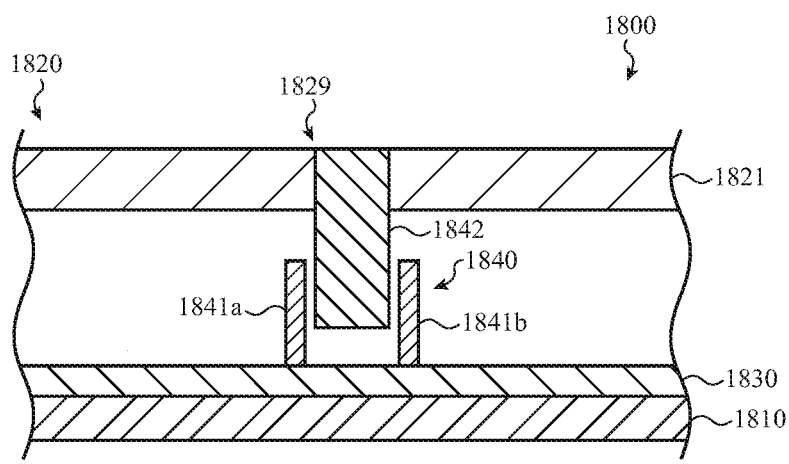
FIGS. 18A-18C depict cross-section views of an example input structure having a reluctance actuator.
Figure 18B:
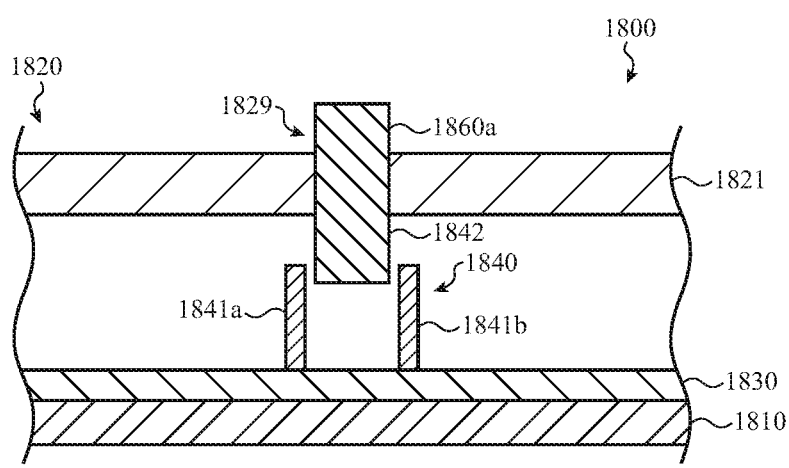
Figure 18C:
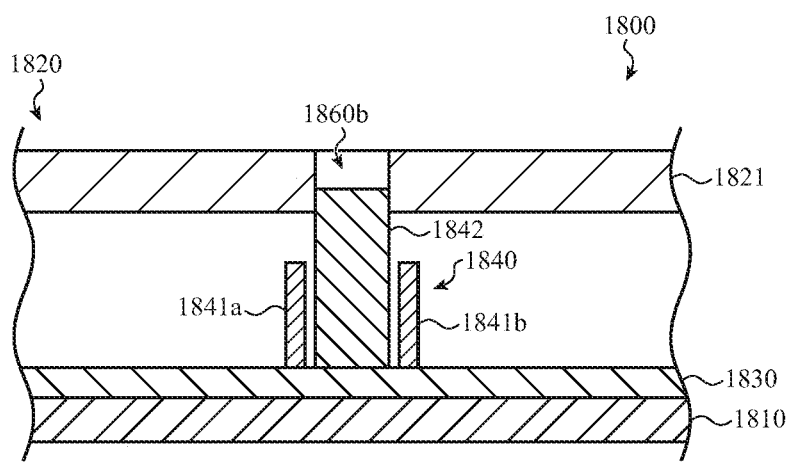

FIGS. 18A-18C depict cross-section views of an example input structure having a reluctance actuator. FIG. 18A illustrates an input structure 1820 coupled to an enclosure 1810 of an electronic device 1800. The electronic device 1800 is similar to the electronic devices discussed herein (e.g., electronic device 1500 discussed above with respect to FIGS. 15A-N), and may include similar features and/or components as any of the electronic devices discussed herein, including but not limited to the input structure 1820, an input/output member 1821, and a housing 1830. In some embodiments, the input/output member 1821 includes an opening 1829, and at least a portion of an actuator 1840 is configured to extend at least partially into the opening 1829.

In some embodiments, the input structure 1820 includes a reluctance actuator 1840. As shown in FIG. 18A, the reluctance actuator 1840 may include activation components 1841a and 1841b (e.g., magnetized components such as permanent magnets), and an actuation component 1842. In some embodiments, the actuation component is a conductor (e.g., a coil winding) to which a current may be applied. As the current is applied, a force proportional to the current is produced, thereby causing the actuation component 1842 to change or maintain its position relative to the magnetized components 1841. The actuation component 1842 may have a default or starting position as shown in FIG. 18A.

In some embodiments, the actuation component 1842 is configured to extend at least partially into the opening 1829. As shown in FIG. 18A, a top surface of the actuation component 1842 may cooperate with the input/output member 1821 to form a substantially continuous surface the input structure 1820. As shown in FIG. 18B, the actuation component 1842 may change position, thereby forming a tactile feature 1860a (e.g., a protrusion) on the exterior surface of the input structure 1820. Similarly, as shown in FIG. 18C, the actuation component 1842 may change position, thereby forming a different tactile feature 1860b (e.g., indentation) on the exterior surface of the input structure 1820.

In some embodiments, the tactile features 1860 may be dynamically extended and/or retracted to produce a dynamic tactile output. The specific implementation of the reluctance actuator 1840 is shown for illustrative purposes only and is not meant to be limiting. In various embodiments, the reluctance actuator 1840 is any device that is configured to use reluctance to create motion, including voice coil actuators and the like.

Figure 19A:
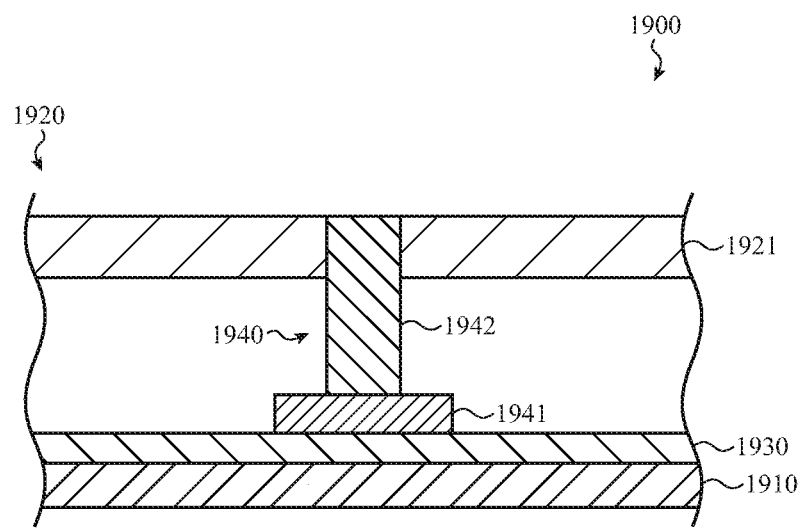
FIGS. 19A-19B depict cross-section views of an example input structure having an electroactive actuator.
Figure 19B:
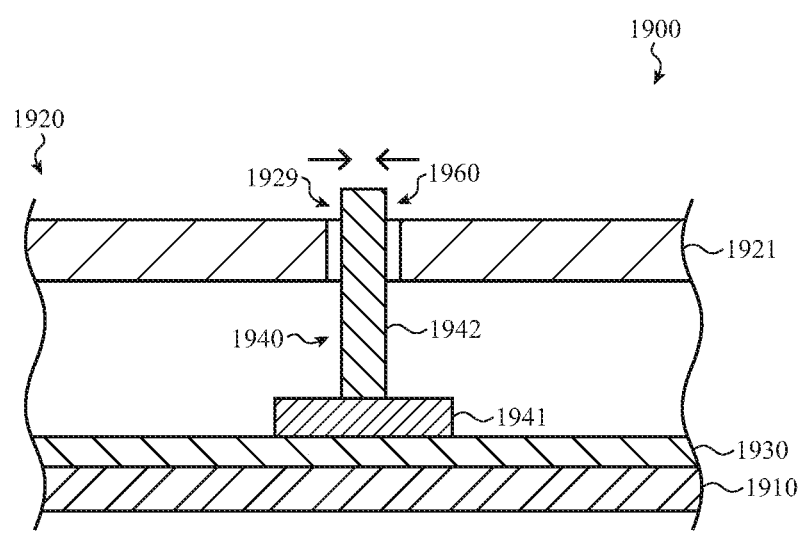

FIGS. 19A-19B depict cross-section views of an example input structure having an electroactive actuator. FIG. 19A illustrates an input structure 1920 coupled to an enclosure 1910 of an electronic device 1900. The electronic device 1900 is similar to the electronic devices discussed herein (e.g., electronic device 1500 discussed above with respect to FIGS. 15A-N), and may include similar features and/or components as any of the electronic devices discussed herein, including but not limited to the input structure 1920, an input/output member 1921, and a housing 1930. In some embodiments, the input/output member 1921 includes an opening 1929, and at least a portion of an actuator 1940 is configured to extend at least partially into the opening 1929.

In some embodiments, the input structure 1920 includes an electroactive actuator 1940. As shown in FIG. 19A, the electroactive actuator 1940 may include an actuation component 1941 and an activation component 1942. In some embodiments, the actuation component 1941 is a variable response material (such as a shape-changing material, electroactive polymer, or the like) that reacts to one or more inputs. For example, the actuation component 1941 may change shape and/or one or more other properties in response to an electrical current being applied to the actuation component by the activation component 1942. The actuation component 1941 may have a default or starting shape, dimension, and/or position as shown in FIG. 18A.

In some embodiments, the actuation component 1941 is configured to extend at least partially into the opening 1929. As shown in FIG. 19A, a top surface of the actuation component 1941 may cooperate with the input/output member 1921 to form a substantially continuous surface the input structure 1920. As shown in FIG. 19B, the shape of the actuation component 1941 may change, for example in response to an electrical current applied by the activation component 1942, thereby forming a tactile feature 1960 (e.g., a protrusion or indentation) on the exterior surface of the input structure 1920.

In some embodiments, the tactile feature 1960 may be dynamically extended and/or retracted to produce a dynamic tactile output. The specific implementation of the electroactive actuator 1940 is shown for illustrative purposes only and is not meant to be limiting. In various embodiments, the electroactive actuator 1940 is any component that is configured to use variable response materials to create motion.

In the example embodiments of FIGS. 18A-19B, the reluctance actuator 1840 and the electroactive actuator 1940 are used in conjunction with an input/output member 1821, 1921 that includes or defines an opening 1829, 1929. In various embodiments, reluctance actuators and electroactive actuators may be used in conjunction with any type of input/output member discussed herein, including flexible input/output members such as those discussed with respect to FIGS. 16 and 17. Similarly, an input/output member with an opening may be used in conjunction with any actuators discussed herein, including the actuators as discussed with respect to FIGS. 16 and 17. In various embodiments, the reluctance actuators and the electroactive actuators may be configured to translationally move as discussed herein.

Figure 20A:
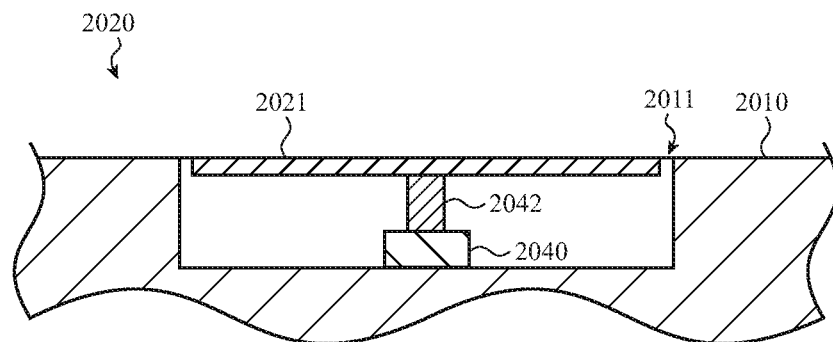
FIGS. 20A-20F depict cross-section views of an example input structure having an input/output member configured to move by tilting, rotation, and/or precession.
Figure 20B:
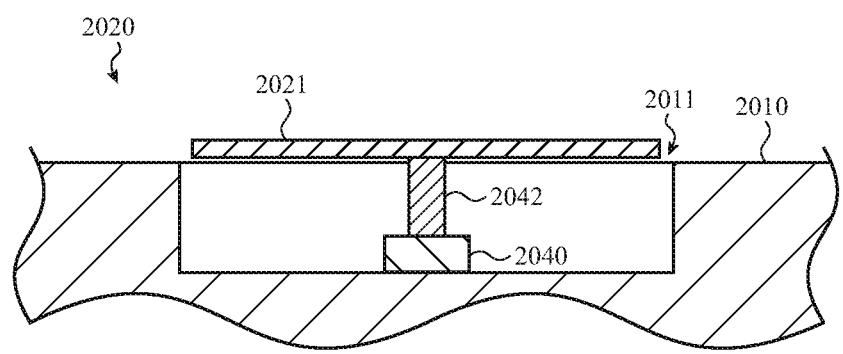
Figure 20C:
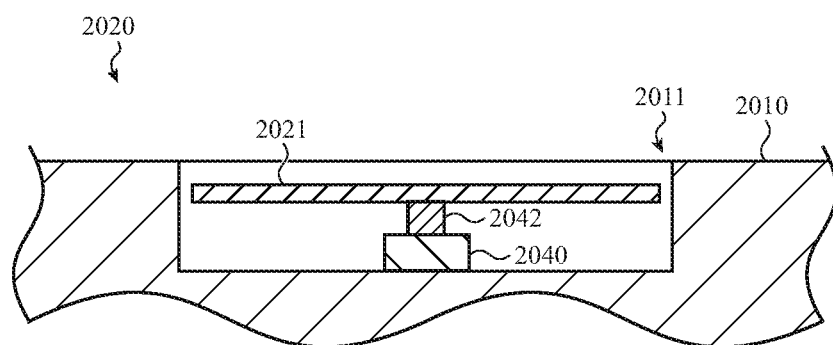

FIGS. 20A-20F depict cross-section views of an example input structure having an input/output member configured to move by tilting, rotation, and/or precession. The input structure 2020 is similar to the input structures discussed herein, and may be incorporated into any electronic device discussed herein. In the example of FIGS. 20A-20C, the input structure 2020 is coupled to, and disposed in, an opening 2011 of an enclosure 2010. The input structure 2020 includes an input/output member 2021, an actuator 2040, and a support 2042. As discussed above, in various embodiments, the input/output member 2021 may be a tactile feature and configured to move to produce a dynamic tactile output.

Motion of the input/output member 2021 may include rotation, precession, tilting, extension, retraction, or some combination thereof. In some embodiments, the input/output member 2021 may rotate about a central axis, for example by the actuator 2040 rotating the support 2042. In some embodiments, additional tactile features are present on a surface of the input/output member (e.g., in the input/output region) such that rotation of the input/output member 2021 changes the position of the additional tactile features. In some embodiments, the input/output member 2021 may be dynamically extended and/or retracted to produce a dynamic tactile output. For example, the input/output member 2021 may be extended by the actuator 2040 extending the support 2042 as shown in FIG. 20B. Similarly, the input/output member 2021 may be retracted, for example, by the actuator 2040 retracting the support 2042 as shown in FIG. 20C.

In some embodiments, the input/output member 2021 may be dynamically tilted to produce a dynamic tactile output. As used herein "tilting" the input/output member 2021 refers to changing an orientation (e.g., a planar orientation) of the input/output member 2021 and/or a surface thereof. Dynamically tilting the input/output member 2021 may include precession of the input/output member. As used herein, "precession" refers to gyration of a rotational axis of a spinning body about another line intersecting the spinning body. The movement of the rotational axis during precession may define a cone. For example, the input/output member 2021 may be rotating as discussed above, and the axis of rotation may simultaneously be changed.

Figure 20D:
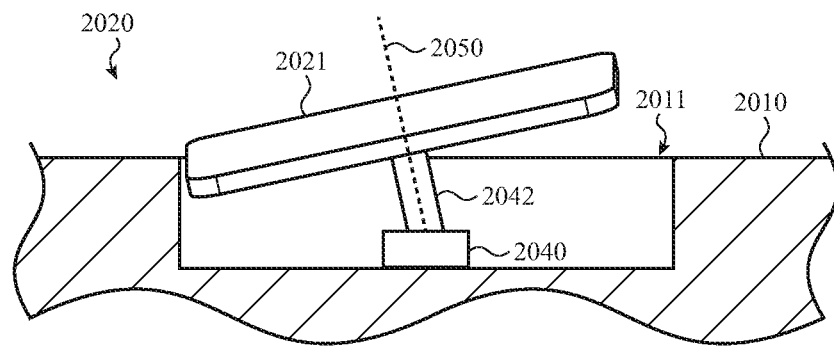
Figure 20E:
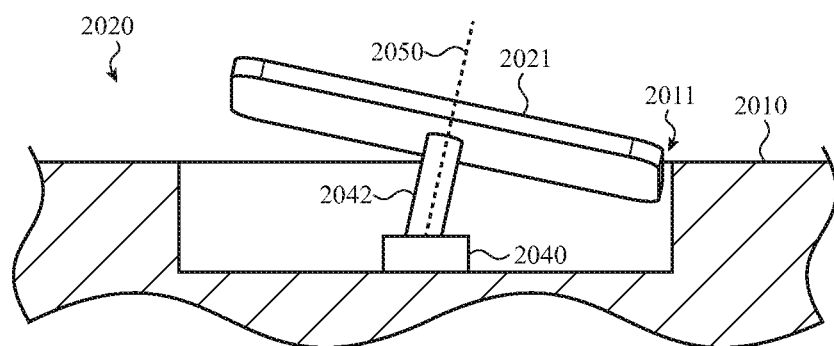
Figure 20F:
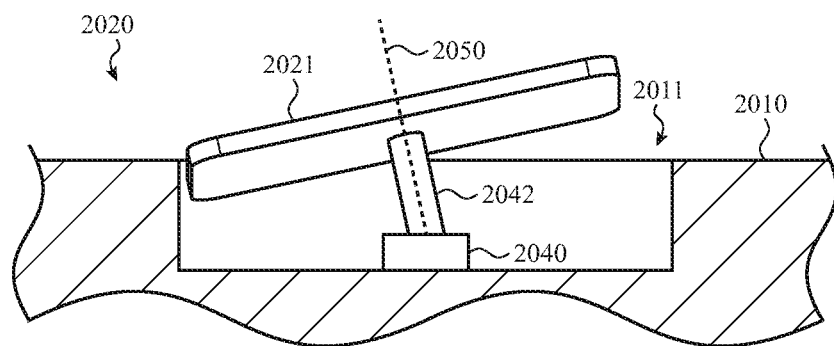

FIGS. 20D-20F illustrate the input/output member 2021 undergoing precession. The cross-sections illustrated in FIGS. 20D-20F are taken through the housing 2010 just inward from a sidewall of the opening 2011. Accordingly, an entirety of the input/output member 2021 can be seen while the housing is in cross-section. Further, in FIGS. 20D-20F, the tilting of the input/output member 2021 is exaggerated to better illustrate the precession. In various embodiments, the input/output member 2021 may tilt more or less than is illustrated.

An axis of rotation 2050 (e.g., an axis about which the input/output member 2021 and/or the support 2042 are rotating) is changed, for example by the actuator 2040, thereby causing the surface of the input/output member 2021 to dynamically tilt, in turn producing a dynamic tactile output at the input/output region. FIGS. 20D-20F show different positions of the axis of rotation 2050 and the resulting orientations of the input/output member 2021 and the support 2042 that occur during precession. For example, the input/output member 2021 may precess clockwise (with respect to a top-down view of the input/output member), although counter-clockwise precession can occur in some embodiments.

In FIG. 20D, the input/output member 2021 is in a first position in which the axis of rotation 2050 extends to the left and out of the page, resulting in a first tilt of the input/output member 2021. In FIG. 20E, the axis of rotation 2050 has moved in a clockwise direction, and the input/output member 2021 is in a second position in which the axis of rotation 2050 extends to the right and into the page, resulting in a second tilt of the input/output member 2021. In FIG. 20F, the axis of rotation 2050 has moved further in a clockwise direction, and the input/output member 2021 is in a third position in which the axis of rotation 2050 extends to the left and into the page, resulting in a third tilt of the input/output member 2021. In FIGS. 20D-20F, the actuator 2040 may actuate the input/output member 2050 by causing movement of the axis of rotation 2050.

In various embodiments, other types of tilting are envisioned. For example, the input/output member 2021 may be dynamically tilted without rotation of the input/output member 2021. Similarly, the tilting may, for example, include rotation of the input/output member 2021 about an axis that is parallel to the surface of the input/output member 2021.

Figure 21:
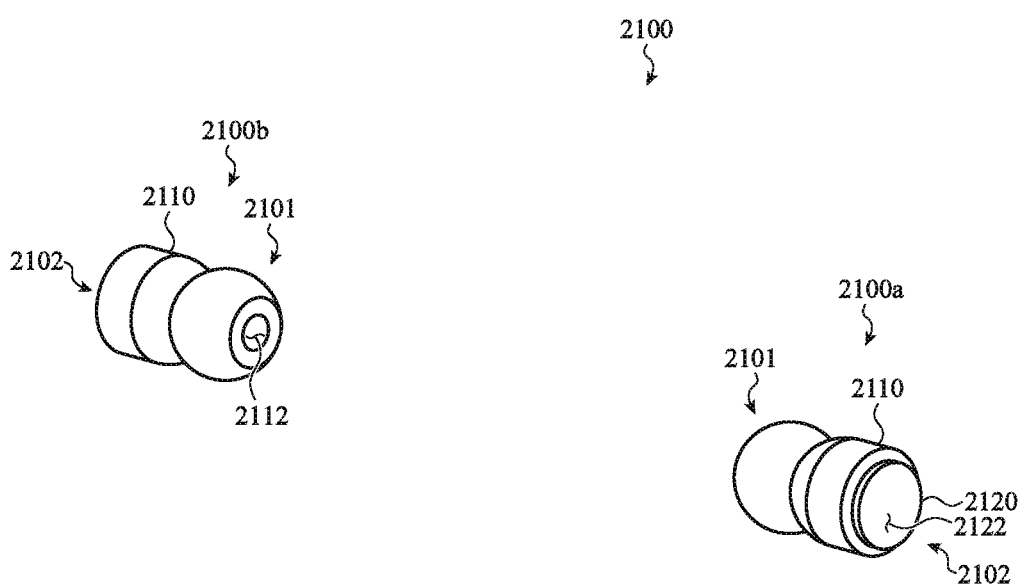
FIG. 21 illustrates an example electronic device that may provide tactile outputs at an input structure, configured as a wearable audio device.

FIG. 21 illustrates an example electronic device 2100 that may provide tactile outputs at or on an input structure, configured as a wearable audio device. The electronic device 2100 is similar to the electronic devices discussed herein (e.g., electronic device 100, electronic device 1500), and may include similar features and/or components. The electronic device 2100 is depicted as ear buds 2100a and 2100b. The electronic device 2100 includes one or more input structures (e.g., input structure 2120) coupled to an enclosure 2110. The input structure 2120 defines an input/output region 2122.

The enclosure 2110 includes a proximal end 2101 and a distal end 2102. In some embodiments, the proximal end 2101 of each ear bud 2100 is configured to interface with the ear of a user to provide audio outputs to the user. In some embodiments, the electronic device 2100 includes an audio output element 2112 coupled to the enclosure at the proximal end 2101 of the ear bud.

In some embodiments, an input structure is positioned at the distal end 2102 of one or more of the ear buds 2100a and 2100b. For example, in FIG. 21, input structure 2120 is coupled to the enclosure 2110 at the distal end 2102 of the ear bud 2100a such that the input structure 2120 is accessible by a user while the ear buds 2100 are installed in the user's ears. In various embodiments, input structures may be coupled to the electronic device 2100 at any of several suitable positions.

In various embodiments, the electronic device 2100 may be configured to provide audio functionality, including providing audio outputs and receiving audio inputs (e.g., by a microphone of the electronic device 2100). The audio functionality may be associated with multimedia playback (e.g., audio, video), communication operations (e.g., phone calls, video calls, messaging, data transfer), or other device operations, including loading and waiting operations, pairing operations (e.g., wireless pairing operations), authentication operations, charging operations, execution of applications, system audio, and the like.

In some embodiments, the electronic device 2100 is communicably coupled (e.g., wiredly and/or wirelessly) to a companion electronic device such as a mobile phone, a computer, an automobile, a home audio or video component, or the like. The companion electronic device may be similar to the electronic devices discussed, and may include similar features, functionality, and/or components. In some embodiments, the companion electronic device is configured to facilitate audio functionality at or of the electronic device 2100. For example, a user may use a mobile phone or other device to control music or other audio (e.g., audio associated with video playback), communication operations, or the like provided at the electronic device 100. Similarly, inputs received at the electronic device 2100 may be used to control the companion electronic device.

In various embodiments, the tactile outputs provided at the input structure 2120 convey information regarding the operation of the electronic device and/or one or more companion electronic devices. For example, the tactile outputs may convey information related to media playback (e.g., audio and/or video playback), communication operations (e.g., phone calls, video calls, messaging, data transfer), loading and waiting operations, pairing operations (e.g., wireless pairing operations), authentication operations, charging operations, execution of applications, system audio, and the like. Different tactile outputs may be used to convey different types of information.

In some embodiments, the tactile outputs convey information regarding audio functionality. For example, the tactile outputs may notify the user of an audio playback state of the electronic device 2100. For example, if audio is playing (e.g., being presented) at the electronic device 2100, a first tactile output having a first pattern of motion may be provided. If audio is paused or stopped (e.g., not being played or presented), a second tactile output having a second pattern of motion may be provided. If a media item is loading or waiting, a third tactile output having a third pattern of motion may be provided.

Figure 22:
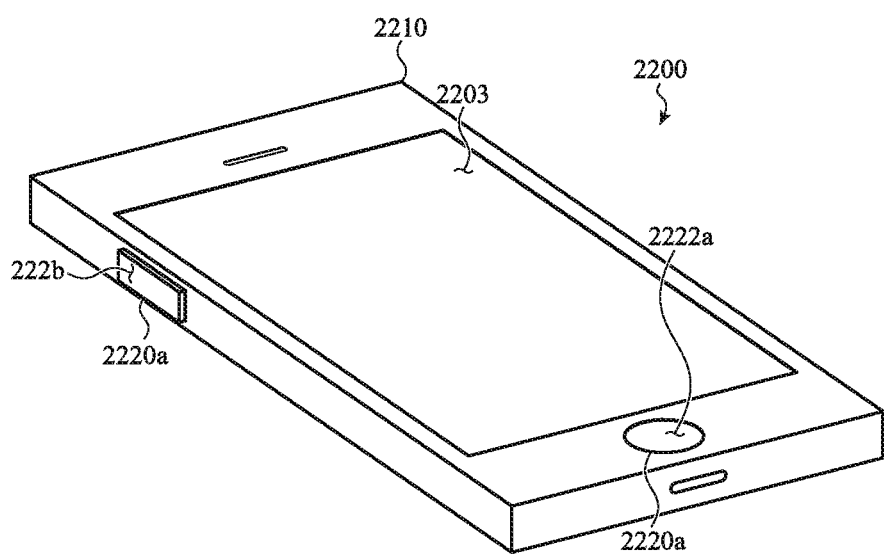
FIG. 22 illustrates an example electronic device, that may provide tactile outputs at an input structure, configured as a mobile phone.

FIG. 22 illustrates an example electronic device 2200 that may provide tactile outputs at an input structure. In FIG. 22 the example electronic device 2200 is a mobile phone, although it may take any form described herein in different embodiments. The electronic device 2200 is similar to the electronic devices discussed herein (e.g., electronic device 100, electronic device 1500), and may include similar features and/or components. The electronic device 2200 is depicted as a mobile phone having an enclosure 2210 and a display 2203. The electronic device 2200 further includes input structures 2220a and 2220b that define input/output regions 2222a and 2222b, respectively. The input structures 2220a and 2220b are similar to the electronic devices discussed herein (e.g., input structures 1500a and 1500b), and may include similar features and/or components.

The display 2203 can be implemented with any suitable technology, similar to the display 103 of FIG. 1. The display 2203 provides a graphical output, for example associated with an operating system, user interface, and/or applications of the electronic device 2200. The display 2203 is operably coupled to a processing unit of the electronic device 2200.

In various embodiments, a graphical output of the display 2203 is responsive to inputs provided at the input structures 2220. The enclosure 2210 provides a device structure and houses device components, such as the processing unit. In various embodiments, the enclosure 2210 may be constructed from similar materials to the enclosure 120 of FIG. 1.

Figure 23A:
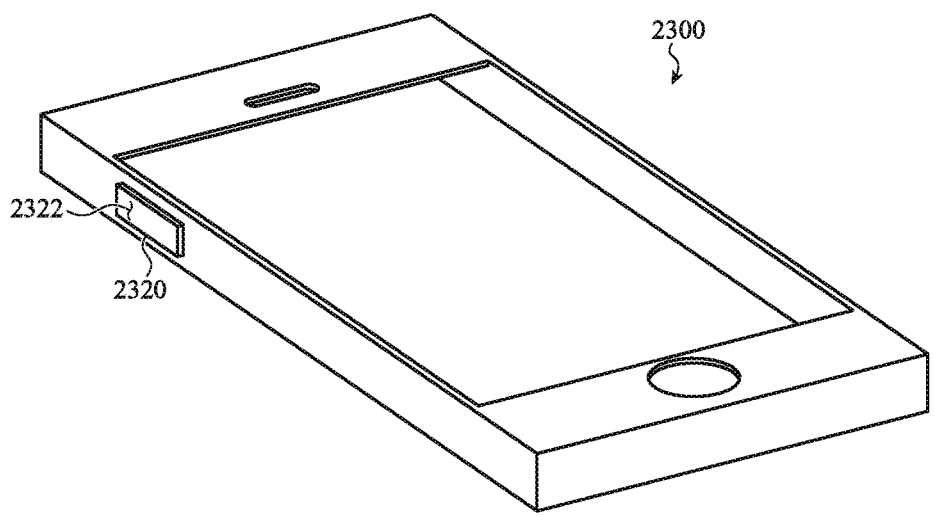
FIG. 23A illustrates an electronic device, configured as a tactile input/output case for a mobile phone.
Figure 23B:
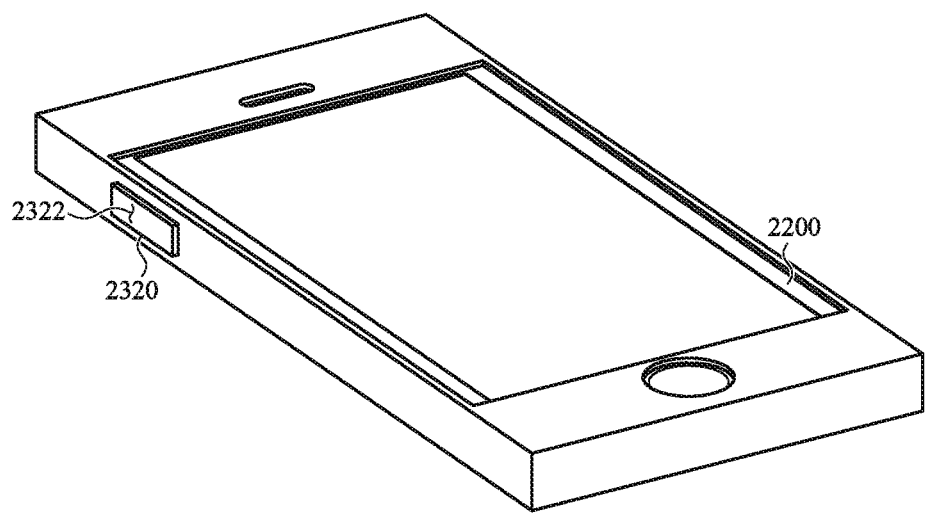
FIG. 23B illustrates the electronic device of FIG. 22 covered, mated, to, coupled, with, or otherwise associated with the tactile input/output case of FIG. 23A.

FIG. 23A illustrates an electronic device 2300, configured as a tactile input/output case for a mobile phone (e.g., electronic device 2200). FIG. 23B illustrates the electronic device 2200 of FIG. 22 covered, mated, to, coupled, with, or otherwise associated with the tactile input/output case 2300. In the illustrated embodiments, the tactile input/output case 2300 includes an input structure 2320. The input structure 2320 is similar to the electronic devices discussed herein (e.g., input structures 1500a and 1500b), and may include similar features and/or components. The tactile input/output case 2300 is a detachable enclosure that is geometrically conformal with the electronic device 2200. Stated another way, the tactile input/output case 2300 at least partially encases the electronic device 2200. Specifically, the tactile input/output case 2300 may include an enclosure that encircles at least a portion of the electronic device 2200.

The enclosure of the tactile input/output case 2300 may engage a communication and/or charging port of the electronic device to communicate with the electronic device and optionally draw electrical power from the electronic device. In one embodiment, the tactile input/output case 2300 includes an internal battery to power, for example, one or more actuators of the input structure 1520. The tactile input/output case 2300 communicates with the electronic device by way of a communication port, such that communications (e.g., signals) from the processing unit of the electronic device are received. The communication between the electronic device and the tactile input/output case 2300 allows the processing unit of the electronic device to transmit a signal to provide a tactile output at tactile input/output case 2300. Generally, it should be understood that discussions herein of electronic devices, their functionality, and general operation encompass cases, plates, and other accessories.

Figure 24:
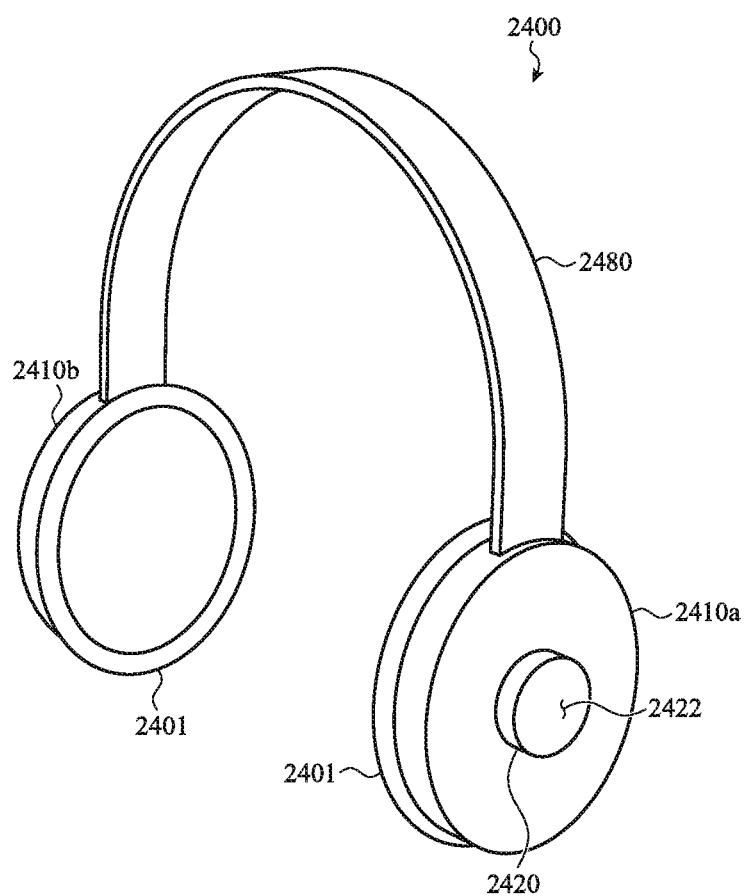
FIG. 24 illustrates an example electronic device that may provide tactile outputs at an input structure, configured as a wearable audio device.

FIG. 24 illustrates an example electronic device 2400 that may provide tactile outputs at an input structure, configured as a wearable audio device. The electronic device 2400 is similar to the electronic devices discussed herein (e.g., electronic device 2100), and may include similar features and/or components. The electronic device 2400 is depicted as headphones. In some embodiments, the headphones 2400 include enclosures 2410a and 2410b coupled by a headband 2480. The headphones 2400 include one or more input structures (e.g., input structure 2420) coupled to the enclosures 2410. The input structure 2420 defines an input/output region 2422.

In some embodiments, each of the enclosures 2410 is configured to interface with the head and/or ear of a user to provide audio outputs to the user. Each enclosure may include an audio output element 2401. The headband 2480 may be used to secure the headphones 2400 to the head of the user.

Figure 25:
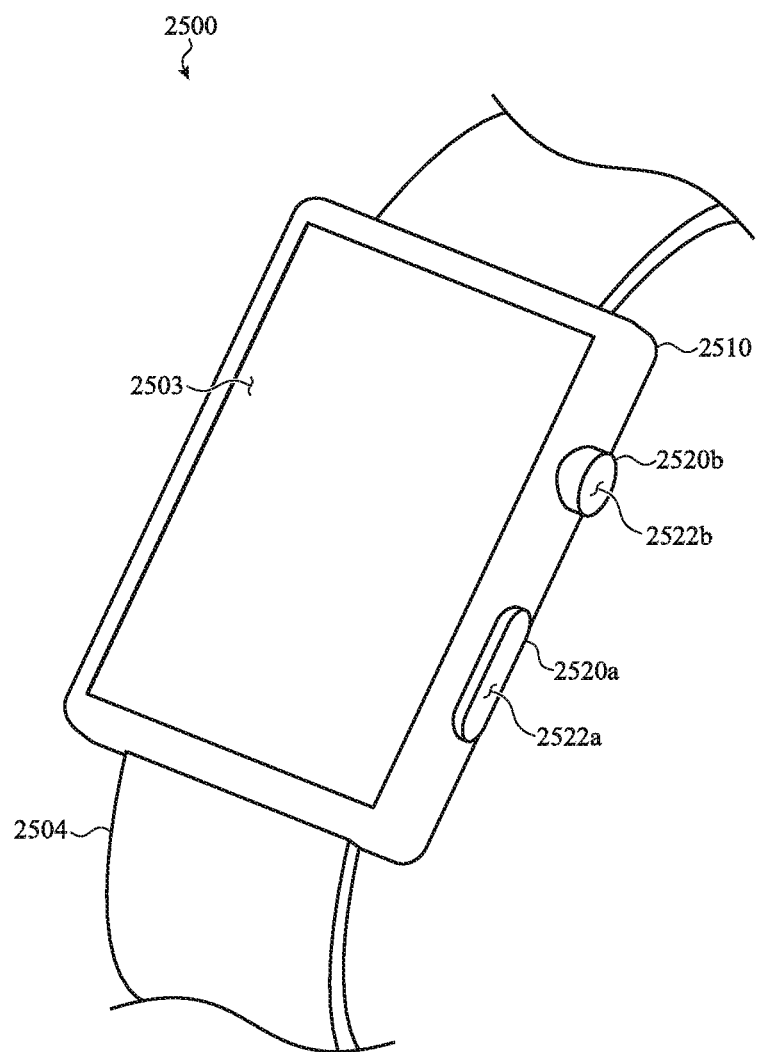
FIG. 25 illustrates an example electronic device, that may provide tactile outputs at an input structure, configured as an electronic watch.

FIG. 25 illustrates an example electronic device 2500, that may provide tactile outputs at an input structure, configured as an electronic watch. The electronic watch 2500 is similar to the electronic devices discussed herein (e.g., electronic device 100, 1500), and may include similar features and/or components, including a display 2503, an enclosure 2510, a watchband 2504, and input structures 2520A and 2520B, which define input/output regions 2522a and 2522b, respectively. In the example of FIG. 25, the input structure 2520b is implemented as a watch crown, similar to watch crown 102.

Figure 26:
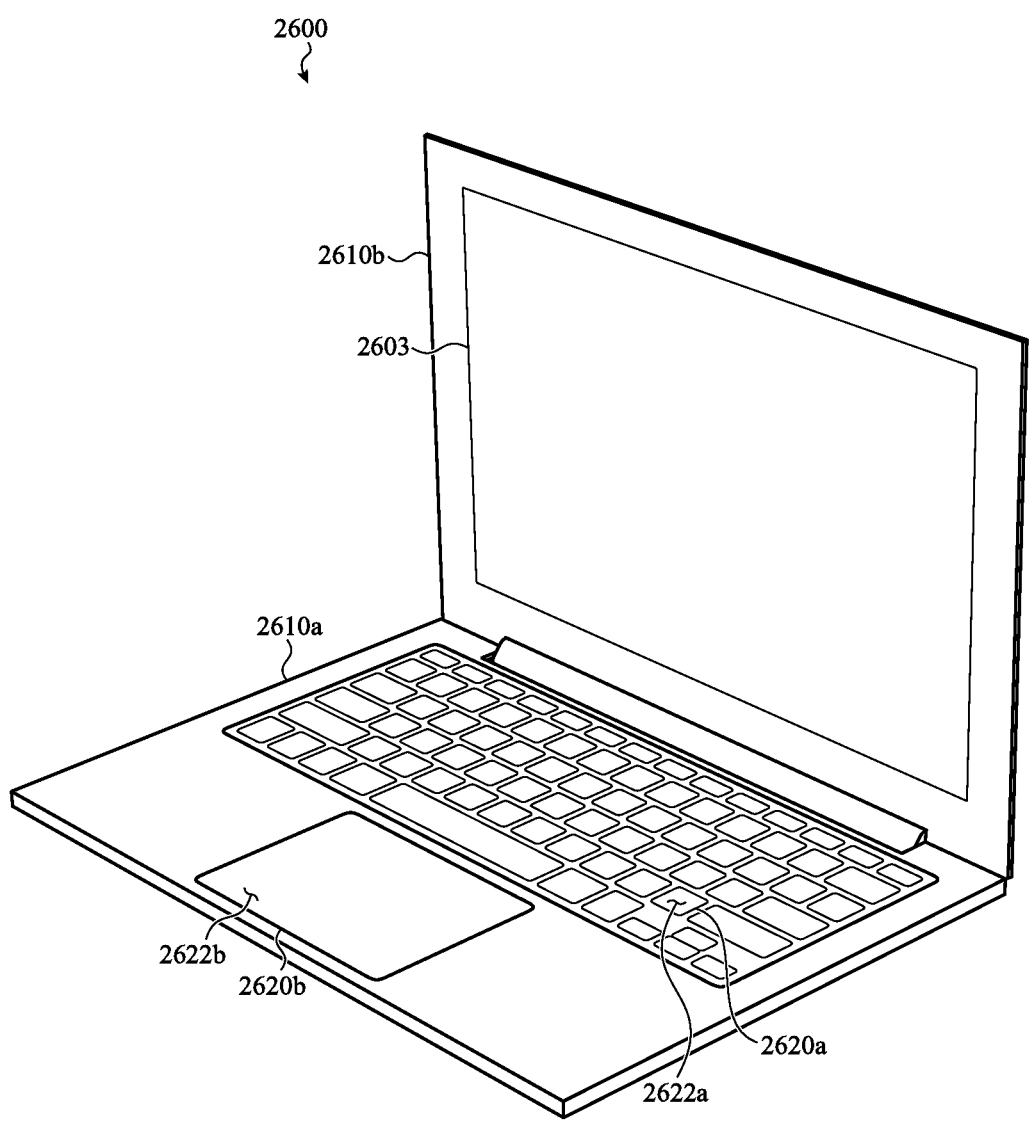
FIG. 26 illustrates an example electronic device, that may provide tactile outputs at an input structure, configured as a laptop.

FIG. 26 illustrates an example electronic device 2600, that may provide tactile outputs at an input structure, configured as a laptop. The laptop 2600 is similar to the electronic devices discussed herein (e.g., electronic device 100, 200, 1500), and may include similar features and/or components, including an enclosure 2610 comprising an upper portion 2610b hingedly coupled to a lower portion 2610a. A display 2603 is located in the upper portion 2610b of the enclosure 2610. The electronic device 2600 further includes input structures 2620a and 2620b, which define input/output regions 2622a and 2622b, respectively. In the example of FIG. 26, the input structure 2620a is implemented as a key of a keyboard, and the input structure 2620b is implemented as a trackpad.

Figure 27:
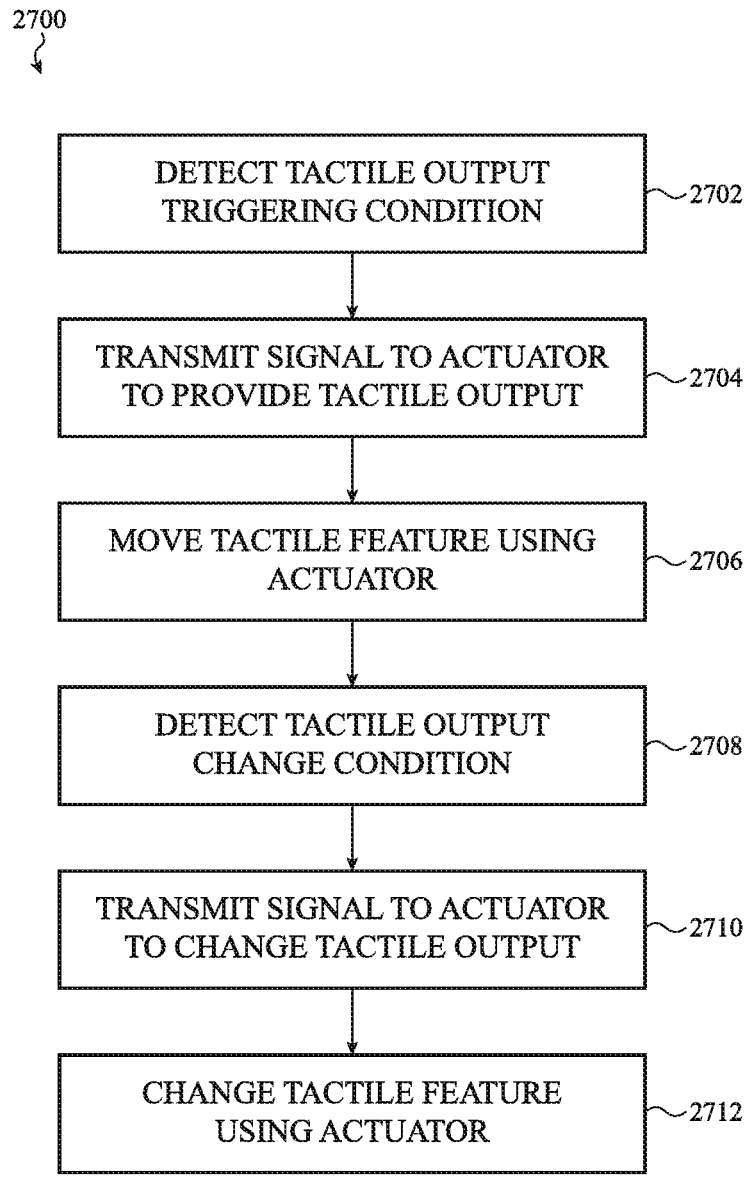
FIG. 27 illustrates an example process for providing a dynamic tactile output to a user of an electronic device.

FIG. 27 illustrates an example process 2700 for providing a dynamic tactile output to a user of an electronic device. As described above it may be advantageous to provide information regarding events of interest and/or operation of the electronic device. In particular, an electronic device may provide a dynamic tactile input in response to detecting tactile output conditions at an electronic device. A user may optionally configure the device to provide tactile outputs in a variety of ways. In various embodiments, the dynamic tactile output is a localized tactile output that is provided at an input structure of an electronic device as discussed herein. Providing the tactile output may include activating and/or moving one or more tactile features on an input/output region defined by an input/output member of the input structure. The operation of process 2700 may be performed, for example, with any of the devices described herein with respect to FIGS. 1-28.

In operation 2702, the electronic device detects a tactile output triggering condition. The electronic device may determine an appropriate tactile output based on the tactile output triggering condition. In operation 2704, the electronic device transmits a tactile output signal to one or more actuators of the electronic device to provide a dynamic tactile output at the input/output region.

In operation 2706, the electronic device moves one or more tactile features using an actuator to produce a dynamic tactile output. The tactile features may be moved according to one or more patterns of motion. As described herein, moving the one or more tactile features may include moving one or more protrusions or indentations, or moving the input member of the device by tilting, rotation, and/or precession. Moving the one or more tactile features may result in varying a precession angle, rotation speed, and/or a shape of the input/output member. In various embodiments, the patterns of motion correspond to the triggering condition. For example, if the triggering condition is a waiting, loading, or pairing operation, the pattern of motion may be a substantially circular pattern of motion such as the pattern described with respect to FIGS. 15D-E. In some embodiments, the actuator activates one or more tactile features in response to receiving the tactile output signal. In some embodiments, the tactile features are activated by altering the surface of the device, for example by forming protrusions or indentations in an otherwise smooth surface.

In operation 2708, the electronic device detects a change condition that indicates that the tactile output should be changed. At operation 2710, the electronic device transmits a tactile output signal (e.g., a change signal) to the one or more actuator to provide a different tactile output. At operation 2712, the electronic device moves the tactile features according to one or more different patterns of motion from the previous patterns of motion to provide the different tactile output. In various embodiments, the different patterns of motion correspond to the change condition. In some embodiments, the actuator activates one or more tactile features in response to receiving the change signal.

Figure 28:
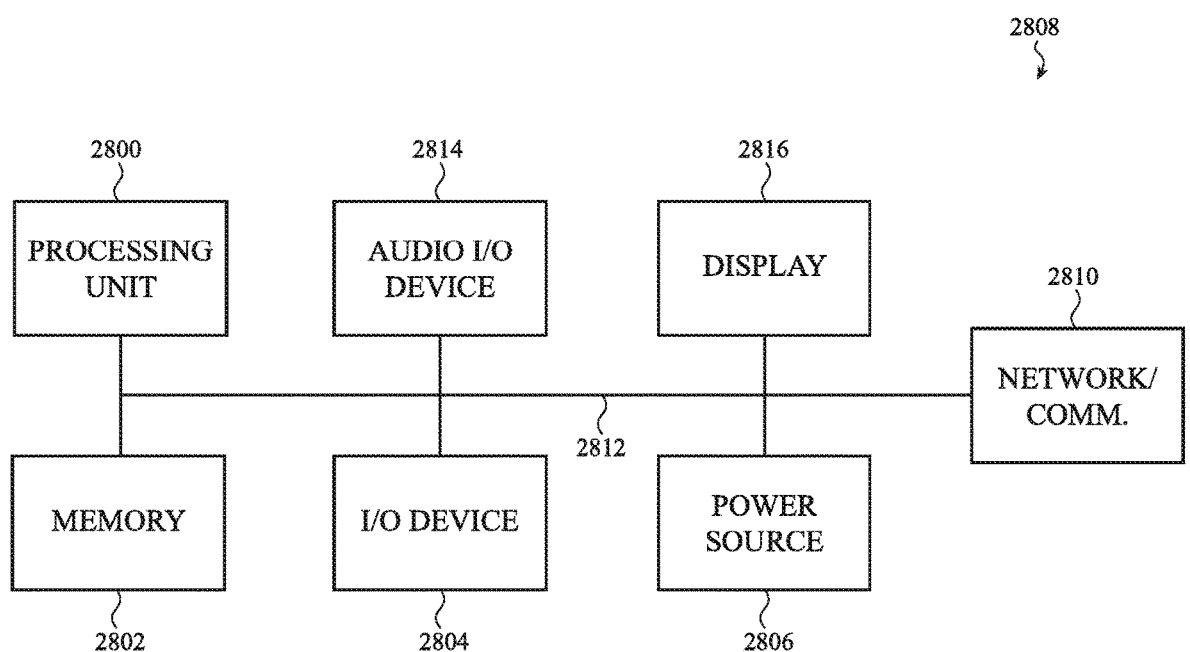
FIG. 28 is an illustrative block diagram of an electronic device.

FIG. 28 is an illustrative block diagram of an electronic device 2808 as described herein (e.g., electronic devices 100, 200, 300, 400, 1300, 1500, 1600, 1700, 1800, 1900, 2100, 2200, 2300, 2400, 2500, 2600). The electronic device can include a display 2816, one or more processing units 2800, memory 2802, one or more input/output (I/O) devices 2804, a power source 2806, and a network communication interface 2810.

The display 2816 may provide an image or graphical output (e.g., computer-generated image data) for the electronic device. The display may also provide an input surface for one or more input devices, such as, for example, a touch sensing device and/or a fingerprint sensor. The display 2816 may be substantially any size and may be positioned substantially anywhere on the electronic device. The display 2816 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 2816 provides a graphical output, for example associated with an operating system, user interface, and/or applications of the electronic device 2808. In some embodiments, the display 2816 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 2816 is responsive to inputs provided to the electronic device 2808.

The processing unit 2800 can control some or all of the operations of the electronic device. The processing unit 2800 can communicate, either directly or indirectly, with substantially all of the components of the electronic device. For example, a system bus or signal line 2812 or other communication mechanisms (e.g., electronic connectors) can provide communication between the processing unit(s) 2800, the memory 2802, the I/O device(s) 2804, the power source 2806, and/or the network communication interface 2810. The one or more processing units 2800 can be implemented as any electronic device capable of processing, receiving, or transmitting data or instructions. For example, the processing unit(s) 2800 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 2802 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 2802 can be configured as any type of memory. By way of example only, the memory can be implemented as random access memory, read-only memory, flash memory, removable memory, or other types of storage elements, or combinations of such devices.

The one or more I/O devices 2804 can transmit and/or receive data to and from a user or another electronic device. The I/O device (s) 2804 can include any components discussed herein to provide tactile outputs, including input structures, tactile features, and the like. The I/O device(s) 2804 can further include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 2806 can be implemented with any device capable of providing energy to the electronic device. For example, the power source 2806 can be one or more batteries or rechargeable batteries, or a connection cable that connects the electronic device to another power source such as a wall outlet.

The network communication interface 2810 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 28 is for illustrative purposes only. In other examples, an electronic device may include fewer or more components than those shown in FIG. 28. Additionally or alternatively, the electronic device can be included in a system and one or more components shown in FIG. 28 are separate from the electronic device but included in the system. For example, an electronic device may be operatively connected to, or in communication with a separate display. As another example, one or more applications can be stored in a memory separate from the wearable electronic device. The processing unit in the electronic device can be operatively connected to and in communication with the separate display and/or memory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
an enclosure;
an input/output member coupled to the enclosure and configured to receive inputs and provide tactile outputs, the input/output member comprising a tactile feature positioned along a surface of the input/output member; and
an actuator disposed at least partially within the enclosure and operably connected to the input/output member, the actuator configured to:
in response to receiving a first electronic notification, actuate the tactile feature to produce a first local deformation at a first initial location on the surface of the input/output member and, while the tactile feature is actuated, move the tactile feature along the surface from the first initial location to a first end location; and
in response to receiving a second electronic notification, actuate the tactile feature to produce a second local deformation at a second initial location on the surface of the input/output member and, while the tactile feature is actuated, move the tactile feature along the surface from the second initial location to a second end location.

2. The electronic device of claim 1, wherein:
the electronic device further comprises a processing unit disposed in the enclosure and configured to receive the first electronic notification;
the processing unit is configured to transmit a first tactile output signal to the actuator in response to receiving the first electronic notification; and
actuation of the tactile feature comprises deforming the surface of the input/output member in response to receiving the first tactile output signal.

3. The electronic device of claim 2, wherein the processing unit transmits a second tactile output signal in response to receiving the second electronic notification.

4. The electronic device of claim 1, wherein:
the actuator comprises:
an activation component; and
an actuation component; and
the activation component is configured to cause motion of the actuation component, thereby activating the tactile feature on the input/output member.

5. The electronic device of claim 1, wherein the input/output member is pliable.

6. The electronic device of claim 1, wherein the tactile feature comprises a protrusion extending from the input/output member.

7. The electronic device of claim 1, wherein a frequency of motion of the tactile feature is between 2 Hertz and 4 Hertz.

8. The electronic device of claim 1, wherein the first electronic notification and the second electronic notification are each one of a phone call, a text message, or an email message.

9. The electronic device of claim 8, wherein the first electronic notification is different from the second electronic notification.

10. An electronic device comprising:
an enclosure defining an opening;
an input structure disposed at least partially in the opening and comprising an input/output member configured to provide a tactile output;
a processor configured to receive an electronic notification; and
an actuator configured to:
in response to the electronic notification, actuate a tactile feature at a surface of the input/output member to create a first deformation at the surface of the input/output member; and while the tactile feature is actuated, move the tactile feature from a first location along the surface of the input/output member to a second location along the surface of the input/output member, thereby producing the tactile output.

11. The electronic device of claim 10, wherein the electronic notification comprises at least one of a phone call, a text message, or an email message.

12. The electronic device of claim 10, wherein the input/output member is configured to rotate, tilt, or recess.

13. A method for providing tactile outputs using an electronic device, comprising:

receiving a first electronic notification;

in response to receiving the first electronic notification, transmitting a first signal to an actuator to provide a first tactile output using a tactile feature;

in response to the actuator receiving the first signal, causing the actuator to actuate the tactile feature to deform an exterior surface and, while the tactile feature is actuated, move the tactile feature along the exterior surface in a first pattern of motion to produce the first tactile output;

receiving a second electronic notification;

in response to receiving the second electronic notification, transmitting a second signal to the actuator to provide a second tactile output using the tactile feature; and in response to the actuator receiving the second signal, causing the actuator to actuate the tactile feature to deform the exterior surface and, while the tactile feature is actuated, move the tactile feature along the exterior surface in a second pattern of motion to produce the second tactile output.

14. The method of claim 13, wherein:

the first pattern of motion is substantially periodic; and the first pattern of motion has a frequency between 2 and 4 Hertz.

15. The method of claim 13, wherein:

the first tactile output provides information regarding a denial of a device input; and the first tactile output comprises the tactile feature moving bidirectionally along a substantially linear path.

16. The method of claim 13, wherein the first electronic notification and the second electronic notification are each one of a phone call, a text message, or an email message.

\* \* \* \* \*